(12) United States Patent
Sheng

(10) Patent No.: US 11,257,283 B2
(45) Date of Patent: Feb. 22, 2022

(54) IMAGE RECONSTRUCTION METHOD, SYSTEM, DEVICE AND COMPUTER-READABLE STORAGE MEDIUM

(71) Applicant: Alibaba Group Holding Limited, Grand Cayman (KY)

(72) Inventor: Xiaojie Sheng, Shanghai (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/810,695

(22) Filed: Mar. 5, 2020

(65) Prior Publication Data

US 2020/0288100 A1 Sep. 10, 2020

(30) Foreign Application Priority Data

Mar. 7, 2019 (CN) .......................... 201910172717.7
Mar. 7, 2019 (CN) .......................... 201910172720.9
(Continued)

(51) Int. Cl.
*H04N 13/117* (2018.01)
*H04N 13/128* (2018.01)
(Continued)

(52) U.S. Cl.
CPC ........ *G06T 15/205* (2013.01); *G06F 3/04842* (2013.01); *G06F 3/04883* (2013.01);
(Continued)

(58) Field of Classification Search
None
See application file for complete search history.

(56) References Cited

U.S. PATENT DOCUMENTS 5,083,287 A 1/1992 Obata et al.
5,130,794 A 7/1992 Ritchey
(Continued)

FOREIGN PATENT DOCUMENTS

CN 102771081 A 11/2012
CN 103310445 A 9/2013
(Continued)

OTHER PUBLICATIONS

PCT Search Report, and Written Opinion dated May 28, 2020 for PCT Application No. PCT/US20/21220, 9 pages.
(Continued)

*Primary Examiner* — Frederick D Bailey
(74) *Attorney, Agent, or Firm* — Lee & Hayes, P.C.

(57) ABSTRACT

Image reconstruction methods, systems, devices, and computer-readable storage media are provided. The method includes: acquiring a multi-angle free-perspective image combination, parameter data of the image combination, and virtual viewpoint position information based on user interaction, where the image combination includes multiple groups of texture images and depth maps that are synchronized at multiple angles and have corresponding relationships; selecting a corresponding group of texture images and depth maps in the image combination at a user interaction moment based on a preset rule according to the virtual viewpoint position information and the parameter data of the image combination; and combining and rendering the selected corresponding group of texture images and depth maps in the image combination at the user interaction moment based on the virtual viewpoint position information and parameter data corresponding to the corresponding group of texture images and depth maps in the image combination at the user interaction moment.

20 Claims, 45 Drawing Sheets

(30) Foreign Application Priority Data

| Mar. 7, 2019 | (CN) | 201910172727.0 |
| Mar. 7, 2019 | (CN) | 201910172729.X |
| Mar. 7, 2019 | (CN) | 201910172742.5 |
| Mar. 7, 2019 | (CN) | 201910172743.X |
| Mar. 7, 2019 | (CN) | 201910172761.8 |
| Mar. 7, 2019 | (CN) | 201910173413.2 |
| Mar. 7, 2019 | (CN) | 201910173414.7 |
| Mar. 7, 2019 | (CN) | 201910173415.1 |
| Mar. 7, 2019 | (CN) | 201910177941.5 |

(51) Int. Cl.

| *H04N 13/282* | (2018.01) |
| *G06T 15/20* | (2011.01) |
| *H04N 13/167* | (2018.01) |
| *H04N 13/139* | (2018.01) |
| *G06T 15/04* | (2011.01) |
| *H04N 13/189* | (2018.01) |
| *H04N 13/268* | (2018.01) |
| *H04N 13/279* | (2018.01) |
| *H04N 13/296* | (2018.01) |
| *H04N 13/156* | (2018.01) |
| *G06F 3/0484* | (2022.01) |
| *G06F 3/0488* | (2022.01) |
| *G06F 3/16* | (2006.01) |
| *G06K 9/00* | (2022.01) |
| *H04N 13/293* | (2018.01) |
| *G06T 3/40* | (2006.01) |
| *H04N 13/349* | (2018.01) |
| *H04N 13/172* | (2018.01) |
| *H04N 13/00* | (2018.01) |

(52) U.S. Cl.
CPC .......... *G06F 3/167* (2013.01); *G06K 9/00711* (2013.01); *G06T 3/4038* (2013.01); *G06T 15/04* (2013.01); *G06T 15/20* (2013.01); *H04N 13/117* (2018.05); *H04N 13/128* (2018.05); *H04N 13/139* (2018.05); *H04N 13/156* (2018.05); *H04N 13/167* (2018.05); *H04N 13/172* (2018.05); *H04N 13/189* (2018.05); *H04N 13/268* (2018.05); *H04N 13/279* (2018.05); *H04N 13/282* (2018.05); *H04N 13/293* (2018.05); *H04N 13/296* (2018.05); *H04N 13/349* (2018.05); *G06T 2200/24* (2013.01); *G06T 2210/36* (2013.01); *H04N 2013/0081* (2013.01)

(56) References Cited

U.S. PATENT DOCUMENTS

| 5,359,362 | A | 10/1994 | Lewis |
| 5,729,471 | A | 3/1998 | Jain et al. |
| 6,100,862 | A | 8/2000 | Sullivan |
| 6,166,748 | A | 12/2000 | Van Hook et al. |
| 6,677,982 | B1 | 1/2004 | Chen et al. |
| 6,765,568 | B2 | 7/2004 | Swift et al. |
| RE39,342 | E | 10/2006 | Starks et al. |
| 7,116,323 | B2 | 10/2006 | Kaye et al. |
| 7,123,777 | B2 | 10/2006 | Rondinelli et al. |
| 7,340,094 | B2 | 3/2008 | Mayhew et al. |
| 7,463,280 | B2 | 12/2008 | Steuart, III |
| 7,471,292 | B2 | 12/2008 | Li |
| 7,588,190 | B2 | 9/2009 | Zhu et al. |
| 7,775,883 | B2 | 8/2010 | Smoot et al. |
| 8,135,238 | B2 | 3/2012 | Au et al. |
| 8,218,855 | B2 | 7/2012 | Kim et al. |
| 8,334,893 | B2 | 12/2012 | Hartman |
| 8,390,674 | B2 | 3/2013 | Kim et al. |
| 8,532,425 | B2 | 9/2013 | Ali et al. |
| 8,538,134 | B2 | 9/2013 | Kim et al. |
| 8,581,961 | B2 | 11/2013 | Lee |
| 8,717,405 | B2 | 5/2014 | Li et al. |
| 8,749,620 | B1 | 6/2014 | Knight et al. |
| 8,860,784 | B2 | 10/2014 | Kobayashi |
| 8,890,954 | B2 | 11/2014 | O'Donnell et al. |
| 8,896,534 | B2 | 11/2014 | Takeda et al. |
| 9,098,926 | B2 * | 8/2015 | Quan .................. G06T 17/00 |
| 9,183,669 | B2 | 11/2015 | Liu et al. |
| 9,478,008 | B1 | 10/2016 | Adsumilli et al. |
| 9,684,994 | B2 | 6/2017 | Vesely et al. |
| 9,769,365 | B1 | 9/2017 | Jannard |
| 9,904,867 | B2 | 2/2018 | Fathi et al. |
| 10,313,656 | B2 | 6/2019 | Sadi et al. |
| 10,341,632 | B2 | 7/2019 | Pang et al. |
| 10,410,418 | B2 | 9/2019 | Kiuchi et al. |
| 10,419,737 | B2 | 9/2019 | Pang et al. |
| 10,419,738 | B1 | 9/2019 | Phillips et al. |
| 10,432,970 | B1 | 10/2019 | Phillips et al. |
| 10,469,873 | B2 | 11/2019 | Pang et al. |
| 10,523,914 | B1 | 12/2019 | Phillips et al. |
| 10,567,464 | B2 | 2/2020 | Pang et al. |
| 10,764,603 | B2 | 9/2020 | Sun et al. |
| 2003/0009773 | A1 | 1/2003 | Carlson |
| 2004/0125044 | A1 | 7/2004 | Suzuki |
| 2006/0028489 | A1 | 2/2006 | Uyttendaele et al. |
| 2008/0253685 | A1 | 10/2008 | Kuranov et al. |
| 2009/0153549 | A1 | 6/2009 | Lynch et al. |
| 2009/0315978 | A1 | 12/2009 | Wurmlin et al. |
| 2010/0146389 | A1 | 6/2010 | Yoo et al. |
| 2010/0238264 | A1 | 9/2010 | Liu et al. |
| 2011/0150101 | A1 | 6/2011 | Liu et al. |
| 2011/0158509 | A1 | 6/2011 | Li et al. |
| 2011/0285704 | A1 | 11/2011 | Takeda et al. |
| 2012/0141016 | A1 | 6/2012 | Wildeboer et al. |
| 2012/0195492 | A1 | 8/2012 | Ali et al. |
| 2012/0262554 | A1 | 10/2012 | Gotsman et al. |
| 2012/0314937 | A1 | 12/2012 | Kim et al. |
| 2012/0329527 | A1 | 12/2012 | Kang et al. |
| 2013/0229487 | A1 * | 9/2013 | D'Amato ............. H04N 13/161 348/43 |
| 2013/0321575 | A1 | 12/2013 | Kirk et al. |
| 2014/0085416 | A1 * | 3/2014 | Chang .................. H04N 13/161 348/43 |
| 2014/0186002 | A1 | 7/2014 | Hanaya et al. |
| 2014/0198178 | A1 | 7/2014 | Ioffe et al. |
| 2014/0267243 | A1 | 9/2014 | Venkataraman et al. |
| 2014/0267610 | A1 | 9/2014 | Ahmad et al. |
| 2014/0270706 | A1 | 9/2014 | Pasko |
| 2015/0036047 | A1 | 2/2015 | Bledsoe |
| 2015/0294473 | A1 * | 10/2015 | Michot ..................... G06T 7/90 382/154 |
| 2015/0325039 | A1 | 11/2015 | Lynch |
| 2015/0381972 | A1 | 12/2015 | Kowdle et al. |
| 2016/0050367 | A1 | 2/2016 | Shimauchi et al. |
| 2016/0050435 | A1 * | 2/2016 | Zhang .................. H04N 19/176 375/240.12 |
| 2016/0127728 | A1 | 5/2016 | Tanizawa et al. |
| 2016/0140397 | A1 | 5/2016 | Zhang et al. |
| 2016/0150208 | A1 | 5/2016 | Li et al. |
| 2016/0165308 | A1 | 6/2016 | Stern et al. |
| 2016/0309134 | A1 | 10/2016 | Venkataraman et al. |
| 2016/0323532 | A1 | 11/2016 | Gouda et al. |
| 2016/0381343 | A1 | 12/2016 | Leontaris et al. |
| 2017/0034501 | A1 | 2/2017 | McDevitt |
| 2017/0039765 | A1 | 2/2017 | Zhou et al. |
| 2017/0220887 | A1 | 8/2017 | Fathi et al. |
| 2017/0269685 | A1 | 9/2017 | Marks et al. |
| 2018/0035134 | A1 | 2/2018 | Pang et al. |
| 2018/0061135 | A1 | 3/2018 | Watanabe |
| 2018/0089903 | A1 | 3/2018 | Pang et al. |
| 2018/0097867 | A1 | 4/2018 | Pang et al. |
| 2018/0103243 | A1 | 4/2018 | Lee et al. |
| 2018/0240281 | A1 | 8/2018 | Vincelette |
| 2018/0278918 | A1 | 9/2018 | Peri |
| 2018/0288394 | A1 | 10/2018 | Aizawa |
| 2018/0302647 | A1 | 10/2018 | Tanaka |
| 2018/0343442 | A1 | 11/2018 | Yoshikawa et al. |

(56) References Cited

U.S. PATENT DOCUMENTS

| | | | |
|---|---|---|---|
| 2018/0359489 A1* | 12/2018 | Lakshman | G06T 19/006 |
| 2018/0376122 A1 | 12/2018 | Park et al. | |
| 2019/0139296 A1* | 5/2019 | Lakshman | G06T 15/08 |
| 2019/0228565 A1 | 7/2019 | Yushiya et al. | |
| 2019/0313021 A1 | 10/2019 | Hannuksela | |
| 2019/0364263 A1 | 11/2019 | Jannard et al. | |
| 2020/0068188 A1 | 2/2020 | Maeda | |
| 2020/0275083 A1 | 8/2020 | Yoneda et al. | |
| 2020/0275084 A1 | 8/2020 | Aizawa | |
| 2020/0286279 A1 | 9/2020 | Sheng | |
| 2020/0288097 A1 | 9/2020 | Sheng | |
| 2020/0288098 A1 | 9/2020 | Sheng | |
| 2020/0288099 A1 | 9/2020 | Sheng | |
| 2020/0288103 A1 | 9/2020 | Sheng | |
| 2020/0288104 A1 | 9/2020 | Sheng | |
| 2020/0288108 A1 | 9/2020 | Sheng | |
| 2020/0288109 A1 | 9/2020 | Sheng | |
| 2020/0288111 A1 | 9/2020 | Sheng | |
| 2020/0288112 A1 | 9/2020 | Sheng | |
| 2020/0312029 A1* | 10/2020 | Heinen | G06T 7/579 |
| 2020/0320727 A1 | 10/2020 | Smolic et al. | |
| 2021/0191506 A1* | 6/2021 | Wang | G06N 3/0454 |

FOREIGN PATENT DOCUMENTS

| | | |
|---|---|---|
| CN | 103329543 A | 9/2013 |
| CN | 103329548 | 9/2013 |
| CN | 103581651 A | 2/2014 |
| CN | 104284187 A | 4/2015 |
| CN | 104574311 | 4/2015 |
| CN | 105611268 | 5/2016 |
| CN | 108234985 A | 6/2018 |
| CN | 108377374 A | 8/2018 |
| CN | 109361913 A | 2/2019 |
| EP | 2735150 B1 | 5/2014 |
| EP | 2540034 B1 | 11/2017 |
| EP | 2946274 B1 | 8/2018 |
| KR | WO2016048014 A1 | 3/2016 |
| KR | 10-1807886 B1 | 12/2017 |
| KR | 20180045668 A | 5/2018 |
| WO | WO2015037761 A1 | 3/2015 |
| WO | WO2017080280 A1 | 5/2017 |
| WO | WO2017132636 A1 | 8/2017 |
| WO | WO2018074821 A1 | 4/2018 |

OTHER PUBLICATIONS

The PCT Search Report and Written OPinion dated Jun. 2, 202 for PCT Application No. PCT/US20/21231, 9 pages.

PCT Search Report and Written Opinion dated Jun. 5, 2020, for PCT Application No. PCT/US20/21187, 9 pages.

The PCT Search Report and Written Opinion dated May 20, 2020 for PCT Application No. PCT/US20/21241, 7 pages/.

The PCT Search Report and and Written Opinion dated May 22, 2020, for PCT Application No. PCT/US20/21167, 14 pages.

The PCT Search Report and Written Opinion dated May 26, 2020 for PCT Application No. PCT/US20/21197, 7 pages.

The PCT Search Report and Written Opinion dated May 26, 2020 for PCT Application No. PCT/US20/21252, 14 pages.

The PCT Search Report and Written Opinion dated Jun. 11, 2020 for PCT Application No. PCT/US20/21164, 8 pages.

The PCT Search Report and Written Opinion dated Jun. 11, 2020, for PCT Application No. PCT/US20/21141, 11 pages.

The PCT Search Report and Written Opinion dated Jun. 18, 2020 for PCT Application No. PCT/US20/21247, 110 pages.

The PCT Search Report and Written Opinion dated Jun. 8, 2020 for PCT Application No. PCT/US2020/021195, 10 pages.

Zhang et al., "Super-resolution reconstruction for multi-angle remote sensing images considering resolution differences", retrieved on May 3, 2020 at «https://www.mdpi.com/2072-4292/6/1/637/pdf», Remote Sensing, vol. 6., No. 1, Jan. 6, 2014, 21 pages.

Moore, et al., "Synchronization of Images from Multiple Cameras to Reconstruct a Moving Human", 2010 14th IEEE/ACM Symposium on Distributed Simulation and Reai-Time Applications, Oct. 17-20, 2010, pp. 53-60.

Non Final Office Action dated Sep. 16, 2020 for U.S. Appl. No. 16/810,362, "Method, Apparatus, Terminal, Capturing System and Device for Setting Capturing Devices", Sheng, 8 pages.

Non Final Office Action dated Sep. 18, 2020 for U.S. Appl. No. 16/810,464, "Method, Apparatus, Medium, and Device for Generating Multi-Angle Free-Respective Image Data", Sheng, 20 pages.

Non Final Office Action dated Oct. 29, 2020 for U.S. Appl. No. 16/810,614, "Video Generating Method, Apparatus, Medium, and Terminal", Sheng, 11 pages.

Non Final Office Action dated Nov. 4, 2020 for U.S. Appl. No. 16/810,237, "Method, Apparatus, Medium, Terminal, and Device for Processing Multi-Angle Free-Perspective Data", Sheng, 19 apges.

Office Action dated Jan. 8, 2021 for U.S. Appl. No. 16/810,586, "Method, Apparatus, Medium, and Device for Processing Multi-Angle Free-Perspective Image Data", Sheng, 14 pages.

Non Final Office Action dated Nov. 12, 2020 for U.S. Appl. No. 16/810,681, "Method, Apparatus, Medium, and Device for Processing Multi-Angle Free-Perspective Video Data", Sheng, 15 pages.

Non Final Office Action dated Nov. 27, 2020 for U.S. Appl. No. 16/810,352, "Method, Apparatus, Medium, Terminal, and Device for Multi-Angle Free-Perspective Interaction", Sheng, 17 pages.

Office Action for U.S. Appl. No. 16/810,565, dated Feb. 25, 2021, Sheng, "Method, Apparatus, Medium, and Server for Generating Multi-Angle Free-Perspective Video Data", 12 Pages.

Office Action for U.S. Appl. No. 16/810,480, dated Mar. 15, 2021, Sheng, "Method, Apparatus, Medium, Terminal, and Device for Multi-Angle Free-Perspective Interaction ", 19 pages.

Office Action for U.S. Appl. No. 16/810,614, dated Mar. 24, 2021, Sheng, "Video Generating Method, Apparatus, Medium, and Terminal ", 11 Pages.

Office Action for U.S. Appl. No. 16/810,362, dated Feb. 23, 2021, Sheng, "Method, Apparatus, Terminal, Capturing System and Device for Setting Capturing Devices ", 8 pages.

Office Action for U.S. Appl. No. 16/810,464, dated Mar. 8, 2021, Sheng, "Method, Apparatus, Medium, and Device for Generating Multi-Angle Free-Respective Image Data", 19 pages.

Office Action for U.S. Appl. No. 16/810,480, dated Jul. 8, 2021, Sheng, "Method, Apparatus, Medium, Terminal, and Device for Multi-Angle Free-Perspective Interaction", 18 Pages.

Office Action for U.S. Appl. No. 16/810,681, dated Apr. 2, 2021, Sheng, "Method, Apparatus, Medium, and Device for Processing Multi-Angle Free-Perspective Video Data", 12 Pages.

Office Action for U.S. Appl. No. 16/810,586, dated Apr. 14, 2021, Sheng, "Method, Apparatus, Medium, and Device for Processing Multi-Angle Free-Perspective Image Data", 17 Pages.

Translation of CN Office Action for corresponding CN Application No. 16810586.2 dated Sep. 1, 2021 , a counterpart foreign application for U.S. Appl. No. 16/810,586, 9 pages.

Translation of CN Office Action for corresponding CN Application No. 201910172720.9 dated Sep. 3, 2021 , a counterpart foreign application for U.S. Appl. No. 16/810,695, 13 pages.

Translation of CN Search Report for corresponding CN Application No. 16810695.9 dated Aug. 27, 2021 , a counterpart foreign application for U.S. Appl. No. 16/810,695, 3 pages.

Office Action for U.S. Appl. No. 16/810,634, dated Sep. 24, 2021, Sheng, "Video Reconstruction Method, System, Device, and Computer Readable Storage Medium ", 10 Pages.

Office Action for U.S. Appl. No. 16/810,464, dated Oct. 4, 2021, Sheng, "Method, Apparatus, Medium, and Device for Generating Multi-Angle Free-Respective Image Data ", 14 Pages.

Office Action for U.S. Appl. No. 16/810,695, dated Jul. 29, 2021, Sheng, "Image Reconstruction Method, System, Device and Computer-Readable Storage Medium ", 18 pages.

International Report on Preliminary Patentability for PCT Application No. PCT/US20/21241, dated Sep. 16, 2021.

International Report on Preliminary Patentability for PCT App No. PCT/US20/21195, dated Sep. 16, 2021.

(56) References Cited

OTHER PUBLICATIONS

International Preliminary Report on Patentability for PCT App. No. PCT/US20/21197, dated Sep. 16, 2021.

* cited by examiner

FIG. 20

| Pixel 1 | Depth Value 1 | Pixel 2 | Depth Value 2 | Pixel 3 | Depth Value 3 | Pixel 4 | Depth Value 4 | Pixel 5 | Depth Value 5 | Pixel 6 | Depth Value 6 | ..... |

| | | | |
|---|---|---|---|
| Perspective 1 Texture Image | Perspective 2 Texture Image | Perspective 3 Texture Image | Perspective 4 Texture Image |
| Perspective 5 Texture Image | Perspective 6 Texture Image | Perspective 7 Texture Image | Perspective 8 Texture Image |
| Perspective 1 Depth Map | Perspective 2 Depth Map | Perspective 3 Depth Map | Perspective 4 Depth Map |
| Perspective 5 Depth Map | Perspective 6 Depth Map | Perspective 7 Depth Map | Perspective 8 Depth Map |

FIG. 27

| | |
|---|---|
| Perspective 1 Texture Image | Perspective 2 Texture Image |
| Perspective 3 Texture Image | Perspective 4 Texture Image |
| Perspective 5 Texture Image | Perspective 6 Texture Image |
| Perspective 7 Texture Image | Perspective 8 Texture Image |

| | | | |
|---|---|---|---|
| Perspective 1 Depth Map | Perspective 2 Depth Map | Perspective 3 Depth Map | Perspective 4 Depth Map |
| Perspective 5 Depth Map | Perspective 6 Depth Map | Perspective 7 Depth Map | Perspective 8 Depth Map |

FIG. 28

| | | | |
|---|---|---|---|
| PERSPECTIVE 5 DEPTH MAP | PERSPECTIVE 6 DEPTH MAP | PERSPECTIVE 7 DEPTH MAP | PERSPECTIVE 8 DEPTH MAP |
| PERSPECTIVE 1 TEXTURE IMAGE | | PERSPECTIVE 2 TEXTURE IMAGE | |
| PERSPECTIVE 3 TEXTURE IMAGE | | PERSPECTIVE 4 TEXTURE IMAGE | |
| PERSPECTIVE 5 TEXTURE IMAGE | | PERSPECTIVE 6 TEXTURE IMAGE | |
| PERSPECTIVE 7 TEXTURE IMAGE | | PERSPECTIVE 8 TEXTURE IMAGE | |
| PERSPECTIVE 1 DEPTH MAP | PERSPECTIVE 2 DEPTH MAP | PERSPECTIVE 3 DEPTH MAP | PERSPECTIVE 4 DEPTH MAP |

FIG. 29

| PERSPECTIVE 1 TEXTURE IMAGE | PERSPECTIVE 2 TEXTURE IMAGE |
|---|---|
| PERSPECTIVE 3 TEXTURE IMAGE | PERSPECTIVE 4 TEXTURE IMAGE |

| PERSPECTIVE 1 DEPTH MAP | PERSPECTIVE 2 DEPTH MAP | PERSPECTIVE 3 DEPTH MAP | PERSPECTIVE 4 DEPTH MAP |
|---|---|---|---|

| PERSPECTIVE 5 TEXTURE IMAGE | PERSPECTIVE 6 TEXTURE IMAGE |
|---|---|
| PERSPECTIVE 7 TEXTURE IMAGE | PERSPECTIVE 8 TEXTURE IMAGE |

| PERSPECTIVE 5 DEPTH MAP | PERSPECTIVE 6 DEPTH MAP | PERSPECTIVE 7 DEPTH MAP | PERSPECTIVE 8 DEPTH MAP |
|---|---|---|---|

FIG. 30

| Perspective 1 Texture Image | Perspective 1 Depth Map | Perspective 2 Texture Image | Perspective 2 Depth Map |
|---|---|---|---|
| Perspective 3 Texture Image | Perspective 3 Depth Map | Perspective 4 Texture Image | Perspective 4 Depth Map |
| Perspective 5 Texture Image | Perspective 5 Depth Map | Perspective 6 Texture Image | Perspective 6 Depth Map |
| Perspective 7 Texture Image | Perspective 7 Depth Map | Perspective 8 Texture Image | Perspective 8 Depth Map |

FIG. 31

| Perspective 1 Texture Image | Perspective 1 Depth Map | Perspective 2 Texture Image | Perspective 2 Depth Map |
|---|---|---|---|
| Perspective 3 Depth Map | Perspective 3 Texture Image | Perspective 4 Depth Map | Perspective 4 Texture Image |
| Perspective 5 Texture Image | Perspective 5 Depth Map | Perspective 6 Texture Image | Perspective 6 Depth Map |
| Perspective 7 Depth Map | Perspective 7 Texture Image | Perspective 8 Depth Map | Perspective 8 Texture Image |

FIG. 32

| Image 1 Pixel 1 | Image 1 Pixel 2 | Image 1 Pixel 3 | Image 2 Pixel 1 | Image 2 Pixel 2 | Image 2 Pixel 3 |
|---|---|---|---|---|---|
| Image 1 Pixel 4 | Image 1 Pixel 5 | Image 1 Pixel 6 | Image 2 Pixel 4 | Image 2 Pixel 5 | Image 2 Pixel 6 |
| Image 1 Pixel 7 | Image 1 Pixel 8 | Image 1 Pixel 9 | Image 2 Pixel 7 | Image 2 Pixel 8 | Image 2 Pixel 9 |
| Image 1 Depth Value 1 | Image 1 Depth Value 2 | Image 1 Depth Value 3 | Image 2 Depth Value 1 | Image 2 Depth Value 2 | Image 2 Depth Value 3 |
| Image 1 Depth Value 4 | Image 1 Depth Value 5 | Image 1 Depth Value 6 | Image 2 Depth Value 4 | Image 2 Depth Value 5 | Image 2 Depth Value 6 |
| Image 1 Depth Value 7 | Image 1 Depth Value 8 | Image 1 Depth Value 9 | Image 2 Depth Value 7 | Image 2 Depth Value 8 | Image 2 Depth Value 9 |

FIG. 35

| Image 1 Pixel 1 | Image 1 Depth 1 | Image 1 Pixel 2 | Image 1 Depth 2 | Image 1 Pixel 3 | Image 1 Depth 3 |
|---|---|---|---|---|---|
| Image 1 Pixel 4 | Image 1 Depth 4 | Image 1 Pixel 5 | Image 1 Depth 5 | Image 1 Pixel 6 | Image 1 Depth 6 |
| Image 1 Pixel 7 | Image 1 Depth 7 | Image 1 Pixel 8 | Image 1 Depth 8 | Image 1 Pixel 9 | Image 1 Depth 9 |
| Image 2 Pixel 1 | Image 2 Depth 1 | Image 2 Pixel 2 | Image 2 Depth 2 | Image 2 Pixel 3 | Image 2 Depth 3 |
| Image 2 Pixel 4 | Image 2 Depth 4 | Image 2 Pixel 5 | Image 2 Depth 5 | Image 2 Pixel 6 | Image 2 Depth 6 |
| Image 2 Pixel 7 | Image 2 Depth 7 | Image 2 Pixel 8 | Image 2 Depth 8 | Image 2 Pixel 9 | Image 2 Depth 9 |

FIG. 36

IMAGE RECONSTRUCTION METHOD, SYSTEM, DEVICE AND COMPUTER-READABLE STORAGE MEDIUM

CROSS REFERENCE TO RELATED PATENT APPLICATIONS

This application claims priority to the following Chinese Patent Applications: (1) CN201910177941.5, filed on 7 Mar. 2019, entitled "Method, Apparatus, Terminal, Capturing System, and Device for Setting Capturing Devices", (2) CN201910172743.X, filed on 7 Mar. 2019, entitled "Method, Apparatus, Medium, and Device for Generating Multi-Angle Free-Perspective Image Data", (3) CN201910172727.0, filed on 7 Mar. 2019, entitled "Method, Apparatus, Medium, and Server for Generating Multi-angle Free-perspective Video Data", (4) CN201910172742.5, filed on 7 Mar. 2019, entitled "Method, Apparatus, Medium, Terminal, and Device for Processing Multi-Angle Free-Perspective Data", (5) CN201910172729.X, filed on 7 Mar. 2019, entitled "Method, Apparatus, Medium, Terminal, and Device for Multi-Angle Free-Perspective Interaction", (6) CN201910173415.1, filed on 7 Mar. 2019, entitled "Method, Apparatus, Medium, Terminal, and Device for Multi-Angle Free-Perspective Interaction", (7) CN201910173413.2, filed on 7 Mar. 2019, entitled "Method, Apparatus, Medium, and Device for Processing Multi-Angle Free-Perspective Image Data", (8) CN201910173414.7, filed on 7 Mar. 2019, entitled "Method, Apparatus, Medium, and Device for Processing Multi-Angle Free-Perspective Video Data", (9) CN201910172761.8, filed on 7 Mar. 2019, entitled "Video Generating Method, Apparatus, Medium, and Terminal", (10) CN201910172717.7, filed on 7 Mar. 2019, entitled "Video Reconstruction Method, System, Device, and Computer Readable Storage Medium", (11) CN201910172720.9, filed on 7 Mar. 2019, entitled "Image Reconstruction Method, System, Device, and Computer-Readable Storage Medium", which are all hereby incorporated by reference in their entirety.

TECHNICAL FIELD

Example embodiments of the present disclosure relate to the field of image processing technology, and in particular, to an image reconstruction method, system, device, and computer-readable storage medium.

BACKGROUND

With the continuous development of interconnection technologies, more and more video platforms continuously improve visual experience of user by providing videos with higher definition or viewing smoothness.

However, for videos with a strong sense of live experience, such as the image of a basketball game, the user often can only watch the game through one viewpoint position during viewing, and cannot switch the viewpoint position freely to view the game picture or game process at different perspective positions.

The 6 degrees of freedom (6DoF) technology is a technology for providing a high degree of freedom of the viewing experience. The user may adjust the perspective of viewing with interactive measures, so as to view from a desired free viewpoint angle. Thus, the viewing experience may be significantly enhanced. When the 6DoF image is viewed at any moment of the process, the user may choose to pause the video, so that the user may stay in this wonderful moment to have 6DoF free-perspective experience.

In order to realize 6DoF images, there are currently Free-D playback technology and light field rendering technology. The Free-D playback technology expresses 6DoF images through the point cloud. The point cloud expresses and stores the three-dimensional positions and pixel information of all points in space. The light field rendering technology establishes the light field database of the scenario through a set of pre-shot scenario photos under the condition that the content does not require depth information or association of the image. Then, for any given new viewpoint, the view of the viewpoint is obtained through resampling and bilinear interpolation operations, so as to achieve the roaming of the entire scenario.

However, both the Free-D playback technology and the light field rendering technology require a very large amount of data operation. In addition, currently, there is no good standard or industrial software and hardware supporting the compression of the point cloud, which is not conducive to be promoted and popularized.

SUMMARY

This Summary is provided to introduce a selection of implementations in a simplified form that are further described below in Detailed Description. This Summary is not intended to identify all features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above, example embodiments of the present disclosure provide an image reconstruction method, system, device, and computer-readable storage medium to reduce the amount of data operation during the multi-degree-of-freedom image reconstruction.

In one aspect, example embodiments of the present disclosure provide an image reconstruction method. The method includes acquiring a multi-angle free-perspective image combination, parameter data of the image combination, and virtual viewpoint position information based on user interaction, wherein the image combination includes multiple groups of texture images and depth maps that are synchronized at multiple angles and have corresponding relationships; selecting a corresponding group of texture images and depth maps in the image combination at a user interaction moment based on a preset rule according to the virtual viewpoint position information and the parameter data of the image combination; and combining and rendering the selected corresponding group of texture images and depth maps in the image combination at the user interaction moment based on the virtual viewpoint position information and parameter data corresponding to the corresponding group of texture images and depth maps in the image combination at the user interaction moment, to obtain a reconstructed image corresponding to the virtual viewpoint position at the user interaction moment.

In an example embodiment, selecting the corresponding group of texture images and depth maps data in the image combination at the user interaction moment based on the preset rule according to the virtual viewpoint position information and the parameter data of the image combination includes: selecting the corresponding group of texture images and the depth maps in the image combination at the user interaction moment that satisfies a preset positional relationship and/or a preset quantitative relationship with the virtual viewpoint position according to the virtual viewpoint position information and the parameter data of the image combination.

In an example embodiment, selecting the corresponding group of texture images and the depth maps in the image combination at the user interaction moment that satisfies the preset positional relationship and/or the preset quantitative relationship with the virtual viewpoint position according to the virtual viewpoint position information and the parameter data of the image combination includes: selecting a preset number of corresponding groups of texture images and the depth maps that are closest to the virtual viewpoint position in the image combination at the user interaction moment according to the virtual viewpoint position information and the parameter data of the image combination.

In an example embodiment, combining and rendering the selected corresponding group of texture images and depth maps in the image combination at the user interaction moment based on the virtual viewpoint position information and parameter data corresponding to the corresponding group of texture images and depth maps in the image combination at the user interaction moment to obtain the reconstructed image corresponding to the virtual viewpoint position at the user interaction moment comprises: respectively projecting the depth maps of the corresponding group in the image combination at the user interaction moment to the virtual viewpoint position at the user interaction moment according to a spatial geometric relationship, to form a depth map of the virtual viewpoint position; and copying from pixel points in the texture images of the corresponding group to generated virtual texture images corresponding to the virtual viewpoint position according to the projected depth maps, to form the virtual texture images corresponding to the corresponding group in the image combination at the user interaction moment; and fusing the virtual texture images corresponding to the corresponding group in the image combination at the user interaction moment.

In an example embodiment, fusing the virtual texture images corresponding to the corresponding group in the image combination at the user interaction moment to obtain the reconstructed image of the virtual viewpoint position at the user interaction moment comprises: performing weighting processing on pixels in corresponding positions in the virtual texture images corresponding to respective corresponding groups in the image combination at the user interaction moment, to obtain pixel values of the corresponding positions in the reconstructed image of the virtual viewpoint position at the user interaction moment; and for a position where a pixel value is zero in the reconstructed image of the virtual viewpoint position at the user interaction moment, performing inpainting using pixels around the pixel in the reconstructed image, to obtain the reconstructed image of the virtual viewpoint position at the user interaction moment.

In an example embodiment, wherein fusing the virtual texture images corresponding to the corresponding group in the image combination at the user interaction moment to obtain the reconstructed image of the virtual viewpoint position at the user interaction moment comprises: for a position where a pixel value is zero in the virtual texture images corresponding to respective corresponding groups in the image combination at the user interaction moment, performing inpainting using around pixel values respectively; and performing weighting processing on pixel values in corresponding positions in the virtual texture images corresponding to the respective corresponding groups after the inpainting, to obtain the reconstructed image of the virtual viewpoint position at the user interaction moment.

On another aspect, example embodiments of the present disclosure provide an image reconstruction system. The system includes: an acquiring unit, adapted to acquire multiple-angle free-perspective image combination, parameter data of the image combination, and the virtual viewpoint position information based on user interaction, where the image combination includes multiple groups of texture images and the depth maps that are synchronized at multiple angles and have corresponding relationships; a selecting unit, adapted to select a corresponding group of texture images and the depth maps in the image combination at the user interaction moment based on a preset rule according to the virtual viewpoint position information and the parameter data of the image combination; and an image reconstruction unit, adapted to combine and render the selected corresponding group of texture images and depth maps in the image combination at the user interaction moment based on the virtual viewpoint position information and parameter data corresponding to the corresponding group of texture images and depth maps in the image combination at the user interaction moment, to obtain a reconstructed image corresponding to the virtual viewpoint position at the user interaction moment.

Example embodiments of the present disclosure further provide an image reconstruction device, including a memory and a processor. The memory stores computer instructions thereon that can run on the processor. When the processor runs the computer instructions, the processor performs the steps of the image reconstruction method according to any one of the above example embodiments.

In an example embodiment, the image reconstruction device includes at least one of a terminal device and an edge node.

Example embodiments of the present disclosure further provide a computer-readable storage medium having computer instructions stored thereon. When the computer instructions are executed, steps of the image reconstruction method of any one of the above example embodiments are performed.

With the image reconstruction methods in the example embodiments of the present disclosure, by acquiring a multi-angle free-perspective image combination, parameter data of the image combination, and virtual viewpoint position information based on user interaction, wherein the image combination includes multiple groups of texture images and depth maps that are synchronized at multiple angles and have corresponding relationships; and selecting a corresponding group of texture images and depth maps in the image combination at a user interaction moment based on a preset rule according to the virtual viewpoint position information and the parameter data of the image combination; and next, it is only necessary to combine and render the selected corresponding group of texture images and depth maps in the image combination at the user interaction moment based on the virtual viewpoint position information and parameter data corresponding to the corresponding group of texture images and depth maps in the image combination at the user interaction moment. There is no need to perform image reconstruction based on the texture maps and depth maps of all groups in the image combination. Thus, the amount of data operation during the image reconstruction may be reduced.

Further, the corresponding group of texture images and the depth maps in the image combination at the user interaction moment that satisfies a preset positional relationship and/or a preset quantitative relationship with the virtual viewpoint position is selected according to the virtual viewpoint position information and the parameter data of the image combination. Thus, a higher degree of freedom and flexibility of selection may be provided in the case of reducing the amount of data operation and ensuring the quality of the reconstructed image. In addition, installation requirements for the shooting devices that capture images are also lowered, thereby facilitating the adaption to different site requirements and easy operation of installation.

Further, a preset number of corresponding groups of texture images and the depth maps that are closest to the virtual viewpoint position in the image combination at the user interaction moment is selected according to the virtual viewpoint position information and the parameter data of the image combination. Thus, the amount of data operation may be reduced and the reconstructed image quality may be guaranteed.

Further, texture images and depth maps corresponding to 2 to N capturing devices closest to the virtual viewpoint position are selected according to the virtual viewpoint position information and the parameter data corresponding to the corresponding group of texture images and depth maps in the image combination at the user interaction moment, where N is the number of all capturing devices that capture the image combination. Thus, texture images and corresponding depth maps captured by multiple capturing devices that are closest to the virtual viewpoint position may be selected according to needs. Thus, the reconstructed image that satisfies the definition requirements may be obtained with as little data as possible. Meanwhile, transmission resources may also be saved.

Further, performing forward projection on the selected depth maps of the corresponding group in the image combination at the user interaction moment respectively, to project to the virtual position at the user interaction moment; performing post-processing on the depth maps after the forward projection respectively; next, performing backward projection on the selected texture images of the corresponding group in the image combination at the user interaction moment respectively; and fusing respective virtual texture images generated after the backward projection. After the above processing, the reconstructed image of the image combination at the user interaction moment. Because merely some of the texture images and depth maps in the image combination are used to perform the reconstruction, and the used multi-angle free-perspective image data of the image combination including texture images and depth maps occupies a relatively low data amount, processing resources may be saved and video reconstruction efficiency may be improved.

Further, inpainting is performed on the fused texture image to obtain the reconstructed image corresponding to the virtual viewpoint position at the user interaction moment. The reconstructed image quality may be improved.

Further, during the post-processing of the depth map after the forward projection, by performing foreground padding processing on the depth maps after the forward projection respectively, and/or performing pixel-level filtering processing on the depth maps after the forward projection respectively, the quality of the reconstructed depth map may be improved.

Further, fusing the respective virtual texture images generated after the backward projection using a global weight determined by a distance between the virtual viewpoint position and a position of a capturing device that captures a corresponding texture image in the image combination, according to the virtual viewpoint position information and the parameter data corresponding to the corresponding group of texture images and depth maps in the image combination at the user interaction moment, may make the reconstructed image more real, and further improve the quality of the reconstructed image.

Further, by performing the image reconstruction using the methods of the example embodiments of the disclosure after decoding acquired compressed multi-angle free-perspective image data, network transmission resources may be further saved. Moreover, the compression may also be performed in the general compression manner with the compression software and hardware. Thus, the method is conducive to be promoted and popularized.

Further, the image reconstruction solutions in the example embodiments of the present disclosure are applied to devices such as terminal devices, edge node devices, and the like, and may be adapted to devices with limited computing capabilities such as terminal devices, edge node devices, and the like, to satisfy the needs of the user for viewing images based on the virtual viewpoint, and enhance the user's visual experience.

BRIEF DESCRIPTION OF THE DRAWINGS

In order to illustrate the example embodiments of the present disclosure more clearly, the drawings used in the description of the example embodiments will be briefly introduced below. Apparently, the drawings in the following description represent some of the example embodiments of the present disclosure, and other drawings may be obtained from these drawings by those skilled in the art without any creative efforts.

FIG. 20 is a schematic diagram of distribution positions of the pixel data and the depth data of a single image in an example embodiment of the present disclosure;

FIG. 21 is a schematic diagram of distribution positions of the pixel data and the depth data of another single image in an example embodiment of the present disclosure;

FIG. 24 is a schematic diagram of distribution positions of the pixel data and the depth data of another image in an example embodiment of the present disclosure;

FIG. 25 is a schematic diagram of distribution positions of the pixel data and the depth data of another image in an example embodiment of the present disclosure;

FIG. 27 is a schematic diagram of a structure of a stitched image in an example embodiment of the present disclosure;

FIG. 28 is a schematic diagram of another structure of a stitched image in an example embodiment of the present disclosure;

FIG. 29 is a schematic diagram of another structure of a stitched image in an example embodiment of the present disclosure;

FIG. 30 is a schematic diagram of another structure of a stitched image in an example embodiment of the present disclosure;

FIG. 31 is a schematic diagram of another structure of a stitched image in an example embodiment of the present disclosure;

FIG. 32 is a schematic diagram of another structure of a stitched image in an example embodiment of the present disclosure;

FIG. 35 is a schematic diagram of data storage in a stitched image in an example embodiment of the present disclosure;

FIG. 36 is a schematic diagram of another data storage in a stitched image in an example embodiment of the present disclosure;

DETAILED DESCRIPTION

Figure 1:
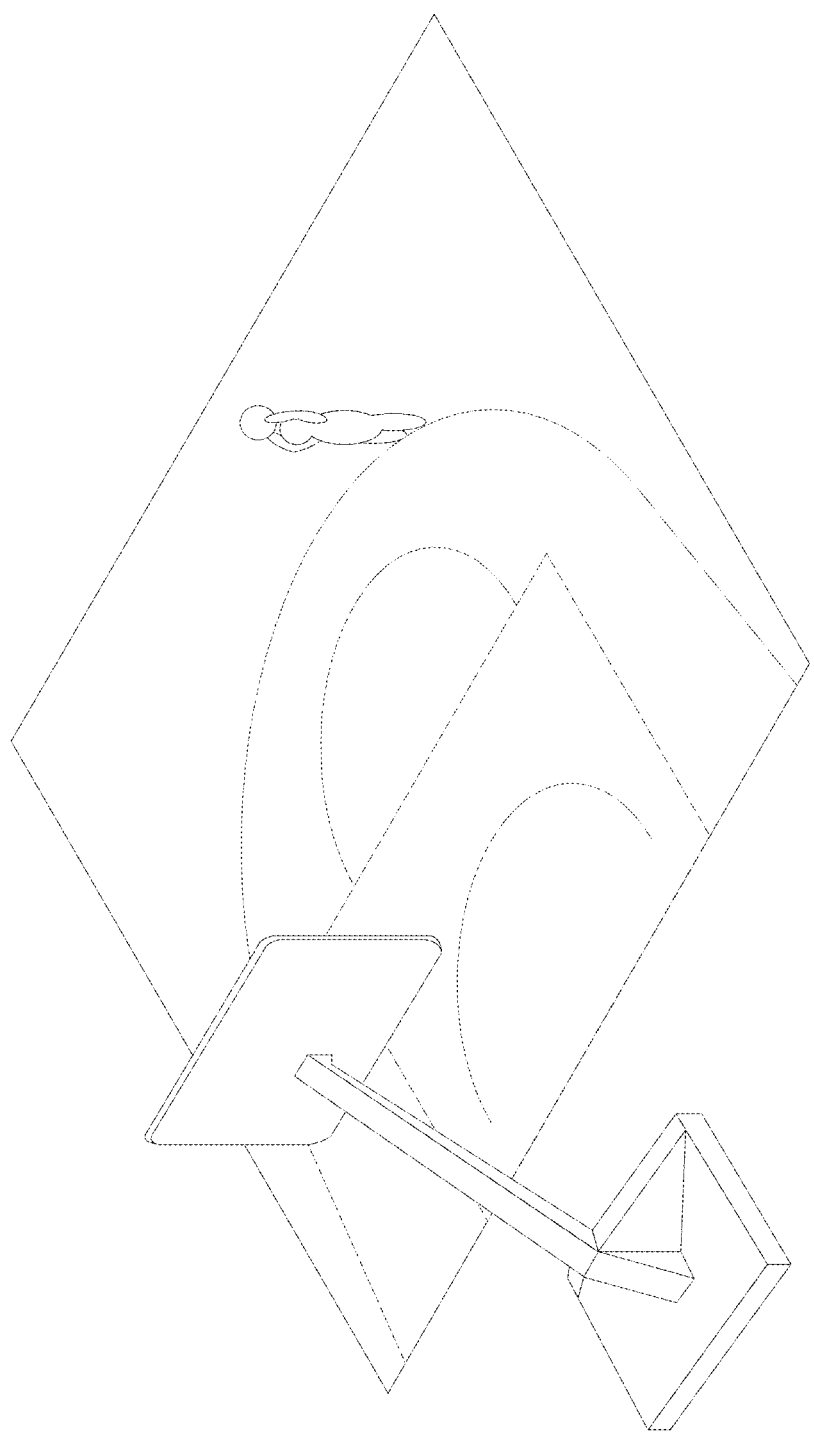
FIG. 1 is a schematic diagram of a to-be-viewed area in an example embodiment of the present disclosure.

To enable a person of ordinary skill in the art to better understand the solutions of the present disclosure, hereinafter, technical solutions in the example embodiments of the present disclosure will be clearly and thoroughly described with reference to the accompanying drawings in the example embodiments of the present disclosure. Example embodiments described herein merely represent some of the example embodiments of the present disclosure. Other example embodiments obtained by a person of ordinary skill in the art based on the example embodiments of the present disclosure without making creative efforts should fall within the scope of the present disclosure.

As described above, currently, in order to achieve the multi-degree-of-freedom image, a large amount of data operation is required. For example, in the manner of expressing the multi-degree-of-freedom image with the point cloud, since the point cloud expresses and stores the three-dimensional positions and pixel information of all points in space, a very large storage capacity is required. Accordingly, during the image reconstruction process, a very large amount of data operation is required. With the above image reconstruction method, if the image reconstruction is performed on the cloud, a great amount of pressure of processing will be put on the reconstruction device on the cloud. If the image reconstruction is performed on the terminal, since the terminal has limited processing capability, it is difficult for the terminal to handle such a large amount of data. In addition, currently, there is no good standard or industrial software and hardware supporting the compression of the point cloud, which is not conducive to be promoted and popularized.

For the above technical problems, example embodiments of the present disclosure provide a solution, where by acquiring a multi-angle free-perspective image combination, parameter data of the image combination, and virtual viewpoint position information based on user interaction, where the image combination includes multiple groups of texture images and depth maps that are synchronized at multiple angles and have corresponding relationships; and next selecting a corresponding group of texture images and depth maps in the image combination at a user interaction moment based on a preset rule according to the virtual viewpoint position information and the parameter data of the image combination; and combining and rendering the selected corresponding group of texture images and depth maps in the image combination at the user interaction moment based on the virtual viewpoint position information and parameter data corresponding to the corresponding group of texture images and depth maps in the image combination at the user interaction moment, the reconstructed image of the image combination at the user interaction moment may be obtained. Because the entire image reconstruction process only need to combine and render the selected corresponding group of texture images and depth maps in the image combination at the user interaction moment based on the virtual viewpoint position information and parameter data corresponding to the corresponding group of texture images and depth maps in the image combination at the user interaction moment, there is no need to perform image reconstruction based on the texture maps and depth maps of all groups in the image combination. Thus, the amount of data operation during the image reconstruction may be reduced.

In order to make the above objectives, features, and beneficial effects of the present disclosure more comprehensible, specific example embodiments of the present disclosure will be described in detail hereinafter with reference to the accompanying drawings.

In the example embodiments of the present disclosure, video compression data or image data may be acquired through capturing devices. In order to enable those skilled in the art to better understand and implement the example embodiments of the present disclosure, hereinafter, specific application scenarios are used for description.

Figure 39:
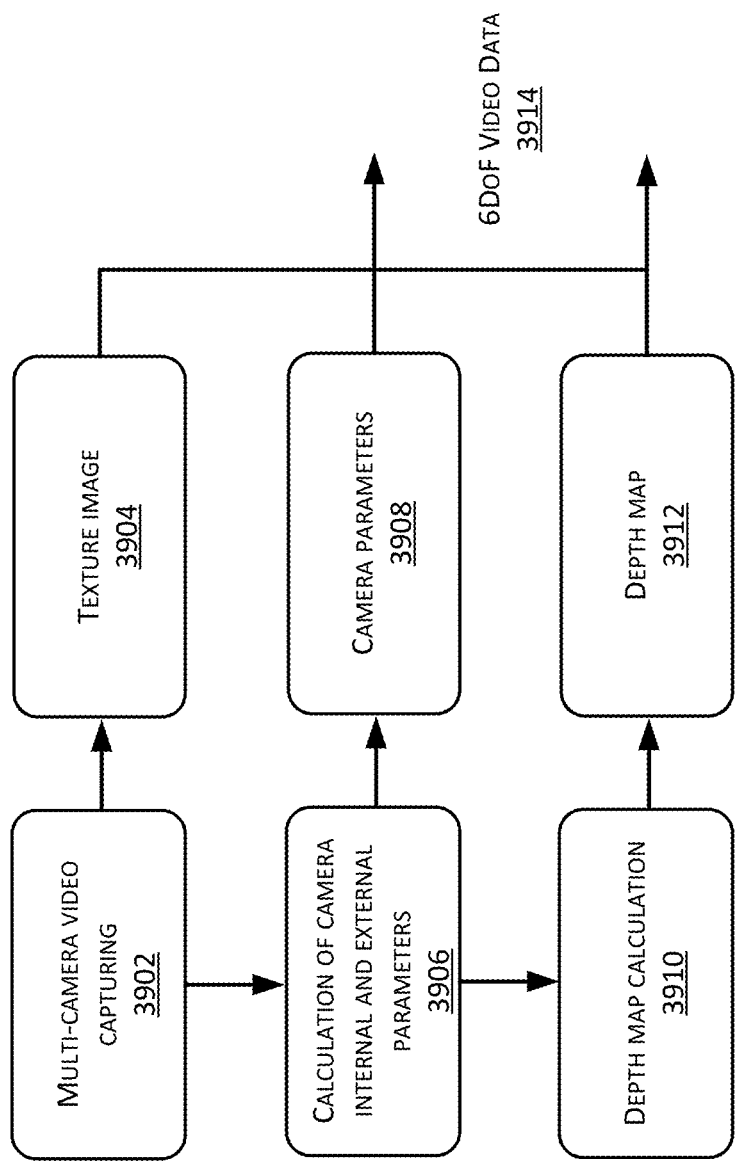
FIG. 39 is a schematic diagram of a process for generating multi-angle free-perspective data in an example embodiment of the present disclosure.

As an example embodiment of the present disclosure, the following steps may be included. The first step is capturing and depth map calculation, including three main steps, which respectively are multi-camera video capturing, camera internal and external parameter calculation (camera parameter estimation), and depth map calculation. For multi-camera capturing, the videos captured by respective cameras are required to be aligned at the frame level. Referring to FIG. 39, through the multi-camera video capturing at 3902, a texture image may be obtained at 3904, i.e., the multiple synchronized images as described hereinafter. Through the calculation of camera internal and external parameters at 3906, camera parameters 3908 (i.e., the parameter data hereinafter) may be obtained, including internal parameter data and external parameter data as described hereinafter. Through the depth map calculation at 3910, a depth map may be obtained at 3912.

Figure 40:
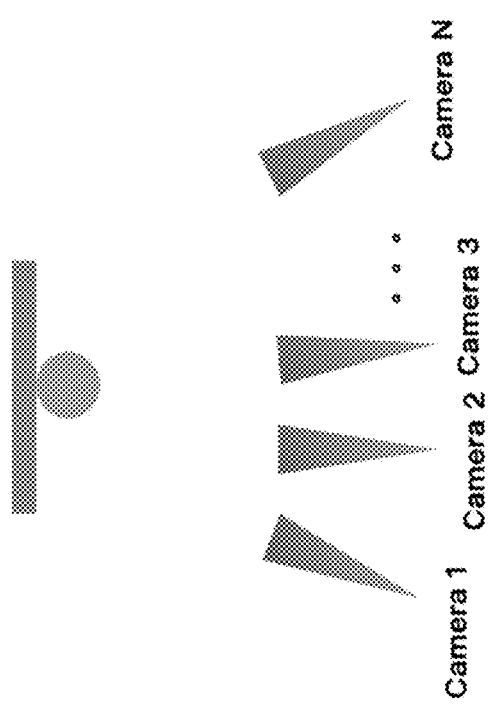
FIG. 40 is a schematic diagram of a multi-camera 6DoF capturing system in an example embodiment of the present disclosure.

In this solution, no special camera, such as a light field camera, is required to capture the video. Similarly, no complicated camera calibration is required before capturing. Positions of multiple cameras may be laid out and arranged to better capture the objects or scenarios that need to be captured. Referring to FIG. 40, multiple capturing devices, such as camera 1 to camera N, may be set in the to-be-viewed area.

After the above three steps are processed, the texture image captured from multiple cameras, all camera parameters, and the depth map of each camera are obtained. These three pieces of data may be referred to as data files in multi-angle free-perspective video data, and may also be referred to as 6 degrees of freedom video data (6DoF video data) 3914. Because of these pieces of data, the user terminal may generate a virtual viewpoint based on the virtual 6 degrees of freedom (DoF) position, thereby providing a 6DoF video experience.

Figure 41:
FIG. 41 is a schematic diagram of generating and processing of 6DoF video data in an example embodiment of the present disclosure.

Referring to FIG. 41, 6DoF video data and indicative data (metadata) at 4102 may be compressed and transmitted to the user side at 4104. The user side may obtain the user-side 6DoF expression at 4106 according to the received data, i.e., the above 6DoF video data and metadata, so as to perform 6DoF rendering on the user side, where the indicative data may also be referred to as metadata.

Figure 42:
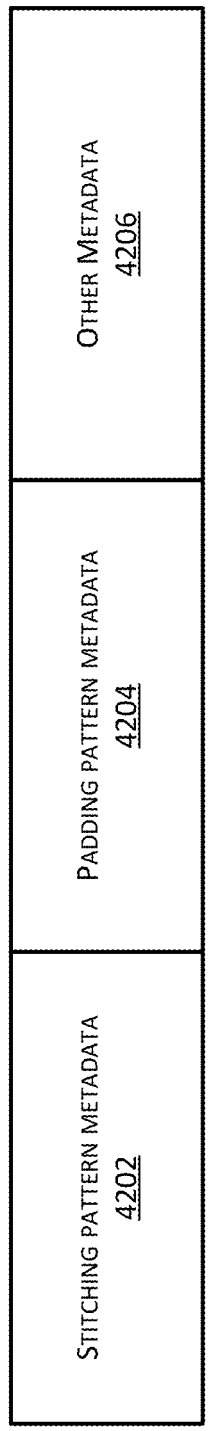
FIG. 42 is a structural schematic diagram of the data header file in an example embodiment of the present disclosure.
Figure 44:
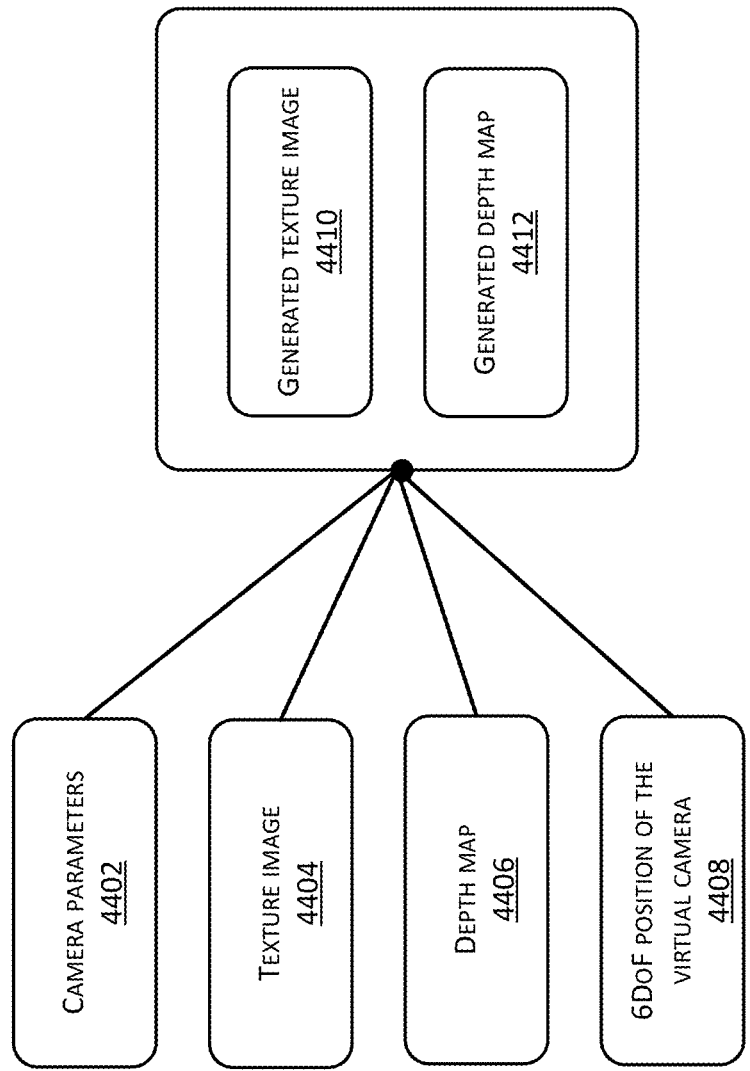
FIG. 44 is a schematic diagram of input and output of an image reconstruction system in an example embodiment of the present disclosure.

Referring to FIG. 42, metadata may be used to describe the data pattern of 6DoF video data, which may include stitching pattern metadata 4202, which is used to indicate storage rules of the pixel data and the depth data of multiple images in the stitched image; padding pattern metadata 4204, which may be used to indicate the padding pattern in the stitched image; and other metadata 4206. The metadata may be stored in the data header file, and the storage order may be as shown in FIG. 44, or may be other orders.

Figure 43:
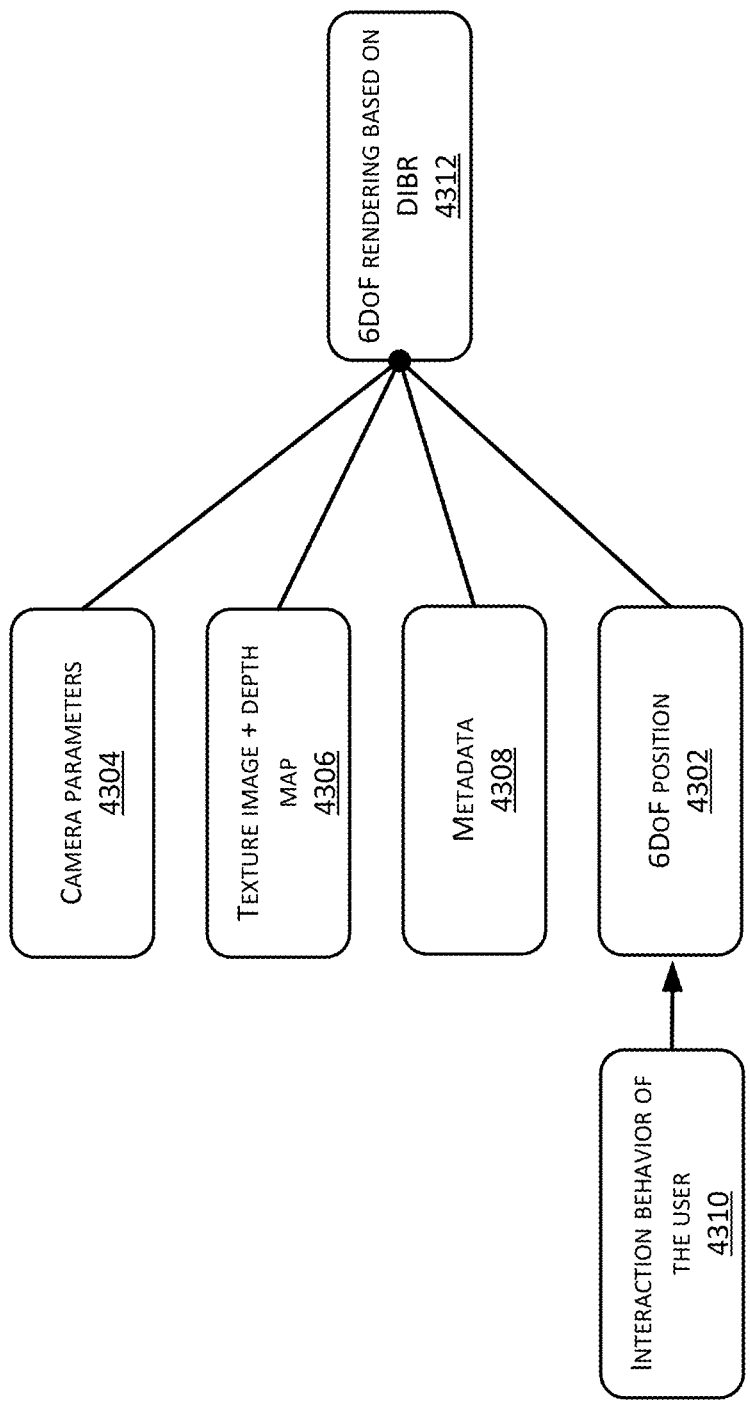
FIG. 43 is a schematic diagram of 6DoF video data processing on the user side in an example embodiment of the present disclosure.

Referring to FIG. 43, the user terminal obtains 6DoF video data, which includes 6DoF position 4302, camera parameters 4304, the texture image and the depth map 4306, and descriptive metadata (i.e., the metadata described above) 4308, in addition, interaction behavior data of the user terminal 4310. With these pieces of data, the user may use 6DoF rendering based on depth map-based rendering (DIBR) 4312 to generate the virtual viewpoint image at the specific 6DoF position generated according to the user behavior, that is, to determine the virtual viewpoint of the 6DoF position corresponding to the instruction according to the user instruction.

In an example embodiment implemented during a test, each test example includes 20 seconds of video data. The video data is 30 frames/second with a resolution of 1920*1080. For any one of the 30 cameras, there are 600 frames of data in total. The main folder includes the texture image folder and the depth map folder. Under the texture image folder, the secondary directories from 0 to 599 may be found. These secondary directories respectively represent 600 frames of content corresponding to the 20-second video. Each secondary directory includes texture images captured by 30 cameras, named from 0.yuv to 29.yuv in the format of yuv420. Accordingly, in the depth map folder, each secondary directory includes 30 depth maps calculated by the depth estimation algorithm. Each depth map corresponds to the texture image with the same name. The texture images and corresponding depth maps of multiple cameras belong to a certain frame moment in the 20-second video.

All depth maps in the test example are generated by a preset depth estimation algorithm. In the test, these depth maps may provide good virtual viewpoint reconstruction quality at the virtual 6DoF position. In one case, a reconstructed image of the virtual viewpoint may be generated directly from the given depth maps. Alternatively, the depth map may also be generated or improved by the depth calculation algorithm based on the original texture image.

In addition to the depth map and the texture image, the test example also includes a .sfm file, which is used to describe the parameters of all 30 cameras. The data of the .sfm file is written in binary format. The data format is described hereinafter. Considering the adaptability to different cameras, a fisheye camera model with distortion parameters was used in the test. How to read and use camera parameter data from the file may be understood with reference to DIBR reference software provided by us. The camera parameter data includes the following fields:

(1) krt_R is the rotation matrix of the camera;
(2) krt_cc is the optical center position of the camera;
(3) krt_WorldPosition is the three-dimensional space coordinate of the camera;
(4) krt_kc is the distortion coefficient of the camera;
(5) src_width is the width of the calibration image;
(6) src_height is the height of the calibration image; and
(7) fisheye_radius and lens_fov are parameters of the fisheye camera.

In the technical solution implemented by the present disclosure, the user may find the detailed code of how to read the corresponding parameters in the .sfm file from the preset parameter reading function (set_sfm_parameters function).

In video reconstruction system or DIBR software used by the example embodiments of the present disclosure, camera parameters, the texture image, the depth map, and the 6DoF position of the virtual camera are received as inputs, and the generated texture image and depth map at the virtual 6DoF position are output at the same time. The 6DoF position of the virtual camera is the above 6DoF position determined according to user behavior. The DIBR software may be the software that implements image reconstruction based on the virtual viewpoint in the example embodiments of the present disclosure.

Referring to FIG. 44, in a DIBR software used by the example embodiments of the present disclosure, camera parameters 4402, the texture image 4404, the depth map 4406, and the 6DoF position of the virtual camera 4408 may be received as inputs, and generated texture image 4410 and generated depth map 4412 at the virtual 6DoF position are output at the same time.

Figure 45:
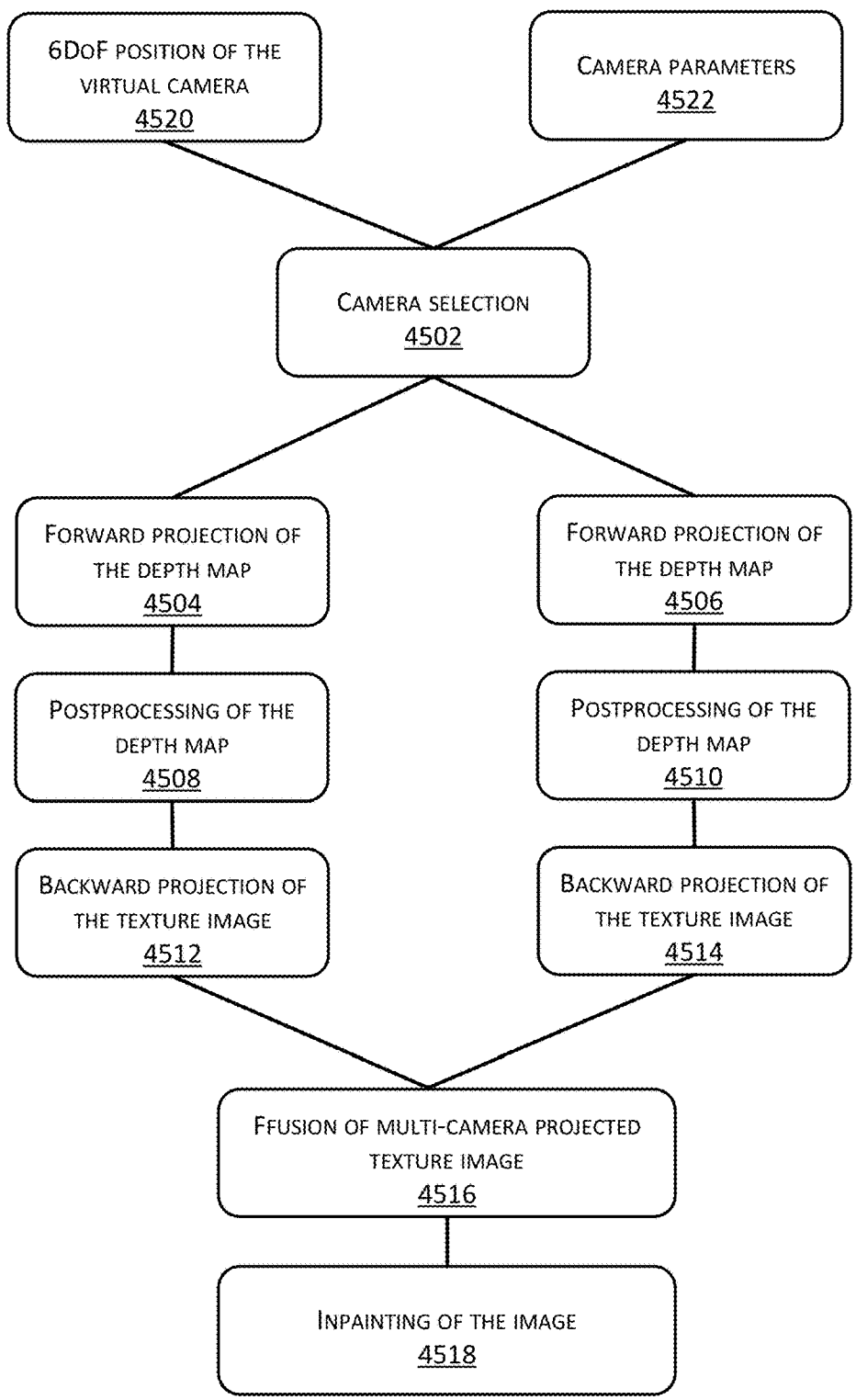
FIG. 45 is a schematic diagram of an implementation architecture of an image reconstruction method in an example embodiment of the present disclosure.

Referring to FIG. 45, the image reconstruction methods implemented in the example embodiments of the present disclosure, or the software that can implement image reconstruction in the example embodiments of the present disclosure may include some or all of the following processing steps: camera selection 4502, forward projection of the depth map 4504 and 4506, postprocessing of the depth map 4508 and 4510, backward projection of the texture image 4512 and 4514, fusion of multi-camera projected texture image 4516, and inpainting of the image 4518.

In the above DIBR software, two cameras closest to the virtual 6DoF position may be selected by default to generate the virtual viewpoint.

In the postprocessing step of the depth map, the quality of the depth map may be improved by various methods, such as foreground padding, pixel-level filtering, and the like.

For the output generated image, a method for fusing texture images from two cameras is used. The fusion weight is a global weight and is determined by the distance of the position of the virtual viewpoint from the position of the reference camera. When the pixel of the output virtual viewpoint image is projected to only one camera, the projected pixel may be directly used as the value of the output pixel.

After the fusion step, if there are still hollow pixels that have not been projected to, an inpainting method may be used to fill the hollow pixels.

For the output depth map, for the convenience of error and analysis, a depth map obtained by projecting from one of the cameras to the position of the virtual viewpoint may be used as the output.

Additionally, 6DoF position of the virtual camera 4520 and camera parameters 4522 may be used as the input for the camera selection step 4502.

Those skilled in the art may understand that the above example embodiments are merely examples and are not limitations on the implementation manners. The technical solutions in the example embodiments of the present disclosure will be further described hereinafter.

Referring to the schematic diagram of the to-be-viewed area as shown in FIG. 1, the to-be-viewed area may be a basketball court, and multiple capturing devices may be provided to perform data capturing on the to-be-viewed area.

Figure 2:
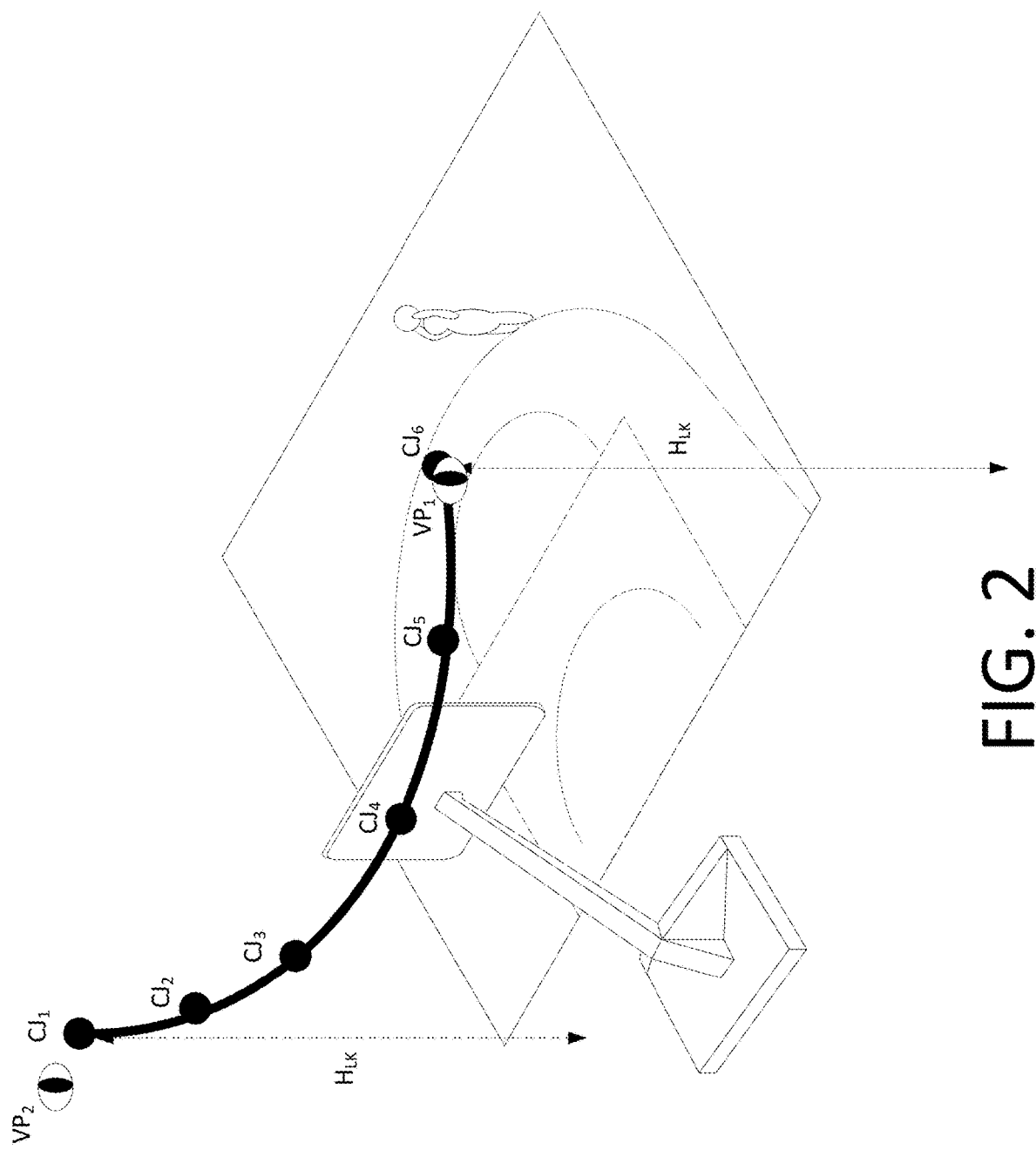
FIG. 2 is a schematic diagram of a setting method of capturing devices in an example embodiment of the present disclosure.

For example, referring to FIG. 2, several capturing devices may be set along a certain path at a height $H_{LK}$ higher than the hoop. For example, six capturing devices may be set along the arc, i.e., the capturing devices $CJ_1$ to $CJ_6$. Those skilled in the art may understand that the setting position, number, and supporting manners of the capturing devices may be various, and there is no limitation herein.

The capturing device may be a camera or a video camera capable of synchronous shooting, for example, a camera or a video camera capable of synchronous shooting through a hardware synchronization line. With multiple capturing devices capturing data in the to-be-viewed area, multiple images or video streams in synchronization may be obtained. According to the video streams captured by multiple capturing devices, multiple synchronized frame images may also be obtained as multiple synchronized images. Those skilled in the art may understand that, ideally, the term synchronization refers to corresponding to the same moment, but the existence of errors and deviations may also be tolerated.

Figure 3:
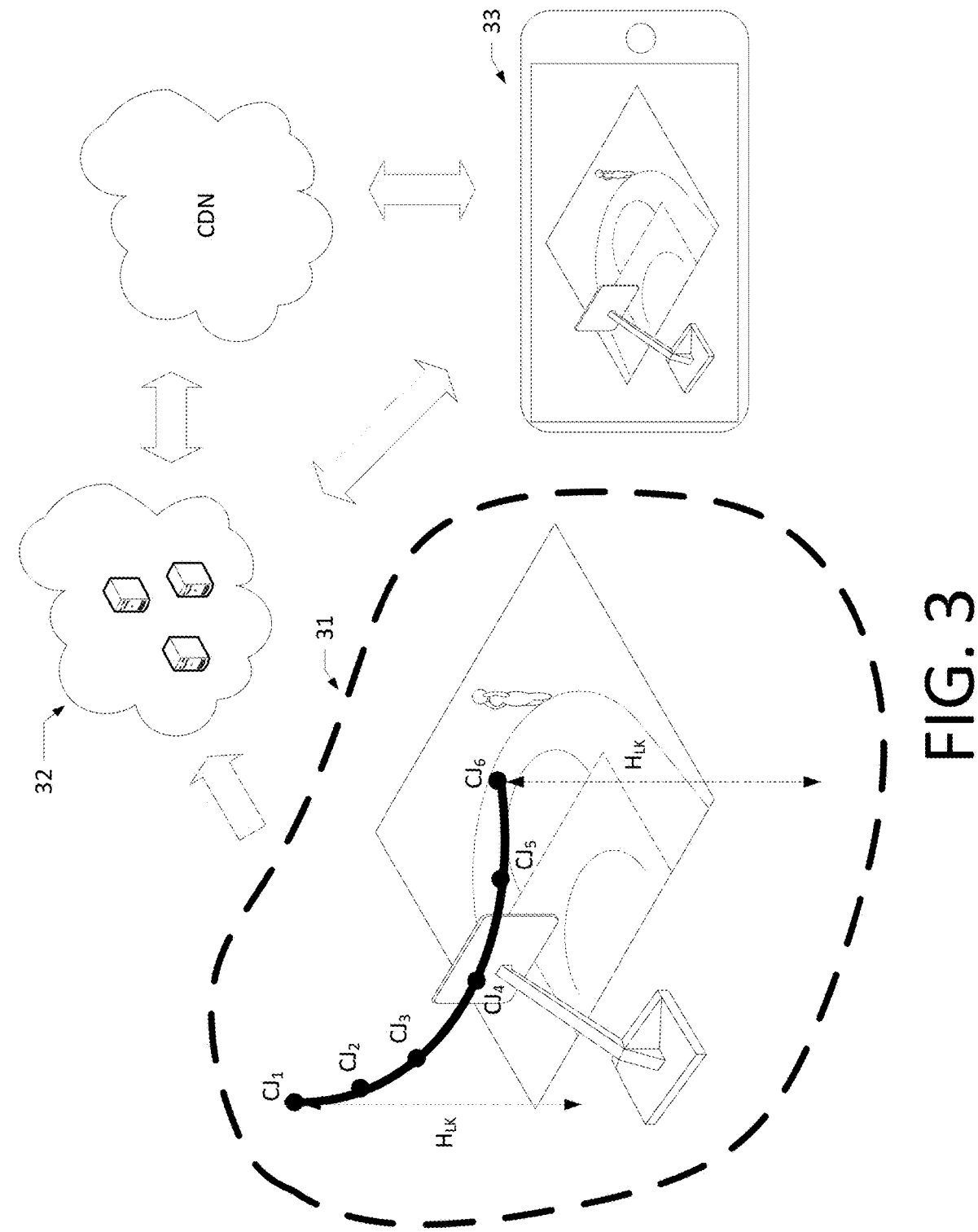
FIG. 3 is a schematic diagram of a multi-angle free-perspective display system in an example embodiment of the present disclosure.

Referring to FIG. 3, in the example embodiments of the present disclosure, data may be captured in the to-be-viewed area through the capturing system 31 including multiple capturing devices. The acquired multiple synchronized images may be processed by the capturing system 31 or the server 32 to generate multi-angle free-perspective data which is capable of supporting the device 33 that performs displaying to perform virtual viewpoint switching. The device 33 that performs displaying may display the reconstructed image generated based on the multi-angle free-perspective data. The reconstructed image corresponds to the virtual viewpoint. According to the user instruction, reconstructed images corresponding to different virtual viewpoints may be displayed, and the viewing position and viewing angle may be switched.

In implementations, the process of performing video reconstruction or image reconstruction to obtain a reconstructed image may be implemented by the device 33 that performs displaying, or may be implemented by a device located on a Content Delivery Network (CDN) in an edge computing manner. Those skilled in the art may understand that FIG. 3 is merely an example, and is not a limitation on the capturing system, the server, the device that performs displaying, and the implementation manner.

The process of video reconstruction based on multi-angle free-perspective data will be described in detail hereinafter with reference to FIG. 38 and FIG. 39 and will not be repeated herein.

Figure 4:
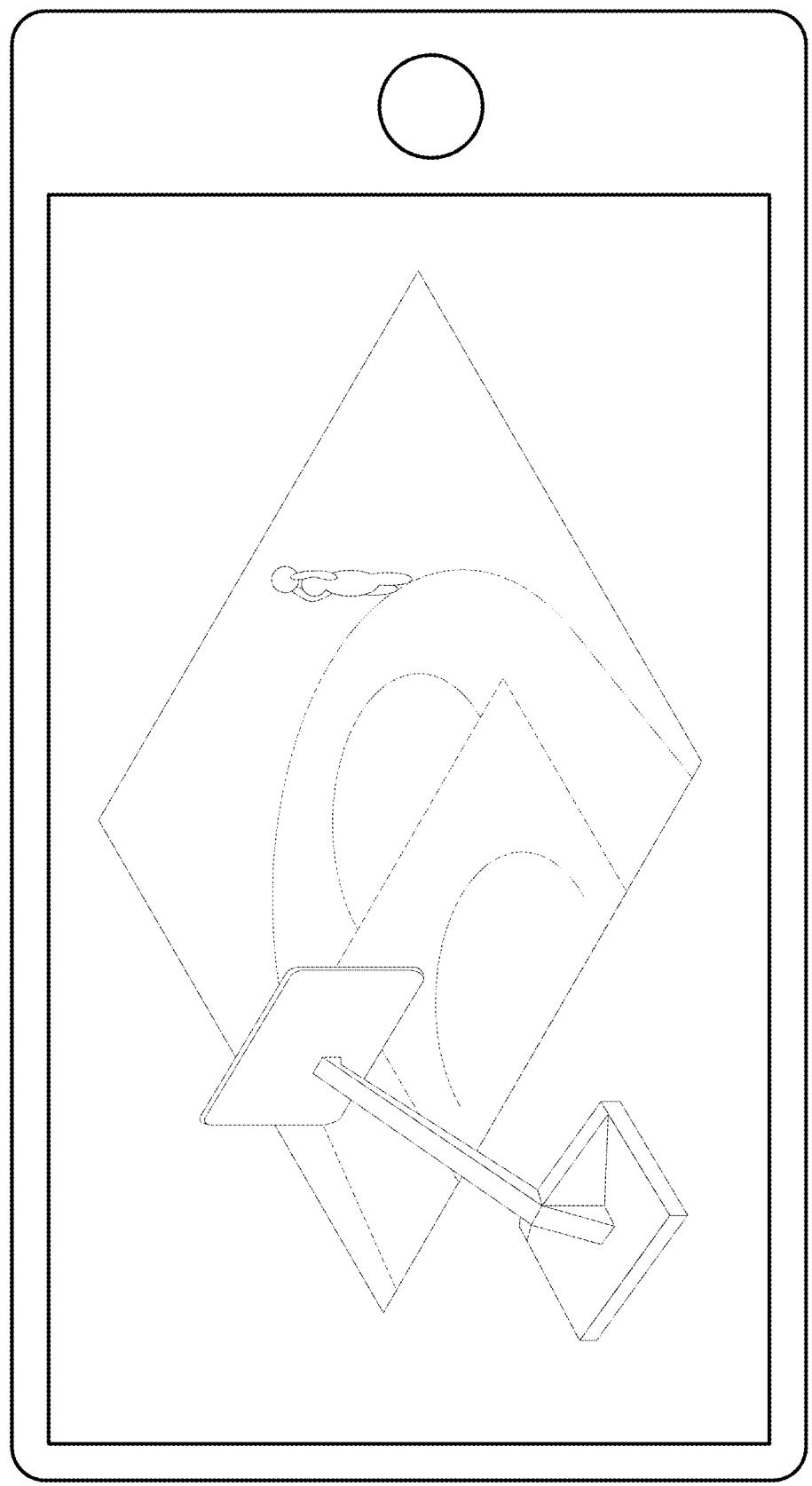
FIG. 4 is a schematic diagram of a display of a device in an example embodiment of the present disclosure.

Referring to FIG. 4, following the previous example, the user may watch the to-be-viewed area through the device that performs displaying. In this example embodiment, the to-be-viewed area is a basketball court. As described above, the viewing position and viewing angle may be switched.

Figure 5:
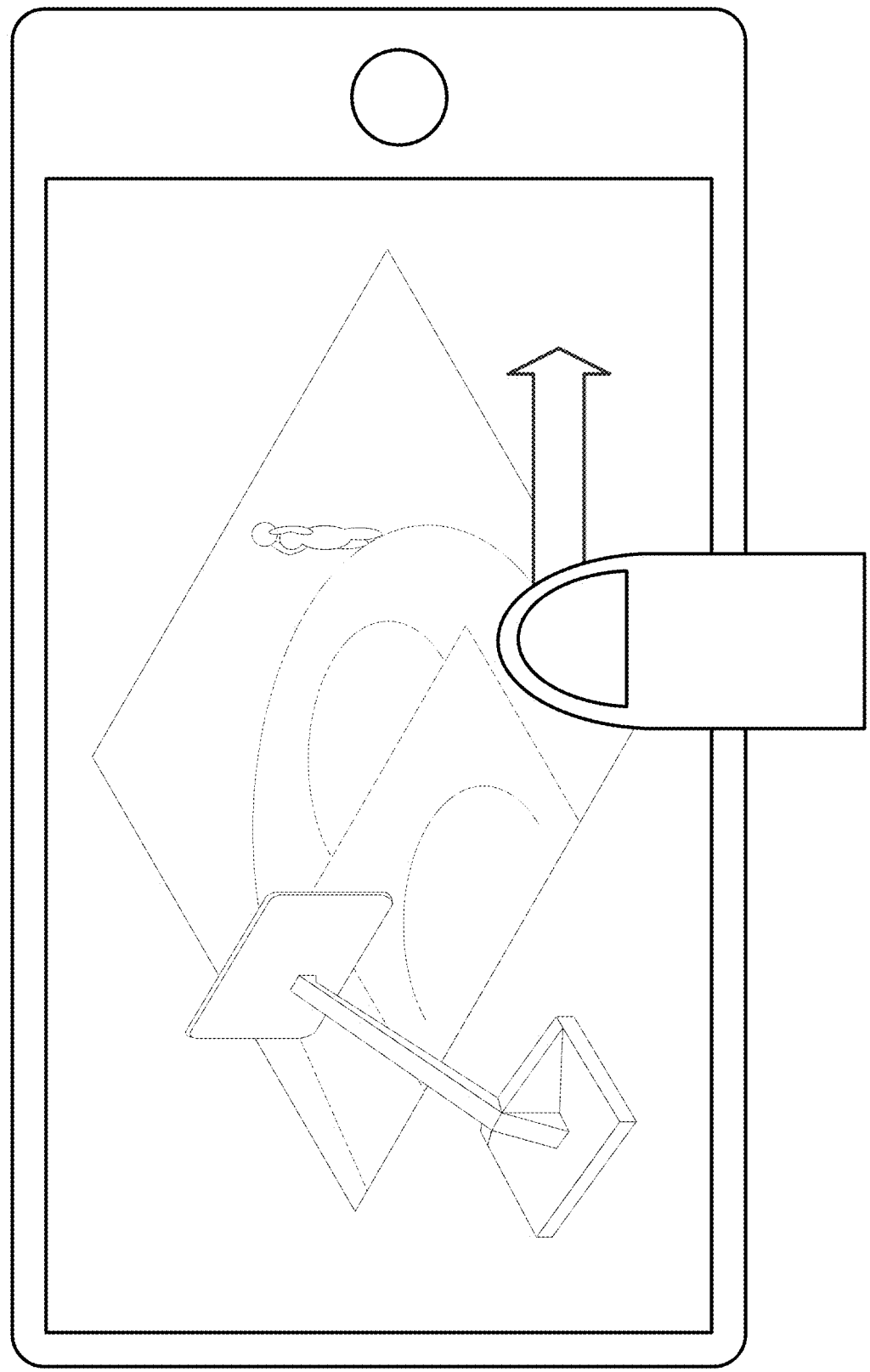
FIG. 5 is a schematic diagram of a control on a device in an example embodiment of the present disclosure.
Figure 6:
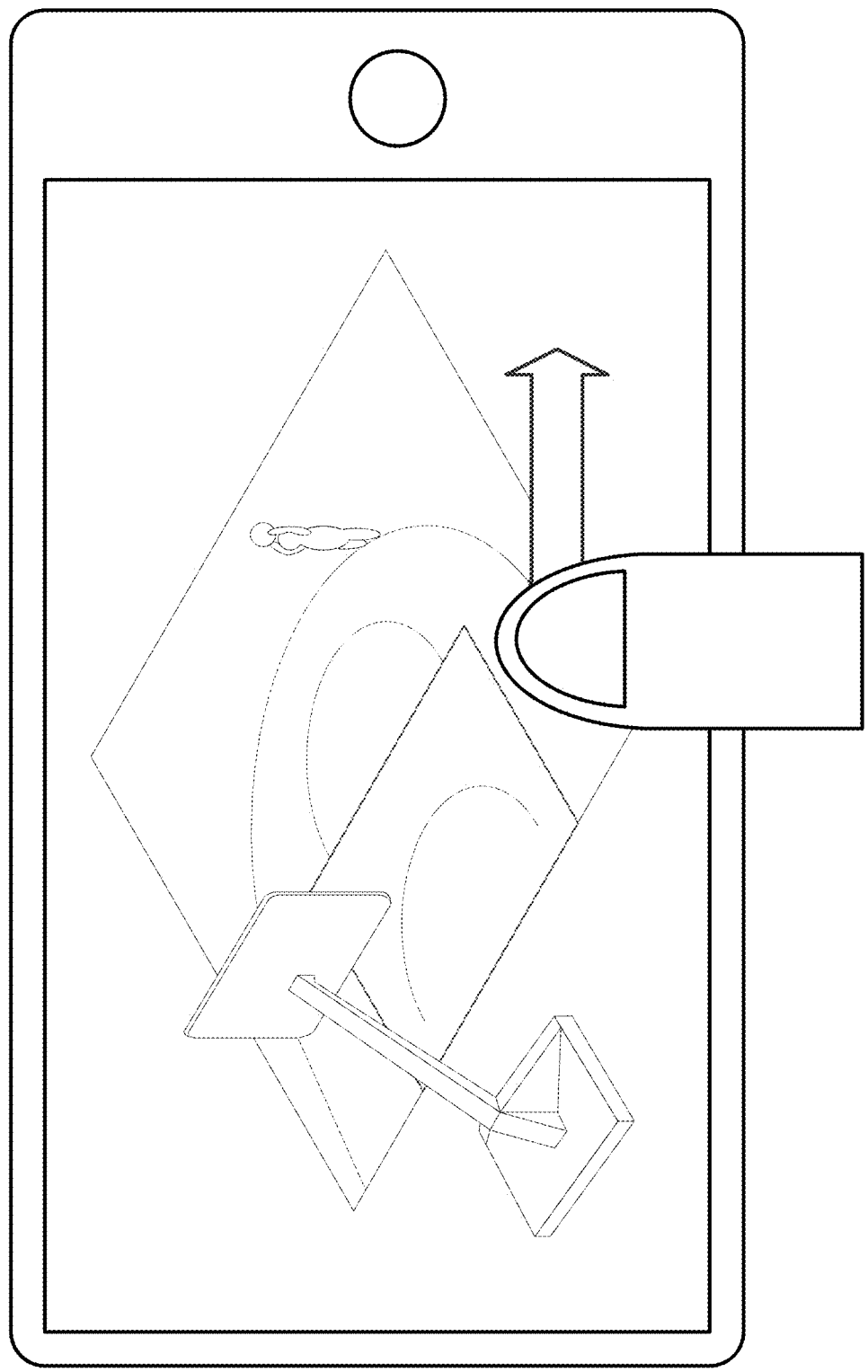
FIG. 6 is a schematic diagram of another control on a device in an example embodiment of the present disclosure.

For example, the user may slide on the surface of the screen to switch the virtual viewpoint. In an example embodiment of the present disclosure, referring to FIG. 5, when the user slides along the surface of the screen with his/her finger to the right, the virtual viewpoint for viewing may be switched. Still referring to FIG. 2, the virtual viewpoint before sliding may be $VP_1$. The virtual viewpoint may be $VP_2$ after the virtual viewpoint is switched by sliding along the surface of the screen. Referring to FIG. 6, after sliding the screen, the reconstructed image displayed on the screen may be as shown in FIG. 6. The reconstructed image may be obtained by performing image reconstruction based on multi-angle free-perspective data generated from data captured by multiple capturing devices in an actual capturing scenario.

Those skilled in the art may understand that the image viewed before switching may also be a reconstructed image. The reconstructed image may be a frame image in a video stream. In addition, there are various manners to switch the virtual viewpoint according to the user instruction, which is not limited herein.

In implementations, the virtual viewpoint may be represented by 6 degrees of freedom (DoF) coordinates, where the spatial position of the virtual viewpoint may be represented as (x, y, z), and the perspective may be represented as three directions of rotation $(\theta, \varphi, \gamma)$.

The virtual viewpoint is a three-dimensional concept. Three-dimensional information is required to generate the reconstructed image. In an implementation manner, the multi-angle free-perspective data may include the depth data for providing third-dimensional information outside the plane image (the texture image). Compared with other implementation manners, such as providing three-dimensional information through point cloud data, the data amount of the depth data is smaller. Implementation manners of generating multi-angle free-perspective data will be described in detail hereinafter with reference to FIG. 19 to FIG. 37 and will not be repeated herein.

In the example embodiments of the present disclosure, the switching of the virtual viewpoint may be performed within a certain range, which is the multi-angle free-perspective range. That is, within the multi-angle free-perspective range, the position of the virtual viewpoint and the perspective may be arbitrarily switched.

The multi-angle free-perspective range is related to the arrangement of the capturing devices. The broader the shooting coverage of the capturing devices is, the larger the multi-angle free-perspective range is. The quality of the picture displayed by the device that performs displaying is related to the number of capturing devices. Generally, the more the number of capturing devices is set, the fewer the number of the hollow areas in the displayed picture is.

Figure 7:
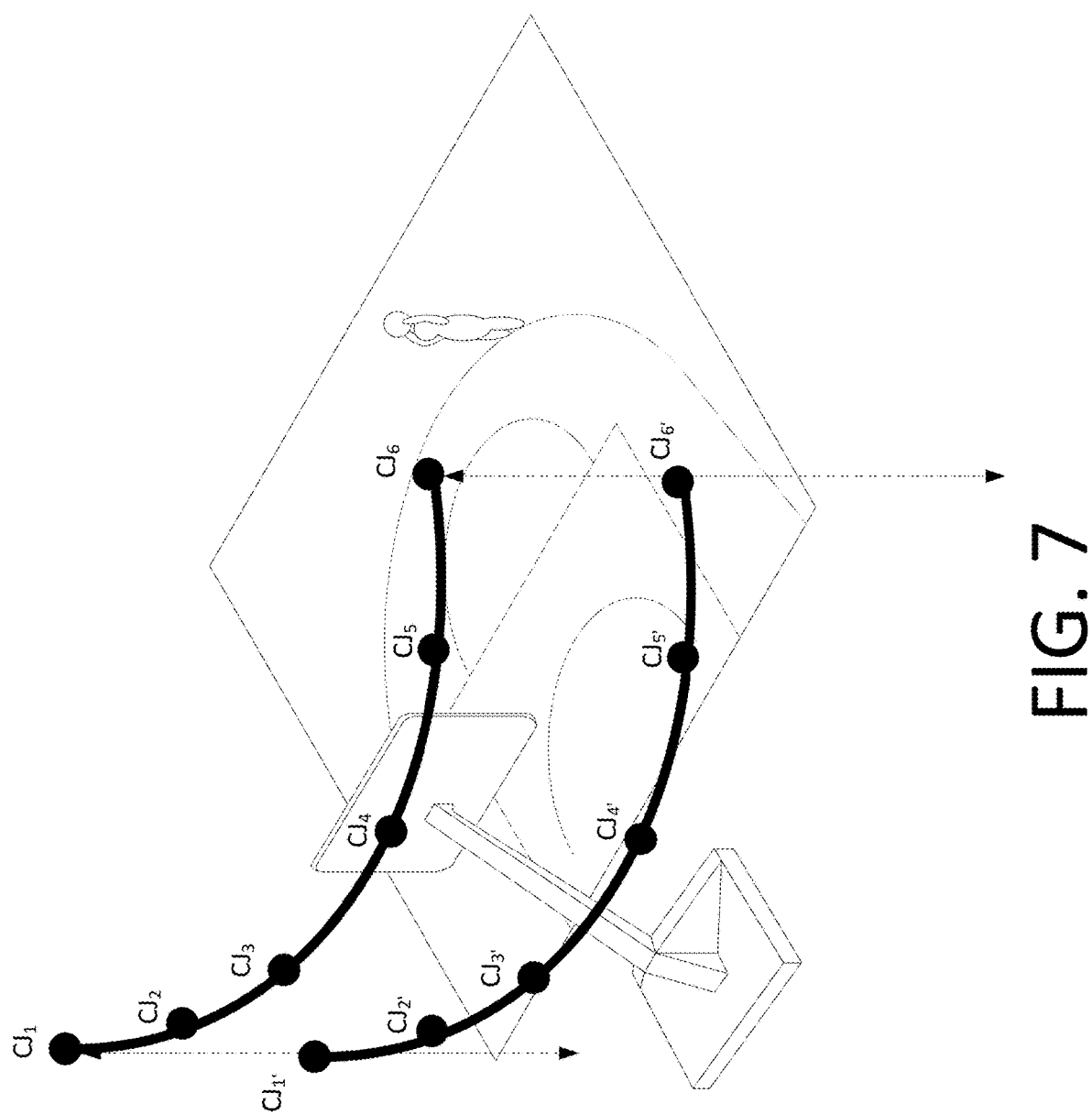
FIG. 7 is a schematic diagram of a setting method of capturing devices in an example embodiment of the present disclosure.

Referring to FIG. 7, if two rows (an upper row and a lower row) of capturing devices are set in the basketball court, i.e., the upper row of capturing devices $CJ_1$ to $CJ_6$ and the lower row of capturing devices $CJ_1'$ to $CJ_6'$, respectively, compared with setting only one row of capturing devices, the multi-angle free-perspective range thereof is greater.

Figure 8:
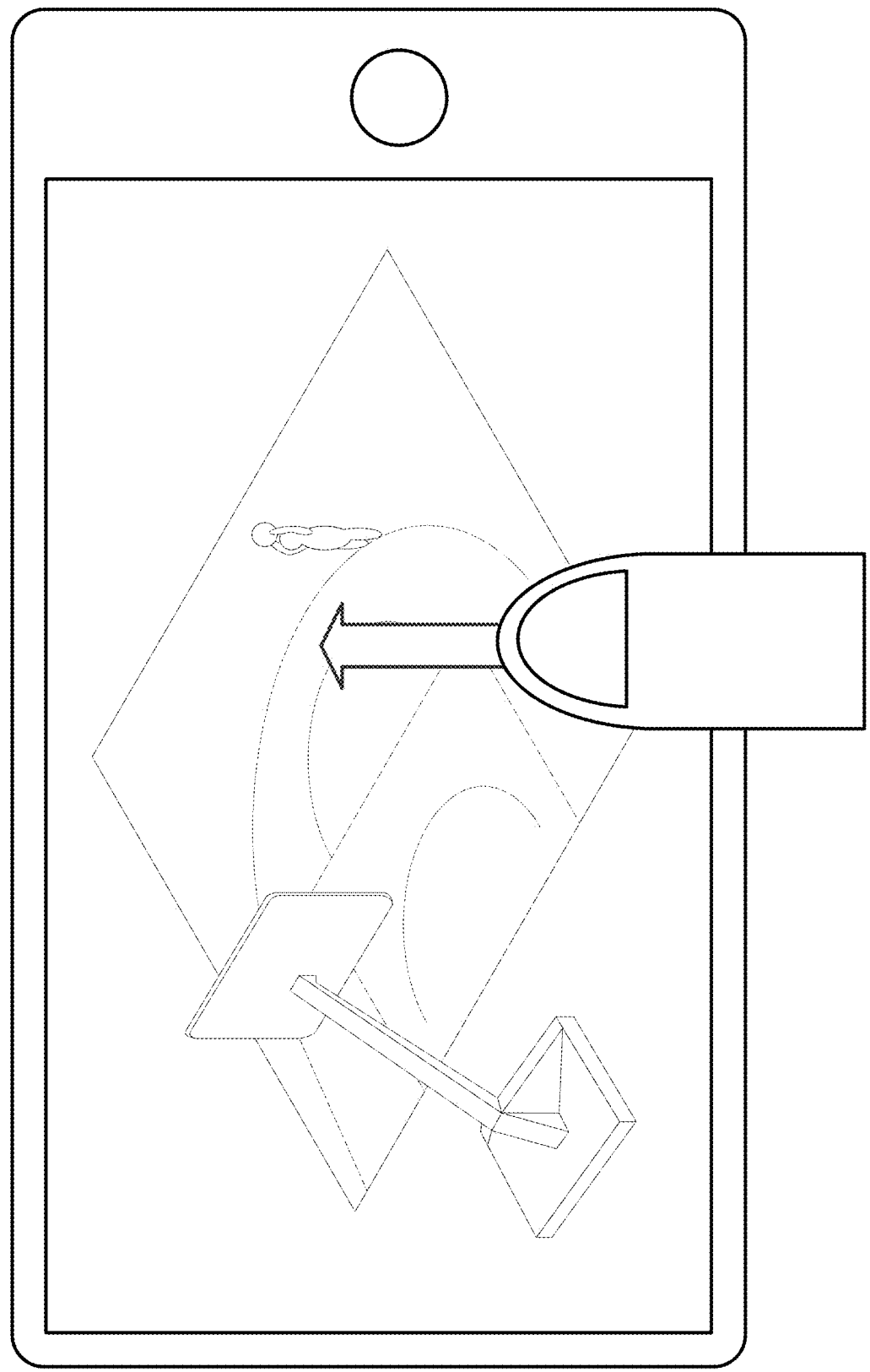
FIG. 8 is a schematic diagram of another control on a device in an example embodiment of the present disclosure.
Figure 9:
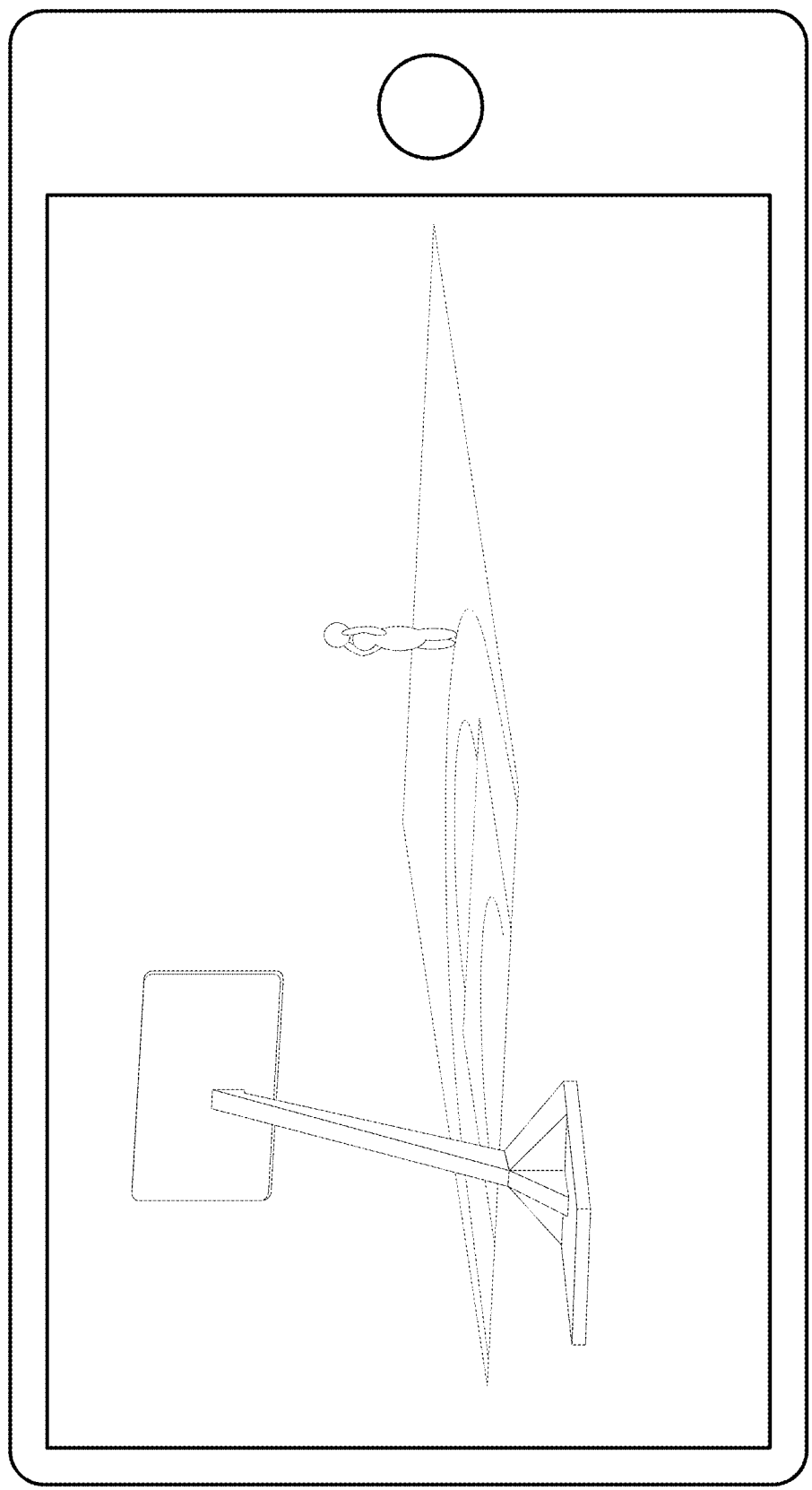
FIG. 9 is a schematic diagram of another device display in an example embodiment of the present disclosure.

Referring to FIG. 8, the user's finger may slide upward to switch the virtual viewpoint for viewing. Referring to FIG. 9, after sliding along the surface of the screen, the image displayed on the screen may be as shown in FIG. 9.

In implementations, if only one row of capturing devices is set, a certain degree of freedom in the vertical direction may also be obtained in the process of image reconstruction to obtain the reconstructed image, but the multi-angle free-perspective range thereof is smaller than the free-perspective range of the scenario where two rows of capturing devices are set in the vertical direction.

It may be understood by those skilled in the art that the above respective example embodiments and corresponding drawings are merely for illustrative purposes and are not intended to limit the association relationship between the setting of the capturing devices and the multi-angle free-perspective range, nor are they limitations of operation manners or obtained display effects of the device that performs displaying.

Hereinafter, a setting method of capturing devices is further described.

Figure 10:
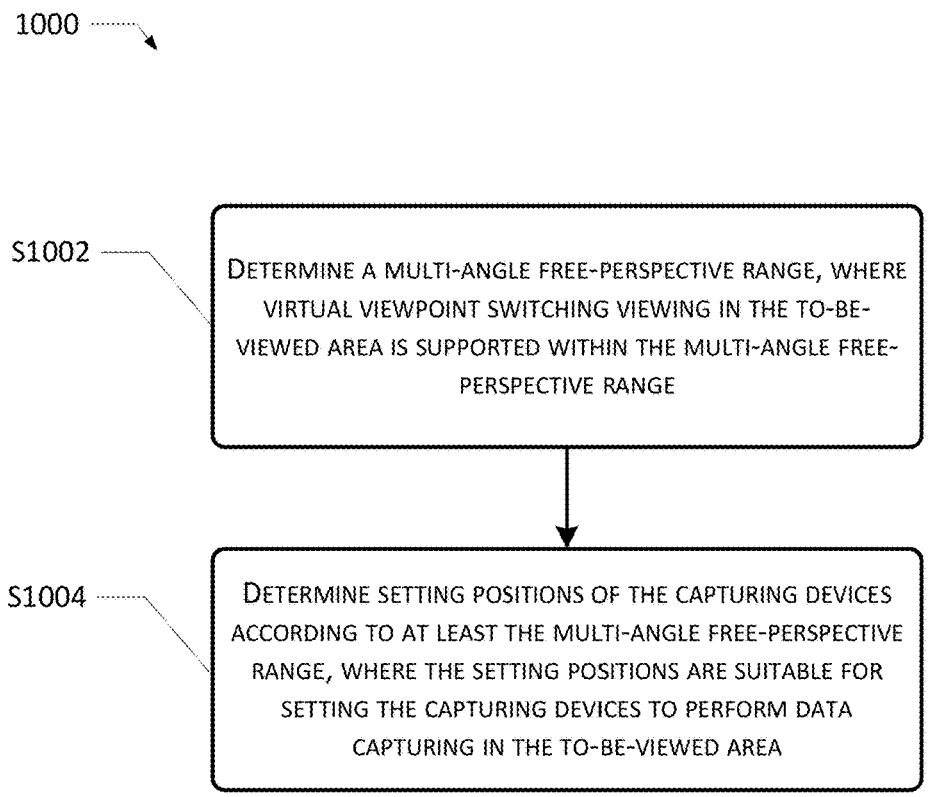
FIG. 10 is a flowchart of a setting method of capturing devices in an example embodiment of the present disclosure.

FIG. 10 is a flowchart of a setting method 1000 of capturing devices in an example embodiment of the present disclosure. In the example embodiments of the present disclosure, the following steps may be included:

Step S1002, determining a multi-angle free-perspective range, where virtual viewpoint switching viewing in the to-be-viewed area is supported within the multi-angle free-perspective range.

Step S1004, determining setting positions of the capturing devices according to at least the multi-angle free-perspective range, where the setting positions are suitable for setting the capturing devices to perform data capturing in the to-be-viewed area.

Those skilled in the art may understand that a completely free perspective may refer to a perspective with 6 degrees of freedom. That is, the user may freely switch the spatial position and perspective of the virtual viewpoint on the device that performs displaying, where the spatial position of the virtual viewpoint may be expressed as (x, y, z), and the perspective may be expressed as three directions of rotation $(\theta, \varphi, \gamma)$. There are 6 degrees of freedom in total, and thus the perspective is referred to as a perspective with 6 degrees of freedom.

As described above, in the example embodiments of the present disclosure, the switching of the virtual viewpoint may be performed within a certain range, which is the multi-angle free-perspective range. That is, within the multi-angle free-perspective range, the position of the virtual viewpoint and the perspective may be arbitrarily switched.

The multi-angle free-perspective range may be determined according to the needs of the application scenario. For example, in some scenarios, the to-be-viewed area may have a core focus, such as the center of the stage, or the center of the basketball court, or the hoop of the basketball court. In such scenarios, the multi-angle free-perspective range may include a planar or three-dimensional area including the core focus. Those skilled in the art may understand that the to-be-viewed area may be a point, a plane, or a three-dimensional area, which is not limited herein.

As described above, the multi-angle free-perspective range may be various areas, and further examples are described hereinafter with reference to FIG. 11 to FIG. 15.

Figure 11:
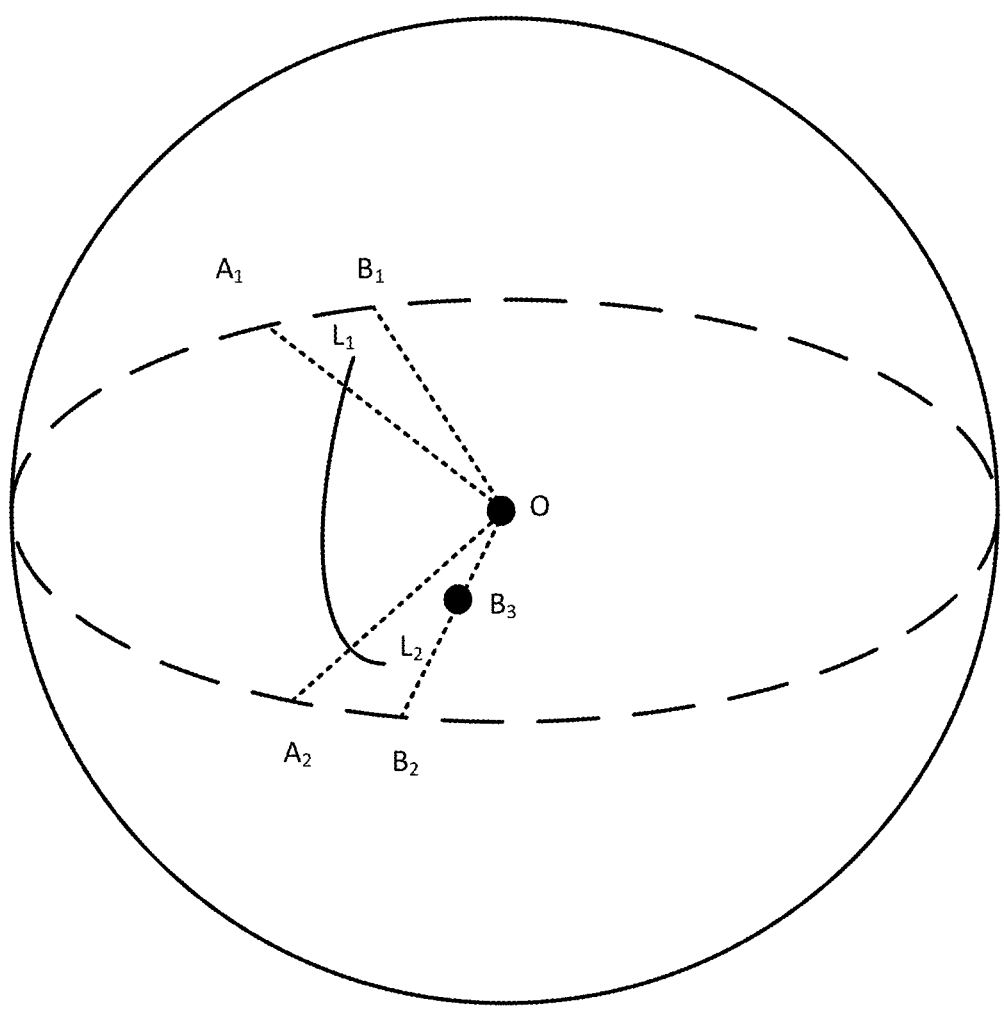
FIG. 11 is a schematic diagram of a multi-angle free-perspective range in an example embodiment of the present disclosure.

Referring to FIG. 11, point O represents the core focus. The multi-angle free-perspective range may be a sector area with the core focus as the center and located in the same plane as the core focus, such as the sector area $A_1OA_2$, or the sector area $B_1OB_2$. The multi-angle free-perspective range may also be a circular plane centered at point O.

Taking the multi-angle free-perspective range as the sector area $A_1OA_2$ as an example, the position of the virtual viewpoint may be continuously switched in this area. For example, the position of the virtual viewpoint may be continuously switched from $A_1$ along the arc segment $A_1A_2$ to $A_2$. Alternatively, the position of the virtual viewpoint may also be continuously switched along the arc segment $L_1L_2$. Alternatively, the position is switched in the multi-angle free-perspective range in other manners. Accordingly, the perspective of the virtual viewpoint may also be changed in this area.

Figure 12:
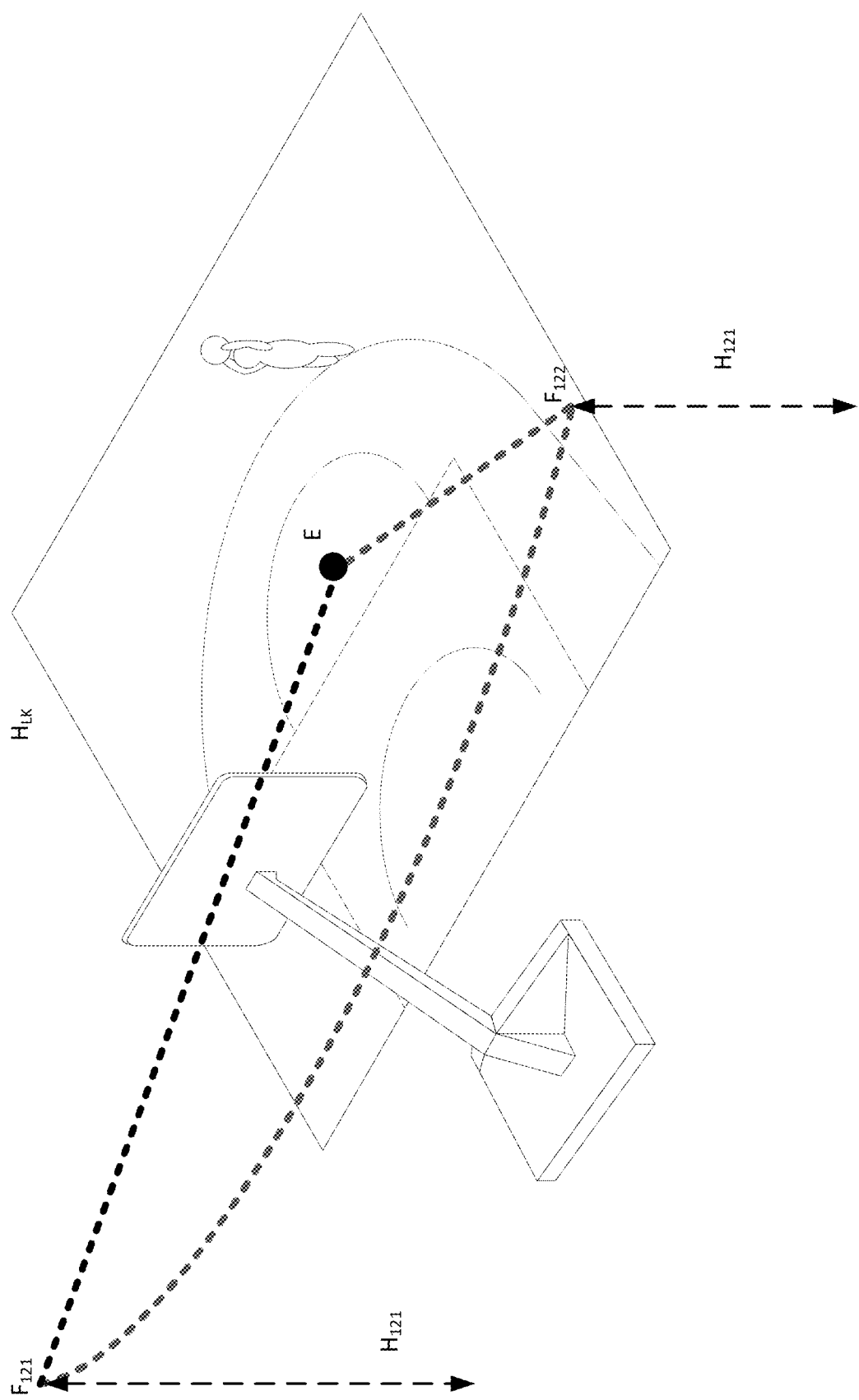
FIG. 12 is a schematic diagram of another multi-angle free-perspective range in an example embodiment of the present disclosure.

Further referring to FIG. 12, the core focus may be the center point E of the basketball court. The multi-angle free-perspective range may be a sector area with the center point E as the center and located in the same plane as the center point E, such as the sector area $F_{121}EF_{122}$. The center point E of the basketball court may be located on the ground of the court. Alternatively, the center point E of the basketball court may be at a certain height from the ground. The height of the arc endpoint $F_{121}$ and the height of the arc endpoint $F_{122}$ of the sector area may be the same, for example, the height $H_{121}$ in the figure.

Figure 13:
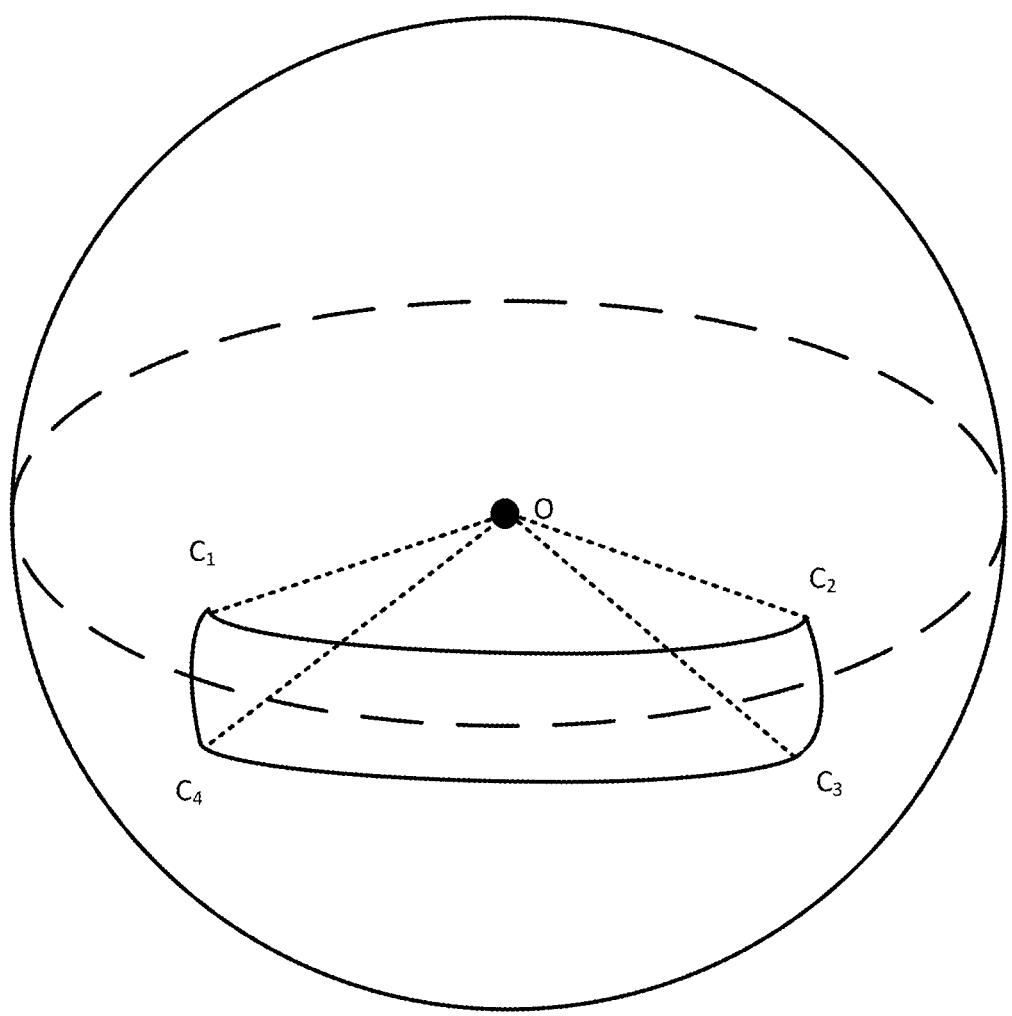
FIG. 13 is a schematic diagram of another multi-angle free-perspective range in an example embodiment of the present disclosure.

Referring to FIG. 13, the core focus is represented by point O. The multi-angle free-perspective range may be a part of a sphere centered on the core focus. For example, the area $C_1C_2C_3C_4$ is used to illustrate a partial area of the spherical surface, and the multi-angle free-perspective range may be a three-dimensional range formed by the area $C_1C_2C_3C_4$ and the point O. Any point within this range may be used as the position of the virtual viewpoint.

Figure 14:
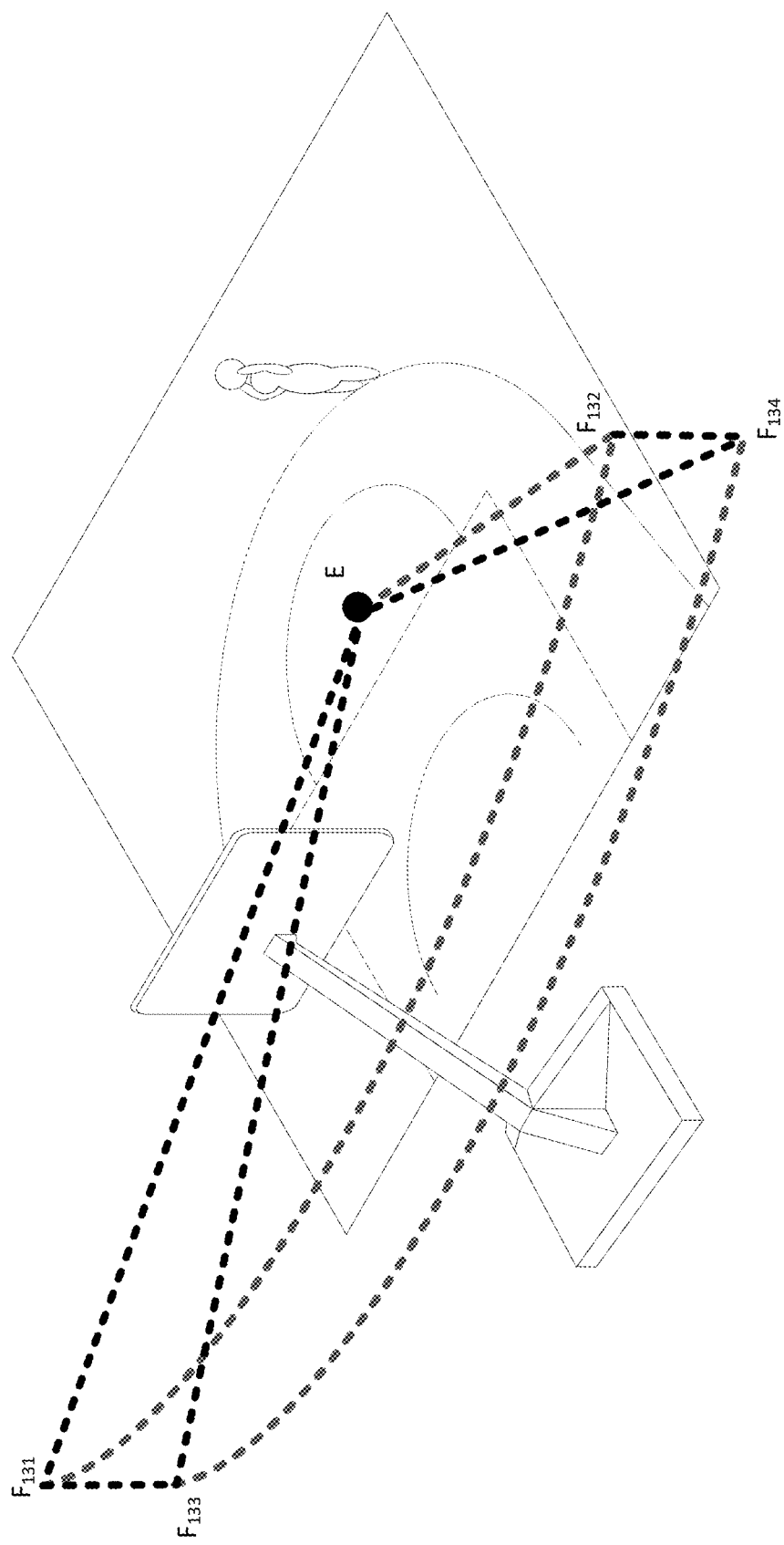
FIG. 14 is a schematic diagram of another multi-angle free-perspective range in an example embodiment of the present disclosure.

Further referring to FIG. 14, the core focus may be the center point E of the basketball court. The multi-angle perspective range may be a part of the sphere centered on the center point E. For example, the area $F_{131}F_{132}F_{133}F_{134}$ illustrates a partial area of the spherical surface. The multi-angle free-perspective range may be a three-dimensional range formed by the area $F_{131}F_{132}F_{133}F_{134}$ and the center point E.

In the scenario with the core focus, the position of the core focus may be various, and the multi-angle free-perspective range may also be various, which are not listed herein one by one. Those skilled in the art may understand that the above respective example embodiments are merely examples and are not limitations on the multi-angle free-perspective range. Moreover, the shapes shown therein are not limitations on actual scenarios and applications.

In implementations, the core focus may be determined according to the scenario. In a shooting scenario, there may also be multiple core focuses, and the multi-angle free-perspective range may be a superposition of multiple sub-ranges.

In other application scenarios, the multi-angle free-perspective range may also be without the core focus. For example, in some application scenarios, it is necessary to provide multi-angle free-perspective viewing of historic buildings, or to provide multi-angle free-perspective viewing of art exhibitions. Accordingly, the multi-angle free-perspective range may be determined according to the requirements of these scenarios.

Those skilled in the art may understand that the shape of the degree of freedom perspective range may be arbitrary. Any point within the multi-angle free-perspective range may be used as the position.

Figure 15:
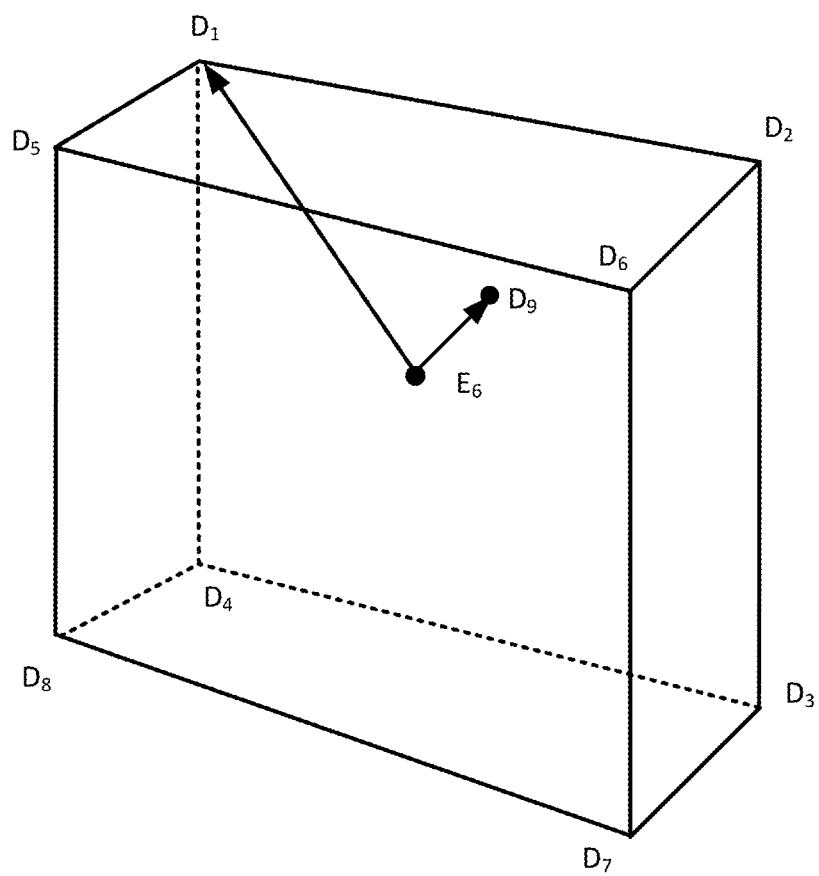
FIG. 15 is a schematic diagram of another multi-angle free-perspective range in an example embodiment of the present disclosure.

Referring to FIG. 15, the multi-angle free-perspective range may be the cube $D_1D_2D_3D_4D_5D_6D_7D_8$, and the to-be-viewed area is the surface $D_1D_2D_3D_4$. Then, any point in the cube $D_1D_2D_3D_4D_5D_6D_7D_8$ may be used as the position of the virtual viewpoint. The perspective of the virtual viewpoint, i.e., the viewing angle, may be various. For example, the position $E_6$ on the surface $D_5D_6D_7D_8$ may be selected to view with the perspective of $E_6D_1$ or to view along the angle of $E_6D_9$, where the point $D_9$ is selected from the to-be-viewed area.

In implementations, after the multi-angle free-perspective range is determined, the positions of the capturing devices may be determined according to the multi-angle free-perspective range.

Specifically, the setting positions of the capturing devices may be selected within the multi-angle free-perspective range. For example, the setting positions of the capturing devices may be determined at boundary points of the multi-angle free-perspective range.

Figure 16:
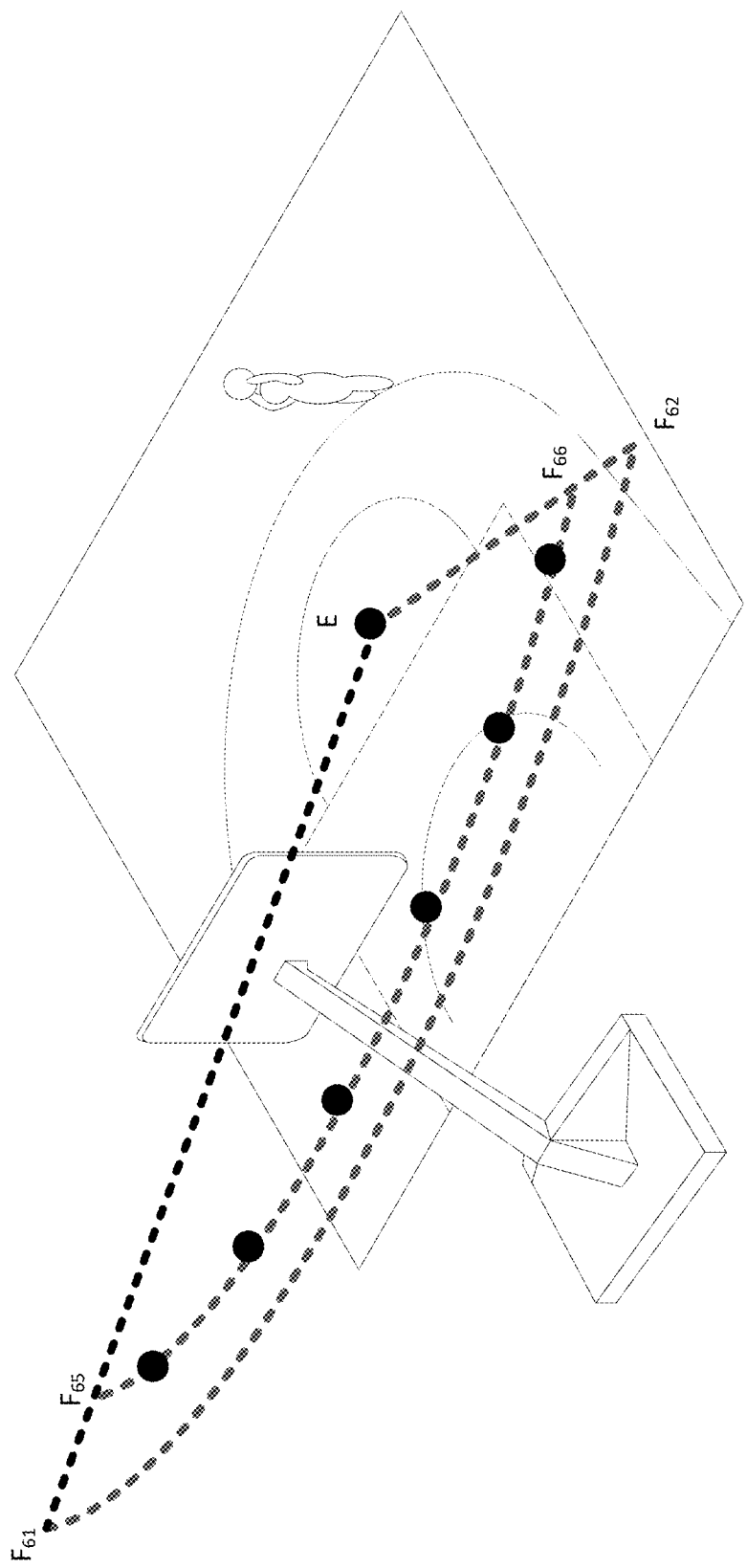
FIG. 16 is a schematic diagram of another setting method of capturing devices in an example embodiment of the present disclosure.

Referring to FIG. 16, the core focus may be the center point E of the basketball court, and the multi-angle free-perspective range may be the sector area with the center point E as the center and located in the same plane as the center point E, such as the sector area $F_{61}EF_{62}$. The capturing devices may be set inside the multi-angle perspective range, for example, along the arc $F_{65}F_{66}$. Areas that are not covered by the capturing devices may be reconstructed using algorithms. In implementations, the capturing devices may also be set along the arc $F_{61}F_{62}$, and the capturing devices may be set at the ends of the arc to improve the quality of the reconstructed image. Each capturing device may be set towards the center point E of the basketball court. The position of the capturing device may be represented by spatial position coordinates, and the orientation of the capturing device may be represented by three rotation directions.

In implementations, two or more setting positions may be set, and correspondingly, two or more capturing devices may be set. The number of capturing devices may be determined according to the requirements of the quality of the reconstructed image or video. In a scenario with a higher requirement on the picture quality of the reconstructed image or video, the number of capturing devices may be greater. In a scenario with a lower requirement on the picture quality of the reconstructed image or video, the number of capturing devices may be smaller.

Still referring to FIG. 16, those skilled in the art may understand that if the higher picture quality of reconstructed image or video and a reduction in the number of holes in the reconstructed image are pursued, a larger number of capturing devices may be set along the arc $F_{61}F_{62}$. For example, 40 cameras may be set.

Figure 17:
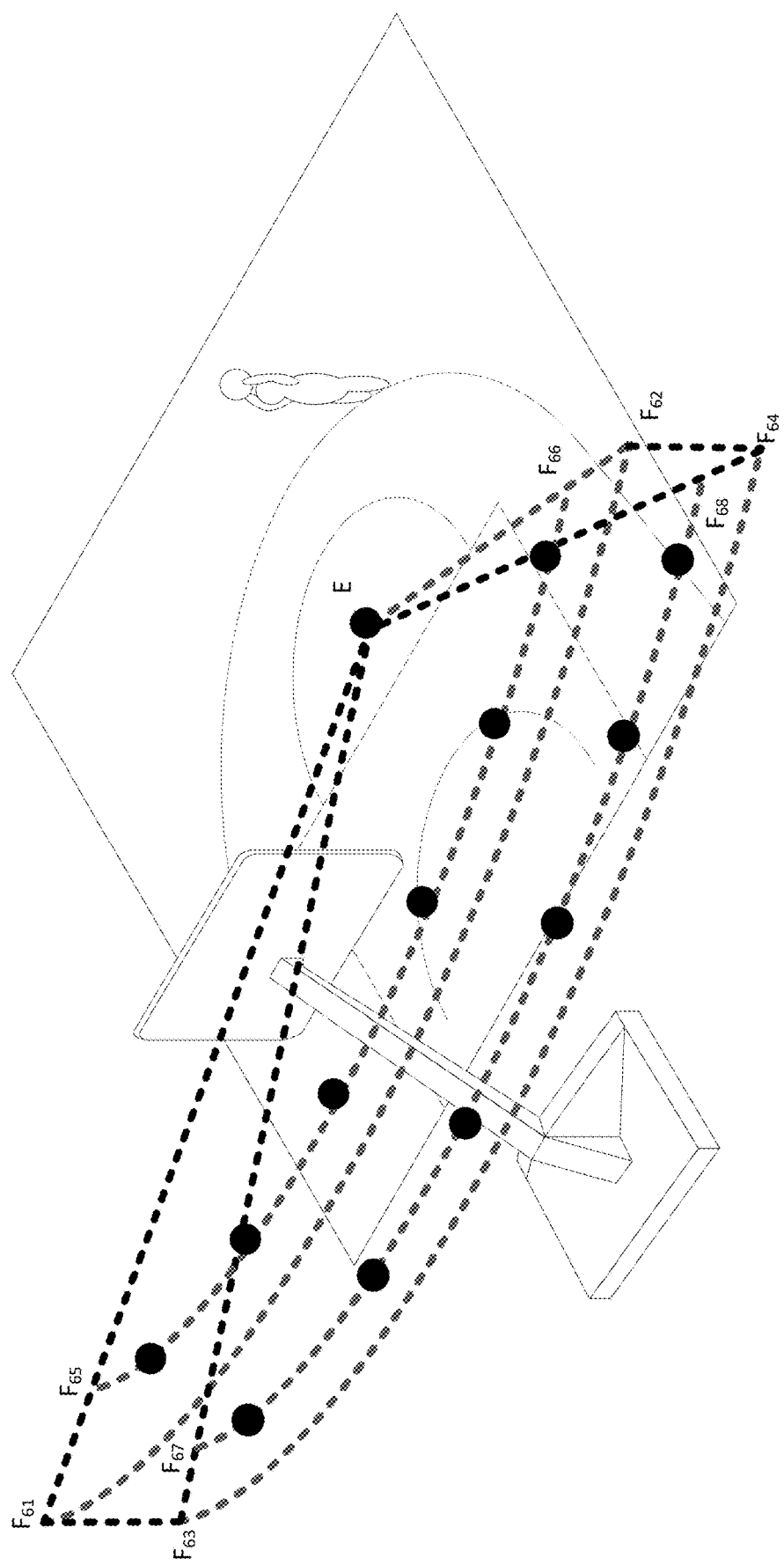
FIG. 17 is a schematic diagram of another setting method of capturing devices in an example embodiment of the present disclosure.

Referring to FIG. 17, the core focus may be the center point E of the basketball court, and the multi-angle perspective range may be a part of the sphere centered on the point E. For example, the area $F_{61}F_{62}F_{63}F_{64}$ illustrates a partial area of the spherical surface, and the multi-angle free-perspective range may be a three-dimensional range formed by the area $F_{61}F_{62}F_{63}F_{64}$ and the center point E. The capturing devices may be set inside the multi-angle perspective range, for example, along the arc $F_{65}F_{66}$ and the arc $F_{67}F_{68}$. Similar to the previous example, areas that are not covered by the capturing devices may be reconstructed using algorithms. In implementations, the capturing devices may also be set along the arc $F_{61}F_{62}$ and the arc $F_{63}F_{64}$, and the capturing devices may be set at the ends of the arc to improve the quality of the reconstructed image. Each capturing device may be set to face the center point E of the basketball court. Those skilled in the art may understand that, although not being shown in the figure, the number of capturing devices along the arc $F_{61}F_{62}$ may be more than the number of capturing devices along the arc $F_{63}F_{64}$.

As described above, in some application scenarios, the to-be-viewed area may include the core focus. Accordingly, the multi-angle free-perspective range includes the area where the perspective is directed to the core focus. In such an application scenario, the setting positions of the capturing devices may be selected from an arc-shaped area whose concave direction (radius direction) points to the core focus.

When the to-be-viewed area includes the core focus, the setting positions are selected in the arc-shaped area pointing to the core focus in the concave direction, so that the capturing devices are arranged with an arc shape. Because the to-be-viewed area includes the core focus, the perspective points to the core focus. In such a scenario, the capturing devices are arranged with the arc shape, such that fewer capturing devices may be used to cover a larger multi-angle free-perspective range.

In implementations, the setting positions of the capturing devices may be determined with reference to the perspective range and the boundary shape of the to-be-viewed area. For example, the setting positions of the capturing devices may be determined at a preset interval along the boundary of the to-be-viewed area within the perspective range.

Figure 18:
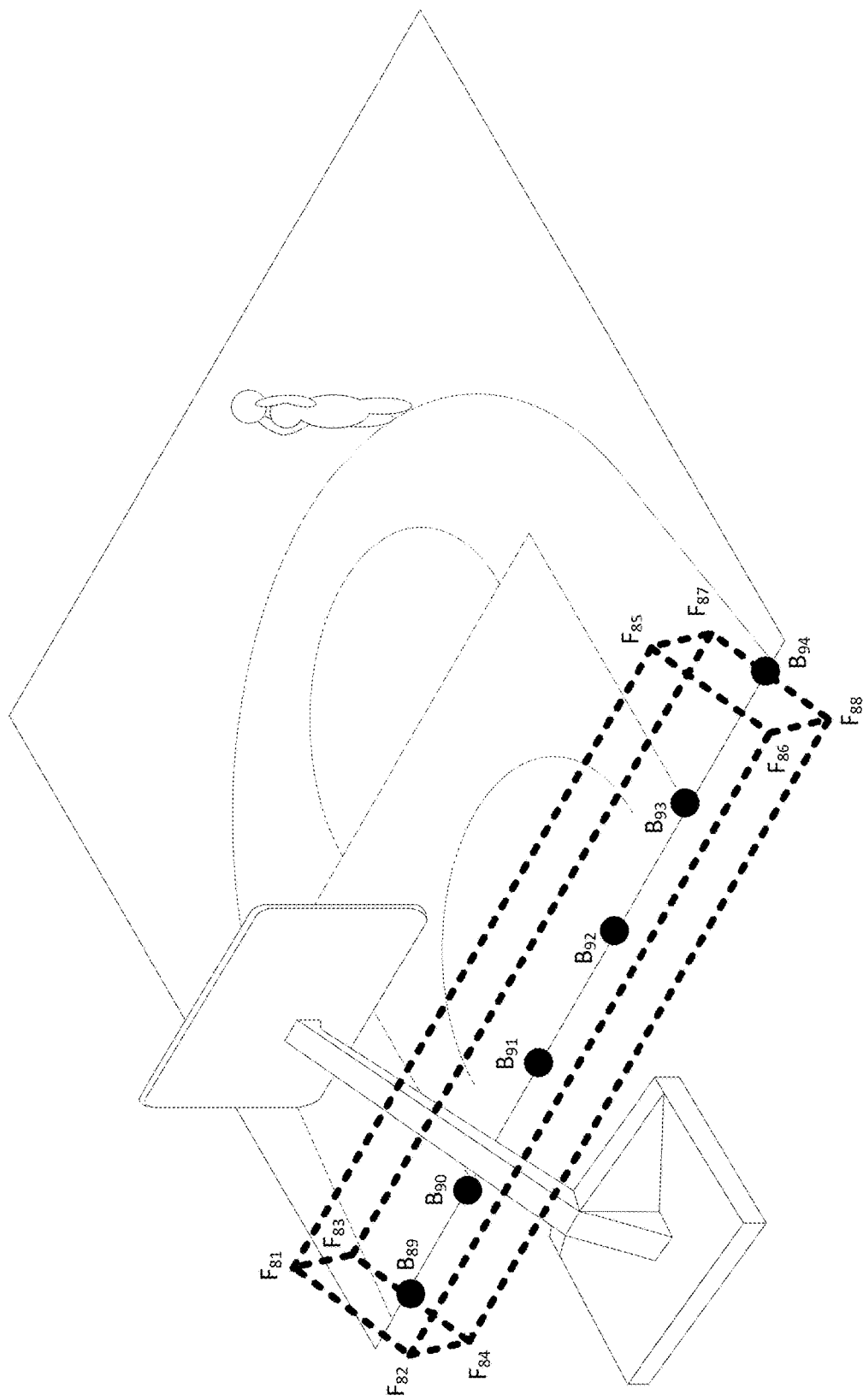
FIG. 18 is a schematic diagram of another setting method of capturing devices in an example embodiment of the present disclosure.

Referring to FIG. 18, the multi-angle perspective range may be without the core focus. For example, the position of the virtual viewpoint may be selected from the hexahedron $F_{81}F_{82}F_{83}F_{84}F_{85}F_{86}F_{87}F_{88}$, and the virtual viewpoint position is used for viewing the to-be-viewed area. The boundary of the to-be-viewed area may be the ground boundary of the court. The capturing devices may be set along the intersecting line $B_{89}B_{94}$ of the ground boundary line with the to-be-viewed area. For example, six capturing devices may be set at positions $B_{89}$ to $B_{94}$. The degree of freedom in the up and down direction may be realized by an algorithm. Alternatively, another row of capturing devices may be set at the positions where the horizontal projection positions thereof are in the intersection line $B_{89}$ to $B_{94}$.

In implementations, the multi-angle free-perspective range may also support viewing from the upper side of the to-be-viewed area, and the upper side is in a direction away from the horizontal plane.

Accordingly, the capturing device may be mounted on the drone to set the capturing device on the upper side of the to-be-viewed area, or on the top of the building where the to-be-viewed area is located. The top of the building is the structure in the direction away from the horizontal plane.

For example, the capturing device may be set on the top of the basketball stadium, or may hover on the upper side of the basketball court through the drone carrying the capturing device. The capturing device may be set on the top of the stadium where the stage is located, or may be carried by the drone.

By setting the capturing device on the upper side of the to-be-viewed area, the multi-angle free-perspective range may include the perspective above the to-be-viewed area.

In implementations, the capturing device may be a camera or a video camera, and the captured data may be pictures or video data.

Those skilled in the art may understand that the manner in which the capturing device is set at the setting position may be various. For example, the capturing device may be supported by the support frame at the setting position, or in other setting manners.

In addition, those skilled in the art may understand that the above respective example embodiments are merely examples for illustration, and are not limitations on the setting manner of capturing devices. In various application scenarios, the implementations of determining the setting positions of the capturing devices and setting the capturing devices for capturing according to the multi-angle free-perspective range are all within the protection scope of the present disclosure.

Hereinafter, the method for generating multi-angle free-perspective data is further described.

As described above, still referring to FIG. 3, the acquired multiple synchronized two-dimensional images may be processed by the capturing system 31 or the server 32 to generate multi-angle free-perspective data that is capable of supporting the device 33 that performs displaying to switch the virtual viewpoint. The multi-angle free-perspective data may indicate the third-dimension information outside the two-dimensional image through the depth data. The depth data may reflect the relative distance between the object being shot and the camera or the shooting camera. Based on the multiple synchronized two-dimensional images and corresponding depth data, the multi-angle free-perspective data which is capable of supporting the device 33 that performs displaying to perform virtual viewpoint switching may be generated.

Figure 19:
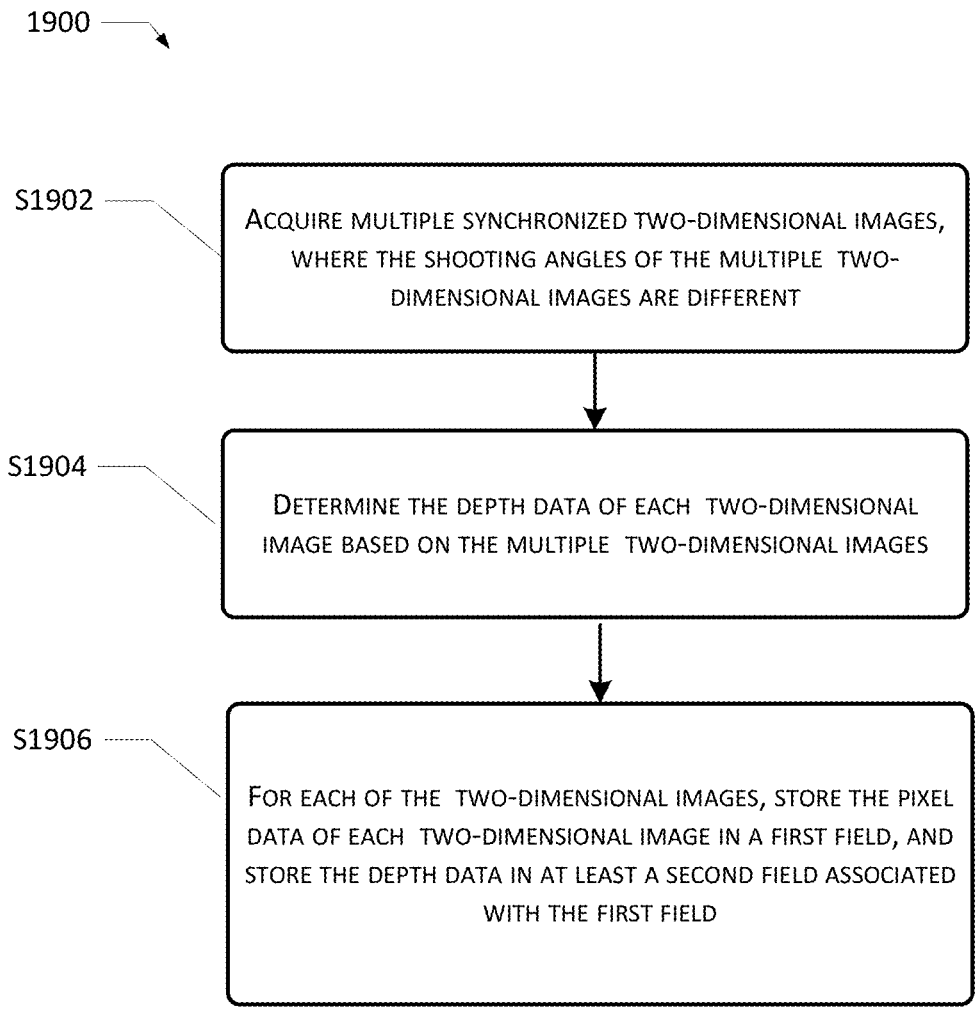
FIG. 19 is a flowchart of a method for generating multi-angle free-perspective data in an example embodiment of the present disclosure.

In implementations, referring to FIG. 19, a method 1900 for generating the multi-angle free-perspective data may include the following steps:

Step S1902, acquiring multiple synchronized two-dimensional images, where the shooting angles of the multiple two-dimensional images are different;

Step S1904, determining the depth data of each two-dimensional image based on the multiple two-dimensional images;

Step S1906, for each of the two-dimensional images, storing the pixel data of each two-dimensional image in a first field, and storing the depth data in at least a second field associated with the first field.

The multiple synchronized two-dimensional images may be images captured by the camera or frame images in video data captured by the video camera. In the process of generating the multi-angle free-perspective data, the depth data of each two-dimensional image may be determined based on the multiple two-dimensional images.

The depth data may include depth values corresponding to pixels of the two-dimensional image. The distance from the capturing device to each point in the to-be-viewed area may be used as the above depth value, and the depth value may directly reflect the geometry of the visible surface in the to-be-viewed area. The depth value may be the distance from respective points in the to-be-viewed area along the optical axis of the camera to the optical center, and the origin of the camera coordinate system may be used as the optical center. Those skilled in the art may understand that the distance may be a relative value, as long as the multiple images use the same reference.

Further, the depth data may include depth values corresponding to the pixels of the two-dimensional image on a one-to-one basis. Alternatively, the depth data may be some values selected from a set of depth values corresponding to the pixels of the two-dimensional image on a one-to-one basis.

Those skilled in the art may understand that the two-dimensional image may also be referred to as the texture image, and the set of depth values may be stored in the form of a depth map. In implementations, the depth data may be data obtained by down-sampling the original depth map. The set of depth values corresponding to the pixels of the two-dimensional image (the texture image) on a one-to-one basis is stored according to the arrangement of pixel points of the two-dimensional image (the texture image) is the original depth map.

In implementations, the pixel data of the two-dimensional image stored in the first field may be original two-dimensional image data, such as data obtained from the capturing device, or may be data with a reduced resolution of the original two-dimensional image data. Further, the pixel data of the two-dimensional image may be original the pixel data of the image, or the pixel data with reduced resolution. The pixel data of the two-dimensional image may be any one of YUV data and RGB data, or may be other data capable of expressing the two-dimensional image.

In implementations, the amount of the depth data stored in the second field may be the same as or different from the number of pixel points corresponding to the pixel data of the two-dimensional image stored in the first field. The amount may be determined according to the bandwidth limitation of data transmission of the device terminal that processes the multi-angle free-perspective image data. If the bandwidth is small, the amount of data may be reduced in the above manners such as down-sampling or resolution reduction, and the like.

In implementations, for each of the two-dimensional images (the texture images), the pixel data of the two-dimensional image (the texture image) may be sequentially stored in multiple fields in a preset order, and these fields may be consecutive or may be distributed in an interleaving manner with the second field. The fields storing the pixel data of the two-dimensional image (the texture image) may be used as the first fields. Hereinafter, examples are provided for explanation.

For simplicity of description, unless otherwise specified, the images described in FIG. 20 to FIG. 25 and FIG. 33 to FIG. 36 are all two-dimensional images (texture images).

Figure 20:
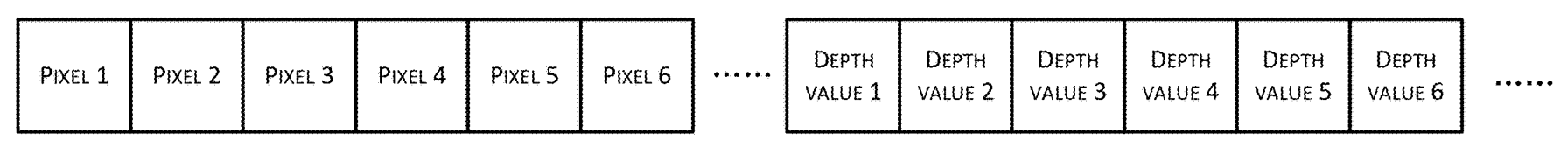

Referring to FIG. 20, the pixel data of a two-dimensional image that is represented by pixel 1 to pixel 6 and other pixels not shown in the figure, may be stored in multiple consecutive fields in a preset order. These consecutive fields may be used as the first fields. The depth data corresponding to the two-dimensional image that is represented by depth value 1 to depth value 6 and other depth values not shown in the figure, may be stored in multiple consecutive fields in a preset order. These consecutive fields may be used as the second fields. The preset order may be a storing performed line by line sequentially according to the distribution positions of the pixels of the two-dimensional image, or may be other orders.

Referring to FIG. 21, the pixel data and corresponding depth values of a two-dimensional image may also be stored in multiple fields alternately. Multiple fields storing the pixel data may be used as the first fields, and multiple fields storing the depth values may be used as the second fields.

In implementations, the depth data may be stored in the same order as the pixel data of the two-dimensional image, so that a respective field in the first fields may be associated with a respective field in the second fields, thereby reflecting the depth value corresponding to each pixel.

In implementations, the pixel data and the corresponding depth data of multiple two-dimensional images may be stored in various ways. Hereinafter, examples are provided for further explanation.

Figure 22:
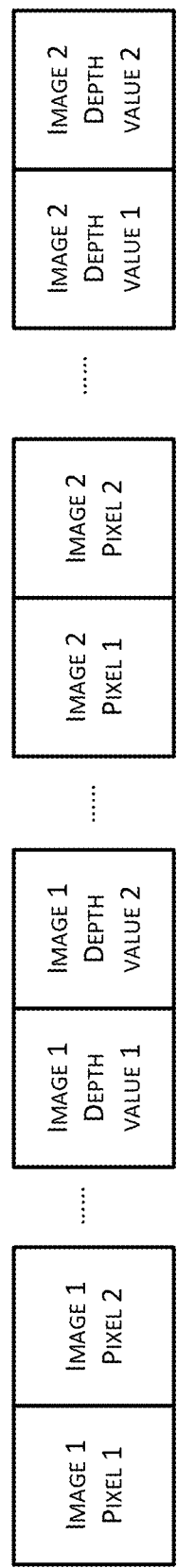
FIG. 22 is a schematic diagram of distribution positions of the pixel data and the depth data of an image in an example embodiment of the present disclosure.

Referring to FIG. 22, respective pixels of texture image 1 are represented by image 1 pixel 1, image 1 pixel 2, and other pixels not shown in the figure, and may be stored in consecutive fields, which may be used as the first fields. The corresponding depth data of texture image 1 is represented by image 1 depth value 1, image 1 depth value 2, and the other depth data not shown in the figure, and may be stored in the fields adjacent to the first fields. These fields may be used as the second fields. Similarly, the pixel data of texture image 2 may be stored in the first fields, and the depth data corresponding to texture image 2 may be stored in the adjacent second fields.

Those skilled in the art may understand that respective images in the image stream or respective frame images in the video stream that are continuously captured by one capturing device of multiple synchronized capturing devices may be used as the above image 1 respectively. Similarly, among the multiple synchronized capturing devices, the two-dimensional image captured in synchronization with texture image 1 may be used as texture image 2. The capturing device may be the capturing device shown in FIG. 2, or capturing devices in other scenarios.

Figure 23:
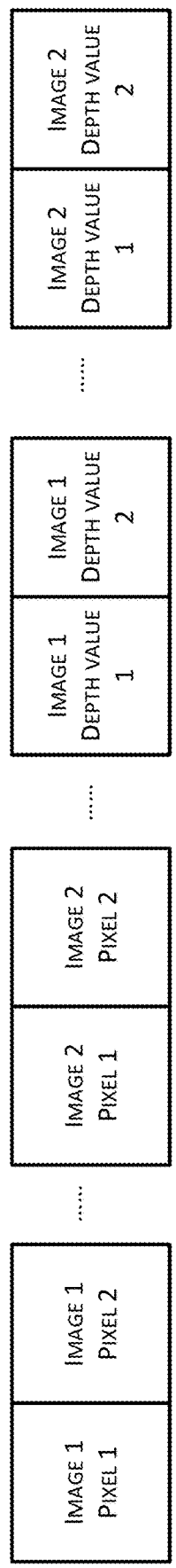
FIG. 23 is a schematic diagram of distribution positions of the pixel data and the depth data of another image in an example embodiment of the present disclosure.

Referring to FIG. 23, the pixel data of texture image 1 and the pixel data of texture image 2 may be stored in multiple adjacent first fields, and the depth data corresponding to texture image 1 and the depth data corresponding to texture image 2 may be stored in multiple adjacent second fields.

Figure 24:
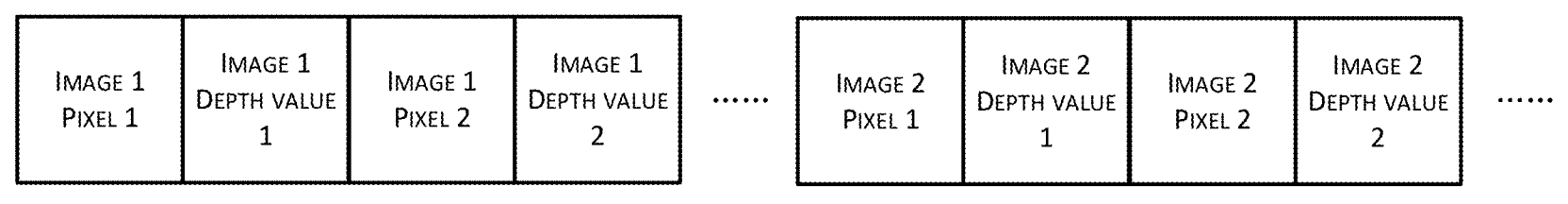

Referring to FIG. 24, the pixel data of each image in the multiple images may be stored in multiple fields respectively, and these fields may be used as the first fields. Fields storing the pixel data may be interleaved with fields storing the depth values.

Referring to FIG. 25, the pixel data and the corresponding depth values of different texture images may also be arranged in the interleaving manner. For example, image 1 pixel 1, image 1 depth value 1, image 2 pixels 1, image 2 depth value 1, . . . may be sequentially stored until the completion of storing the pixel data and the depth data corresponding to the first pixel of each image of the multiple images. The adjacent fields thereof store image 1 pixel 2, image 1 depth value 2, image 2 pixel 2, image 2 depth value 2, . . . until the completion of storing of the pixel data and the depth data of each image.

In summary, the fields storing the pixel data of each two-dimensional image may be used as the first fields, and the fields storing the depth data corresponding to the two-dimensional image may be used as the second fields. For each generated multi-angle free-perspective data, the first fields and the second fields associated with the first fields may be included respectively.

Those skilled in the art may understand that the above respective example embodiments are merely examples, and are not specific limitations on the type, size, and arrangement of the fields.

Referring to FIG. 3, the multi-angle free-perspective data including the first fields and the second fields may be stored in a server 32 in the cloud, transmitted to the CDN or to the device 33 that performs displaying, for reconstructing the image.

In implementations, both the first fields and the second fields may be pixel fields in the stitched image. The stitched image is used to store the pixel data and the depth data of the multiple images. By using image format for data storage, the amount of data may be reduced, the time length of data transmission may be reduced, and the resource occupation may be reduced.

The stitched image may be an image in various formats such as BMP format, JPEG format, PNG format, and the like. These image formats may be the compressed format or the uncompressed format. Those skilled in the art may understand that the two-dimensional image in various formats may include fields corresponding to respective pixels, which are referred to as pixel fields. The size of the stitched image, i.e., parameters like the number of pixels and the aspect ratio of the stitched image, may be determined according to needs, for example, may be determined based on the number of the multiple synchronized two-dimensional images, the amount of data to be stored in each two-dimensional image, the amount of the depth data to be stored in each two-dimensional image, and other factors.

In implementations, among the multiple synchronized two-dimensional images, the depth data corresponding to the pixels of each two-dimensional image and the number of bits of the pixel data may be associated with the format of the stitched image.

For example, when the format of the stitched image is the BMP format, the range of the depth value may be 0-255, which is 8-bit data, and the data may be stored as the gray value in the stitched image. Alternatively, the depth value may also be 16-bit data, which may be stored as the gray value at two pixel positions in the stitched image. Alternatively, the gray value may be stored in two channels at one pixel position in the stitched image.

When the format of the stitched image is the PNG format, the depth value may also be 8-bit or 16-bit data. In the PNG format, the depth value of 16-bit may be stored as the gray value of one pixel position in the stitched image.

Those skilled in the art may understand that the above example embodiments are not limitations on the storage manner or the number of data bits, and other data storage manners that may be implemented by those skilled in the art fall within the protection scope of the present disclosure.

In implementations, the stitched image may be split into a texture image area and a depth map area. The pixel fields of the texture image area store the pixel data of the multiple two-dimensional images, and the pixel fields of the depth map area store the depth data of the multiple images. The pixel fields storing the pixel data of each two-dimensional image in the texture image area are used as the first fields, and the pixel fields storing the depth data of each image in the depth map area are used as the second fields.

In implementations, the texture image area may be a continuous area, and the depth map area may also be a continuous area.

Further, in implementations, the stitched image may be equally split, and the two split parts are used as the texture image area and the depth map area respectively. Alternatively, the stitched image may also be split in an unequal manner according to the amount of the pixel data and the amount of the depth data of the two-dimensional image to be stored.

Figure 26:
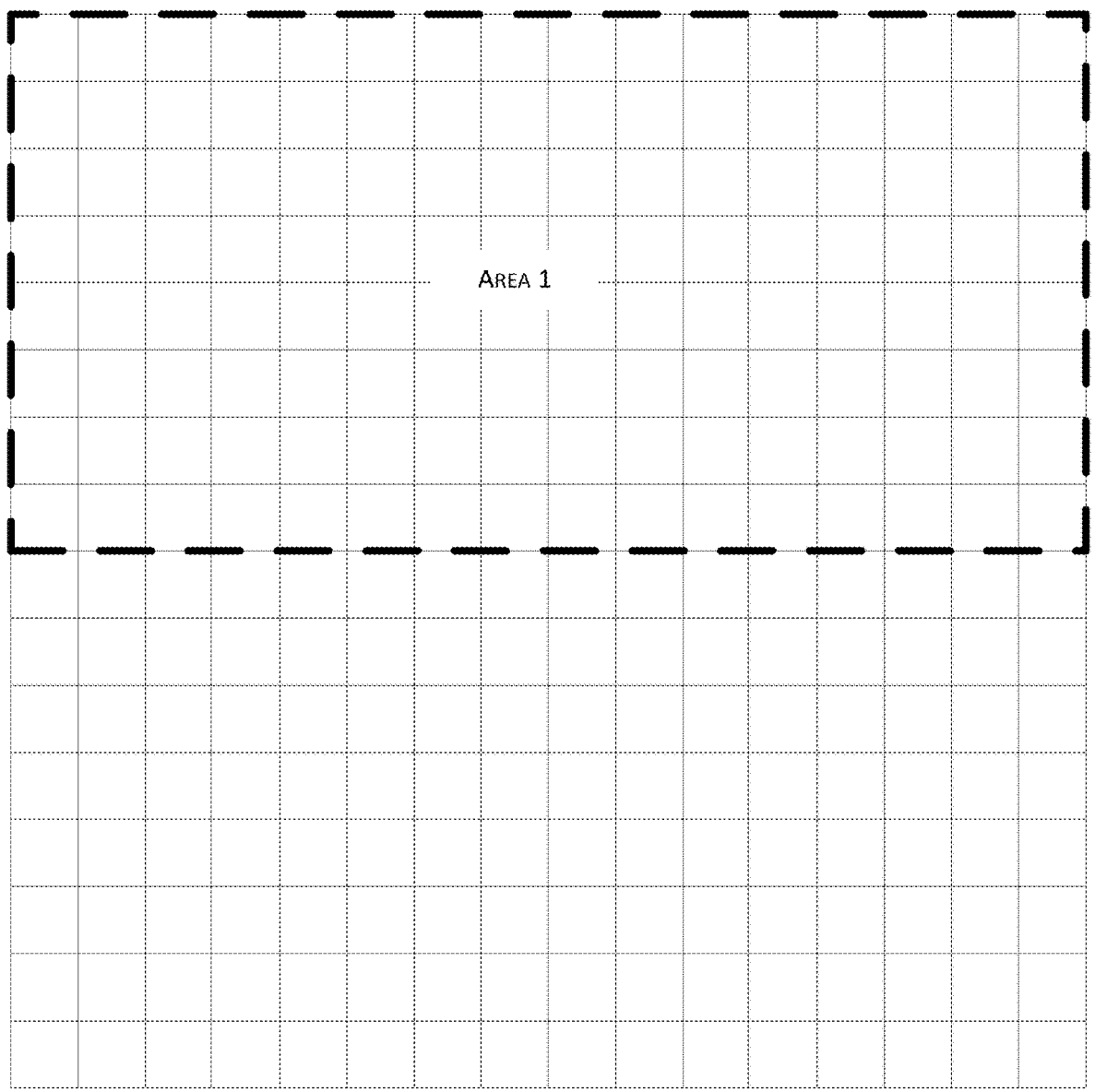
FIG. 26 is a schematic diagram of image area stitching in an example embodiment of the present disclosure.

For example, referring to FIG. 26, one pixel is represented by each minimum square, then the texture image area may be area 1 within the dashed frame, i.e., the upper half area after the stitched image is split equally up and down. The lower half area of the stitched image may be used as the depth map area.

Those skilled in the art may understand that FIG. 26 is merely for illustration, and the number of the minimum squares therein is not a limitation on the number of pixels of the stitched image. In addition, the method of equal splitting may be equally splitting the stitched image left and right.

In implementations, the texture image area may include multiple texture image sub-areas. Each texture image sub-area is used to store one of the multiple images. The pixel fields of each texture image sub-area may be used as the first fields. Accordingly, the depth map area may include multiple depth map sub-areas. Each depth map sub-area is used to store the depth data of one of the multiple depth maps. The pixel fields of each depth map sub-area may be used as the second fields.

The number of texture image sub-areas and the number of depth map sub-areas may be equal, both of which are equal to the number of multiple synchronized images. In other words, the number of image sub-areas and the number of depth map sub-areas may be equal to the number of cameras described above.

Referring to FIG. 27, equally splitting the stitched image up and down is still taken as an example for further description. The upper half of the stitched image in FIG. 27 is the texture image area, which is split into eight texture image sub-areas, which store the pixel data of the synchronized eight texture images respectively. Each image has a different shooting angle, i.e., a different perspective. The lower half of the stitched image is the depth map area, which is split into 8 depth map sub-areas, which store the depth maps of the 8 images respectively.

With reference to the descriptions above, the pixel data of the synchronized 8 texture images, i.e., perspective 1 texture image to perspective 8 texture image, may be the original images obtained from the cameras, or may be images after the original images are reduced in resolution. The depth data is stored in a partial area of the stitched image and may also be referred to as the depth map.

As described above, in implementations, the stitched image may also be split in an unequal manner. For example, referring to FIG. 28, the number of pixels occupied by the depth data may be less than the number of pixels occupied by the pixel data of the texture image. Then, the texture image area and the depth map area may have different sizes. For example, the depth data may be obtained by quarter-down-sampling the depth map, and a splitting manner as shown in FIG. 28 may be used. The number of pixels occupied by the depth map may also be greater than the number of pixels occupied by the pixel data of the image.

Those skilled in the art may understand that FIG. 28 is not a limitation on the splitting of the stitched images in the unequal manner. In implementations, the number of pixels and the aspect ratio of the stitched image may be various, and the splitting manner may also be various.

In implementations, the texture image area or the depth map area may also include multiple areas. For example, as shown in FIG. 29, the texture image area may be a continuous area, and the depth map area may include two continuous areas.

Alternatively, referring to FIG. 30 and FIG. 31, the texture image area may include two continuous area, and the depth map area may also include two continuous areas. The texture image areas and the depth areas may be arranged in the interleaving manner.

Alternatively, referring to FIG. 32, the texture image sub-areas included in the texture image area may be arranged in the interleaving manner with the depth map sub-areas included in the depth map area. The number of continuous areas included in the texture image area may be equal to the number of texture image sub-areas, and the number of continuous areas included in the depth map area may be equal to the number of sub-areas in the depth map.

In implementations, the pixel data of each texture image may be stored in the texture image sub-areas in the order of the arrangement of pixel points. The depth data of each texture image may also be stored in the depth map sub-areas in the order of the arrangement of pixel points.

Figure 33:
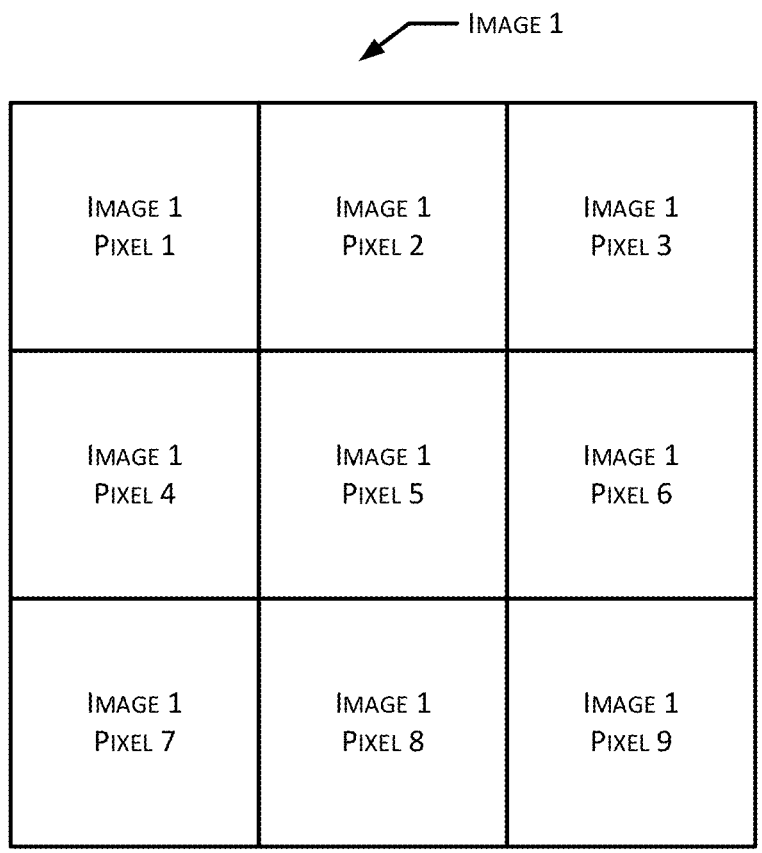
FIG. 33 is a schematic diagram of the pixel data distribution of an image in an example embodiment of the present disclosure.
Figure 34:
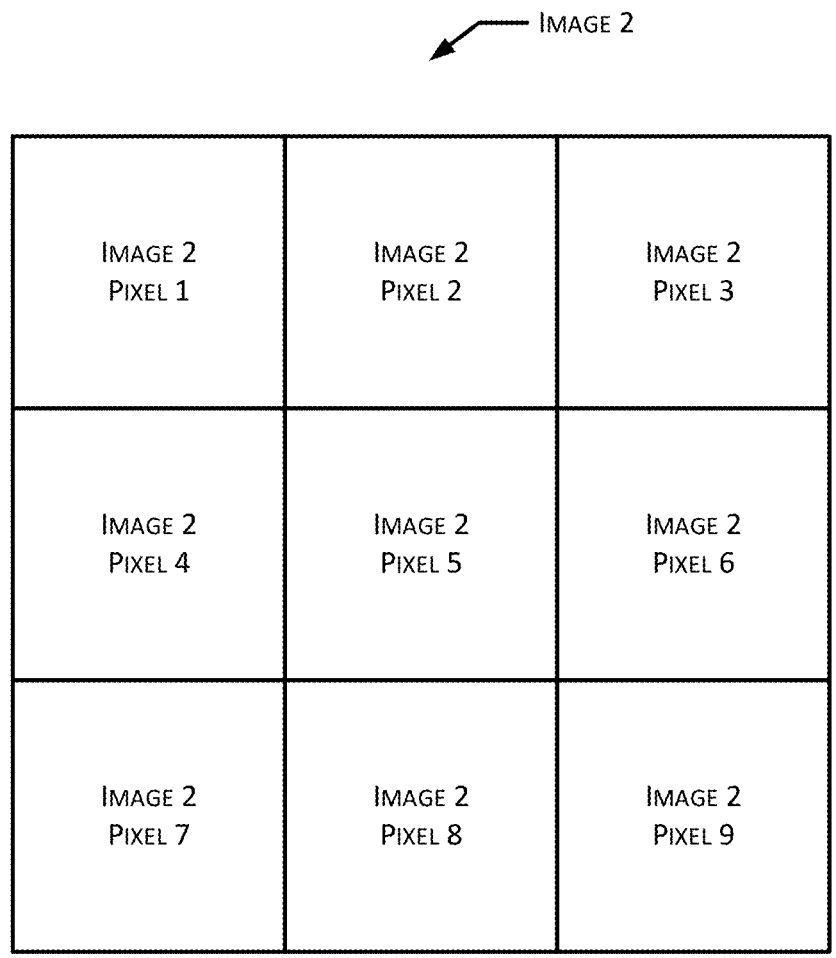
FIG. 34 is a schematic diagram of another pixel data distribution of an image in an example embodiment of the present disclosure.

Referring to FIG. 33 to FIG. 35, FIG. 33 illustrates texture image 1 with 9 pixels, and FIG. 34 illustrates texture image 2 with 9 pixels, where texture image 1 and texture image 2 are two synchronized images with different angles. According to image 1 and image 2, the depth data corresponding to texture image 1 may be obtained, including image 1 depth value 1 to image 1 depth value 9. Also, the depth data corresponding to texture image 2 may be obtained, including image 2 depth value 1 to image 2 depth value 9.

Referring to FIG. 35, when texture image 1 is stored in the image sub-areas, texture image 1 may be stored in the upper-left texture image sub-area in the order of the arrangement of pixel points. That is, in the texture image sub-areas, the arrangement of pixel points may be the same as texture image 1. When texture image 2 is stored in the image sub-areas, similarly, texture image 2 may be stored in the upper-right texture image sub-areas in this manner.

Similarly, when the depth data of texture image 1 is stored into the depth map sub-areas, image 1 may be stored in a similar manner. In the case where the depth value corresponds to the pixel value of the texture image on a one-to-one basis, the depth data of image 1 may be stored in a manner as shown in FIG. 35. If the depth values are obtained after down-sampling the original depth map, the depth data of image 1 may be stored in the depth map sub-areas in the order of the arrangement of pixel points of the depth map obtained after the down-sampling.

Those skilled in the art may understand that the compression ratio of compressing the image is related to the association of respective pixel points in the image. The stronger the association is, the higher the compression ratio is. Since the captured image corresponds to the real world, the association of respective pixel points is strong. By storing the pixel data and the depth data of the image in the order of the arrangement of pixel points, the compression ratio when compressing the stitched image may be higher. That is, the amount of data after compression may be made smaller if the amount of data before compression is the same.

By splitting the stitched image into the texture image area and the depth map area, in the case where multiple texture image sub-areas are adjacent in the texture image area or multiple depth map sub-areas are adjacent in the depth map area, since the data stored in the respective texture image sub-areas is obtained from images or frame images in the videos taken from different angles of the to-be-viewed area, all the depth maps are stored in the depth map area, and thus when the stitched image is compressed, a higher compression ratio may also be obtained.

In implementations, padding may be performed on all or some of the texture image sub-areas and the depth map sub-areas. The form of padding may be various. For example, taking perspective 1 depth map in FIG. 31 as an example, redundant pixels may be set around the original perspective 1 depth map. Alternatively, the number of pixels in the original perspective 1 depth map may be maintained, while redundant pixels which do not actually store the pixel data are reserved around the original perspective 1 depth map, and the original perspective 1 depth map is reduced and stored in the remaining pixels. Alternatively, other manners may be used to make redundant pixels set aside between perspective 1 depth map and other surrounding images finally.

Because the stitched image includes multiple texture images and depth maps, the association between adjacent borders of respective texture images is poor. By performing padding, quality loss of the texture images and the depth maps in the stitched image may be reduced when the stitched image is compressed.

In implementations, the pixel field of the texture image sub-area may store three-channel data, and the pixel field of the depth map sub-area may store single-channel data. The pixel field of the texture image sub-area is used to store the pixel data of any one of the multiple synchronized two-dimensional images. The pixel data is usually three-channel data, such as RGB data or YUV data.

The depth map sub-areas are used to store the depth data of the image. If the depth value is 8-bit binary data, a single channel of the pixel field may be used for storage. If the depth value is 16-bit binary data, two channels of the pixel field may be used for storage. Alternatively, the depth value may also be stored with a larger pixel area. For example, if the multiple synchronized images are all 1920*1080 images and the depth values are 16-bit binary data, the depth values may also be stored in a doubled 1920*1080 image area, where each texture image area is stored with the single channel. The stitched image may also be split in combination with the storage manner.

The uncompressed amount of data of the stitched image is stored in such a way that each channel of each pixel occupies 8 bits, which may be calculated according to the following formula, i.e., the number of the multiple synchronized two-dimensional images*(the amount of data of the pixel data of the two-dimensional image+the amount of data of the depth map).

If the original image has a resolution of 1080P, i.e., 1920*1080 pixels, with a progressive scan format, the original depth map may also occupy 1920*1080 pixels, which is the single channel. The amount of data of pixels of the original image is 1920*1080*8*3 bits, and the amount of data of the original depth map is 1920*1080*8 bits. If the number of cameras is 30, the amount of data of pixels of the stitched image is 30*(1920*1080*8*3+1920*1080*8) bits, which is about 237M. If not compressed, the stitched image will occupy a lot of system resources and have a large delay. Especially when the bandwidth is small, for example, when the bandwidth is 1 Mbps, the uncompressed stitched image needs about 237 seconds to be transmitted. The real-time performance is poor, and the user experience needs to be improved.

By one or more of manners such as storing regularly to obtain a higher compression ratio, reducing the resolution of the original image, or using the pixel data with reduced resolution as the pixel data of the two-dimensional image, or performing down-sampling on one or more of the original depth maps, and the like, the amount of data of stitched image may be reduced.

For example, if the resolution of the original two-dimensional image is 4K, i.e., the pixel resolution of 4096*2160, and the down-sampling has a resolution of 540P, i.e., the pixel resolution of 960*540, the number of pixels of the stitched image is approximately one-sixteenth of the number of pixels before down-sampling. In combination with any one or more of other manners for reducing the amount of data described above, the amount of data may be made smaller.

Those skilled in the art may understand that if the bandwidth is supportive and the decoding capability of the device that performs data processing may support the stitched image with higher resolution, the stitched image with higher resolution may also be generated to improve the image quality.

Those skilled in the art may understand that in different application scenarios, the pixel data and the corresponding depth data of the multiple synchronized two-dimensional images may also be stored in other manners, for example, stored in the stitched image in units of pixel points. Referring to FIG. 33, FIG. 34, and FIG. 36, image 1 and image 2 shown in FIG. 33 and FIG. 34 may be stored in the stitched image in the manner of FIG. 36. In summary, the pixel data and the corresponding depth data of the two-dimensional image may be stored in the stitched image. The stitched image may be split into the texture image area and the depth map area in various manners. Alternatively, the stitched image may be without splitting.

The pixel data and the depth data of the texture image are stored in a preset order. In implementations, the multiple synchronized two-dimensional images may also be multiple synchronized frame images obtained by decoding multiple videos. The videos may be acquired by multiple cameras, and the settings thereof may be the same as or similar to the cameras that acquire the two-dimensional images as described above.

In implementations, generating the multi-angle free-perspective image data may further include generating the association relationship field, and the association relationship field may indicate the association relationship between the first field and at least one second field. The first field stores the pixel data of one two-dimensional image of the multiple synchronized two-dimensional images, and the second field stores the depth data corresponding to the two-dimensional image, where the first field and the second field correspond to the same shooting angle, i.e., the same perspective. The association relationship between the first field and the second field may be described by the association relationship field.

Taking FIG. 27 as an example, the area where perspective 1 texture image to perspective 8 texture image are stored in FIG. 27 includes 8 first fields, and the area where perspective 1 depth map to perspective 8 depth map are stored includes 8 second fields. There is an association relationship between the first field of perspective 1 texture image and the second field of perspective 1 depth map. Similarly, there is an association relationship between the field storing the perspective 2 texture image and the field storing the perspective 2 depth map.

The association relationship field may indicate the association relationship between the first field and the second field of each two-dimensional image of the multiple synchronized two-dimensional images in various manners, for example, may be content storage rules of the pixel data and the depth data of the multiple synchronized two-dimensional images, that is, indicating the association relationship between the first field and the second field through indicating the storage manner described above.

In implementations, the association relationship field may only include different mode numbers. The device that performs data processing may learn the storage manner of the pixel data and the depth data in the obtained multi-angle free-perspective image data according to the mode number of the field and the data stored in the device that performs data processing. For example, if the received mode number is 1, the storage manner is parsed as follows. The stitched image is equally split into two areas up and down, where the upper half area is the texture image area, and the lower half area is the depth map area. The texture image at a certain position in the upper half area is associated with the depth map stored at the corresponding position in the lower half area.

Those skilled in the art may understand that the manner of storing the stitched image in the above example embodiments, for example, the storage manners illustrated in FIG. 27 to FIG. 36, may be described by corresponding association relationship field, so that the device that performs data processing may obtain the associated two-dimensional image and the depth data according to the association relationship field.

As described above, the picture format of the stitched image may be any one of the two-dimensional image formats such as BMP, PNG, JPEG, Webp and the like, or other image formats. The storage manner of the pixel data and the depth data in multi-angle free-perspective image data is not limited to the manner of stitched image. The pixel data and the depth data in multi-angle free-perspective image data may be stored in various manners, and may also be described by the association relationship field.

Similarly, the storage manner may also be indicated in a manner of mode number. For example, in the storage manner shown in FIG. 23, the association relationship field may store the mode number 2. After reading the mode number, the device that performs data processing may parse that the pixel data of the multiple synchronized two-dimensional images are stored sequentially. The device that performs data processing may also parse the length of the first field and the length of the second field, where the depth data of each image is stored in the same storage order as the two-dimensional image after the storage of multiple first fields is complete. Further, the device that performs data processing may determine the association relationship between the pixel data and the depth data of the two-dimensional image according to the association relationship field.

Those skilled in the art may understand that storage manners of the pixel data and the depth data of the multiple synchronized two-dimensional images may be various, and expression manners of the association relationship field may also be various. The association relationship field may be indicated by the above mode number or may directly indicate the content. The device that performs data processing may determine the association relationship between the pixel data and the depth data of the two-dimensional image according to the content of the association relationship field with reference to stored data or other priori knowledge such as the content corresponding to each mode number or the specific number of the multiple synchronized images, and the like.

In implementations, generating the multi-angle free-perspective image data may further include, calculating and storing parameter data of each two-dimensional image based on the multiple synchronized two-dimensional images, and the parameter data includes data of the shooting position and the shooting angle of the two-dimensional image.

With reference to the shooting position and the shooting angle of each image of the multiple synchronized two-dimensional images, the device that performs data processing may determine the virtual viewpoint in the same coordinate system with reference to the user's needs, and perform the reconstruction of the image based on the multi-angle free-perspective image data, to show the user the expected viewing position and perspective.

In implementations, the parameter data may further include internal parameter data. The internal parameter data includes attribute data of the image capturing device. The above data of the shooting position and shooting angle of the image may also be referred to as external parameter data. The internal parameter data and external parameter data may be referred to as attitude data. With reference to the internal parameter data and external parameter data, factors indicated by internal parameter data such as lens distortion may be taken into account during image reconstruction, and the image of the virtual viewpoint may be reconstructed more accurately.

In implementations, generating the multi-angle free-perspective image data may further include generating a parameter data storage address field, where the parameter data storage address field is used to indicate the storage address of the parameter data. The device that performs data processing may obtain the parameter data from the storage address of the parameter data.

In implementations, generating the multi-angle free-perspective image data may further include generating a data combination storage address field, which is used to indicate the storage address of the data combination, i.e., to indicate the storage addresses of the first field and the second field of each image of the multiple synchronized images. The device that performs data processing may obtain the pixel data and the corresponding depth data of the multiple synchronized two-dimensional images from the storage space corresponding to the storage address of the data combination. From this perspective, the data combination includes the pixel data and the depth data of the multiple synchronized two-dimensional images.

Those skilled in the art may understand that the multi-angle free-perspective image data may include specific data such as the pixel data of the two-dimensional image, the corresponding depth data of the two-dimensional image, and parameter data, and the like, as well as other indicative data such as the above generated association relationship field, and parameter data storage address field, data combination storage address field, and the like. These pieces of indicative data may be stored in the data header file to instruct the device that performs data processing to obtain the data combination, the parameter data, and the like.

In implementations, the terminology explanations, implementation manners, and beneficial effects involved in respective example embodiments of generating multi-angle free-perspective data may refer to other example embodiments.

Referring to FIG. 3, for the above generated multi-angle free-perspective image combination data, the multi-angle free-perspective data may be transmitted via the network to the device 33 that performs displaying for virtual viewpoint switching. The device 33 that performs displaying may display the reconstructed image generated after image reconstruction based on the multi-angle free-perspective data.

In order to enable those skilled in the art to better understand and implement the example embodiments of the present disclosure, hereinafter, the image reconstruction method is further described.

Figure 37:
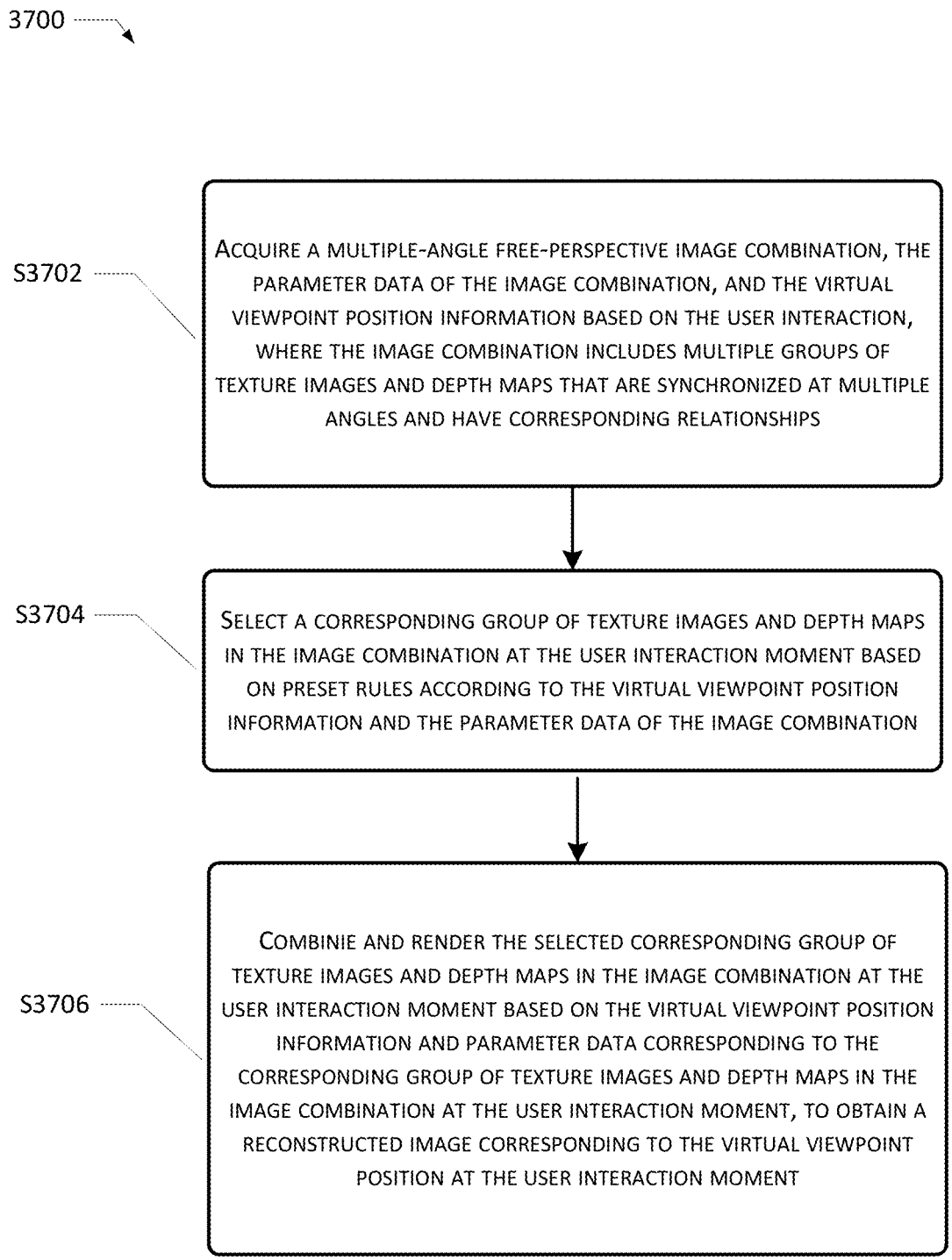
FIG. 37 is a flowchart of an image reconstruction method in an example embodiment of the present disclosure.

Referring to FIG. 37, which is a flowchart of an image reconstruction method 3700 in an example embodiment of the present disclosure, in implementations, the following method may be used for image reconstruction.

S3702, acquiring a multiple-angle free-perspective image combination, the parameter data of the image combination, and the virtual viewpoint position information based on the user interaction, where the image combination includes multiple groups of texture images and depth maps that are synchronized at multiple angles and have corresponding relationships.

In implementations, as described above, multiple cameras, video cameras, and the like may be used to capture images at multiple angles in a scenario.

The image in the multi-angle free-perspective image combination may be a completely free-perspective image. In implementations, the image may have a 6 degrees of freedom (DoF) perspective. That is, the spatial position and the perspective of the viewpoint may be freely switched. As described above, the spatial position of the viewpoint may be expressed as coordinates (x, y, z), and the perspective may be expressed as three directions of rotation ($\theta$, $\varphi$, $\gamma$). Thus, the perspective may be referred to as 6DoF.

During the image reconstruction process, the multi-angle free-perspective image combination and the parameter data of the image combination may be acquired first.

In implementations, as described above, multiple groups of synchronized texture images and depth maps that have corresponding relationships in the image combination may be stitched together to form a frame of stitched image, specifically referring to the stitched image structures as shown in FIG. 27 to FIG. 32. Each frame of stitched image in the above example embodiments may be used as an image combination. Referring the schematic diagram of a structure of a stitched image in an example embodiment of the present disclosure as shown in FIG. 27, the diagram includes 8 synchronized texture images of different perspectives and the depth maps at the corresponding perspectives that are stitched sequentially.

Referring to FIG. 27 to FIG. 32, multiple groups of texture images and depth maps in the image combination may be stitched, combined, and arranged according to a preset relationship. Specifically, the texture images and the depth maps of the image combination may be split into a texture image area and a depth map area according to the position relationship. The texture image area stores the pixel values of respective texture images respectively, and the depth map area stores the depth values corresponding to the respective texture images according to a preset position relationship. The texture image area and the depth map area may be continuous or arranged in the interleaving manner. In the example embodiment of the present disclosure, the position relationship between the texture images and the depth maps in the image combination is not limited in any way.

For the specific relationship between the multiple groups of texture images and depth maps in the image combination, reference may be made to the description of the above example embodiments, and details are not repeated herein.

In implementations, the texture images in the image combination correspond to the depth maps on a one-to-one basis, where the texture image may use any type of two-dimensional image format, for example, any one of formats of BMP, PNG, JPEG, webp, and the like. The depth map may represent the distance of a respective point in the scenario with respect to the shooting device. That is, each pixel value in the depth map represents the distance between a certain point in the scenario and the shooting device.

As described above, in order to save transmission bandwidth and storage resources, the image combination may be transmitted or stored in a compressed format. For the obtained two-dimensional image in the compressed format, decoding may be performed first, to obtain multiple groups of synchronized two-dimensional images in the corresponding image combination. In implementations, decompression software, decompression hardware, or a decompression apparatus combining software and hardware that can recognize the compressed format may be used.

In implementations, parameter data of images in the combination may be acquired from the attribute information of the images.

As described above, the parameter data may include external parameter data, and may further include internal parameter data. The external parameter data is used to describe the space coordinates, the posture, and the like of the shooting device. The internal parameter data is used to describe the attribute information of the shooting device such as the optical center, focal length, and the like of the device. The internal parameter data may also include distortion parameter data. The distortion parameter data includes radial distortion parameter data and tangential distortion parameter data. Radial distortion occurs during the process of the shooting device coordinate system transferred to the image physical coordinate system. The tangential distortion occurs during the manufacturing process of the shooting device, because the plane of the photosensitive element is not parallel to the lens. Based on external parameter data, information such as the shooting position, the shooting angle, and the like of the image may be determined. During the image reconstruction process, with reference to the internal parameter data including the distortion parameter data, the determined spatial projection relationship may be more accurate.

In implementations, the image combinations in the above example embodiments may be used as the data file in the example embodiments of the present disclosure. In an application scenario where the bandwidth is limited, the image combination may be split into multiple parts for multiple transmissions.

In implementations, using the 6DoF expression, virtual viewpoint position information based on user interaction may be represented in the form of coordinates (x, y, z, θ, φ, γ), where the virtual viewpoint position information may be generated under one or more preset user interaction manners. For example, the user interaction manner may be coordinates input by user operations, such as manual clicks or gesture paths, or virtual positions determined by voice input, or customized virtual viewpoints provided to the user (for example, the user may enter positions or perspectives in the scenario, such as under the hoop, at the sideline, referee perspective, coach perspective, and the like). Alternatively, based on a specific object such as a player in the game, an actor or a guest, a host in the image, and the like, the perspective may be switched to the object's perspective after the user clicks the corresponding object. Those skilled in the art may understand that the specific user interaction manner is not limited in the example embodiments of the present disclosure, as long as the virtual viewpoint position information based on the user interaction may be obtained.

S3704, selecting a corresponding group of texture images and depth maps in the image combination at the user interaction moment based on preset rules according to the virtual viewpoint position information and the parameter data of the image combination.

In implementations, according to the virtual viewpoint position information and the parameter data of the image combination, the corresponding group of texture images and depth maps in the image combination at the user interaction moment that meets a preset position relationship and/or quantitative relationship with the virtual viewpoint position may be selected. For example, for a virtual viewpoint position area with a large camera density, the textures map and the corresponding depth maps shot by only two cameras closest to the virtual viewpoint may be selected, while in the virtual viewpoint position area with a small the camera density, the texture images and the corresponding depth maps shot by three or four cameras closest to the virtual viewpoint may be selected.

In an example embodiment of the present disclosure, according to the virtual viewpoint position information and the parameter data corresponding to the corresponding group of texture images and depth maps in the image combination at the user interaction moment, texture images and depth maps corresponding to 2 to N capturing devices closest to the virtual viewpoint position are selected, where N is the number of all capturing devices that capture the image combination. For example, the texture images and the depth maps corresponding to two capture devices closest to the virtual viewpoint position may be selected by default. In implementations, the user may set the number of the selected capturing devices closest to the virtual viewpoint position, and the maximum number does not exceed the number of the capturing devices corresponding to the image combination in the video frame.

With this manner, there is no special requirement on the spatial position distribution of the multiple shooting devices that capture images (for example, the arrangement may be a linear distribution, an arc array arrangement, or any irregular arrangement form). Rather, the actual distribution situation of the shooting devices is determined according to the obtained virtual viewpoint position information and parameter data corresponding to the image combination. Then, the corresponding group of texture images and depth maps in the image combination at the user interaction moment may be selected using adaptive strategies. Thus, a higher degree of freedom and flexibility of selection may be provided in the case of reducing the amount of data operation and ensuring the quality of the reconstructed image. In addition, installation requirements for the shooting devices that capture images are also lowered, thereby facilitating the adaption to different site requirements and easy operation of installation.

In an example embodiment of the present disclosure, according to the virtual viewpoint position information and the parameter data of the image combination, a preset number of corresponding groups of texture images and depth maps in the image combination at the user interaction moment closest to the virtual viewpoint position are selected.

Those skilled in the art may understand that, in implementations, the corresponding group of texture images and depth maps may also be selected from the image combination using other preset rules, for example, also according to the processing capability of the image reconstruction device, or may be according to the user's requirements for the reconstruction speed, the clarity requirements of the reconstructed image (such as Standard Definition, High Definition or Ultra High Definition, and the like).

S3706, combining and rendering the selected corresponding group of texture images and depth maps in the image combination at the user interaction moment based on the virtual viewpoint position information and parameter data corresponding to the corresponding group of texture images and depth maps in the image combination at the user interaction moment, to obtain a reconstructed image corresponding to the virtual viewpoint position at the user interaction moment.

In implementations, the corresponding group of texture images and depth maps in the image combination at the user interaction moment may be combined and rendered using various manners, to obtain a reconstructed image corresponding to the virtual viewpoint position at the user interaction moment.

In an example embodiment of the present disclosure, according to the corresponding group of depth maps in the image combination at the user interaction moment, the pixel points in the corresponding group of texture images are directly copied to the generated virtual texture images, and a reconstructed image corresponding to the virtual viewpoint position at the user interaction moment may be obtained.

In another example embodiment of the present disclosure, the image is reconstructed in the following way: the selected corresponding groups of depth maps in the image combination at the user interaction moment are respectively forwardly projected to the virtual position at the user interaction moment; the selected corresponding groups of texture images in the image combination at the user interaction moment are respectively backwardly projected; and the respective generated virtual texture images are fused after the backward projection.

In implementations, the above fused texture image may be output as the reconstructed image corresponding to the virtual viewpoint position at the user interaction moment.

In implementations, in addition to the texture images, the reconstructed image may also include corresponding depth maps. There may be various manners to obtain the corresponding depth maps. For example, for the corresponding depth map, one of the depth maps obtained after post-processing may be randomly selected as the depth map of the reconstructed image. For another example, the depth map closest to the virtual viewpoint position at the user interaction moment may be selected from the depth maps obtained after the post-processing as the depth map of the reconstructed image. If there are more than one depth maps closest to the virtual viewpoint position, any one of them may be selected. As another example, the post-processed depth maps may be fused to obtain a reconstructed depth map.

In implementations, after fusing respective virtual texture images generated after the backward projection, the inpainting may be performed on the fused texture image to obtain a reconstructed image corresponding to the virtual viewpoint position at the user interaction moment.

In implementations, various manners may be used to post-process the depth maps respectively after the forward projection. For example, foreground padding processing may be performed on the depth maps after the forward projection, and pixel-level filtering processing may also be performed on the depth maps after the forward projection. A certain post-processing action may be performed individually. Alternatively, multiple post-processing actions may be used simultaneously.

In an example embodiment of the present disclosure, the virtual texture images generated after the backward projection are fused in the following manner: according to the virtual viewpoint position information and the parameter data corresponding to the corresponding group of texture images and depth maps in the image combination at the user interaction moment, using the global weight determined by the distance between the virtual viewpoint position and the position of the capturing device that captures the corresponding texture image in the image combination, the respective virtual texture images generated after the backward projection are fused.

In an example embodiment of the present disclosure, the forward projection may be performed first, and the depth information is used to project a corresponding group of texture images in the image combination to the three-dimensional Euclidean space. That is, the depth maps of the corresponding group are respectively projected to the virtual viewpoint position at the user interaction moment according to the spatial geometric relationship, to form the depth map of the virtual viewpoint position. Next, the backward projection is performed to project the three-dimensional spatial points onto the imaging plane of the virtual camera, that is, copying from the pixel points in the texture images of the corresponding group to the generated virtual texture images corresponding to the virtual viewpoint position according to the projected depth maps, to form the virtual texture images corresponding to the corresponding group. Next, the virtual texture images corresponding to the corresponding group are fused to obtain the reconstructed image of the virtual viewpoint position at the user interaction moment. With the above method for reconstructing the image, the sampling accuracy of the reconstructed image may be improved.

Before the forward projection is performed, preprocessing may be performed first. Specifically, according to the parameter data corresponding to the corresponding group in the image combination, the depth value of forward projection and the homography matrix of the texture backward projection may be calculated first. In implementations, the Z transformation may be used to convert the depth level into the depth value.

In the depth map forward projection process, formulas may be used to map the depth map of the corresponding group to the depth map of the virtual viewpoint position, and then copy the depth value of the corresponding position. In addition, the depth map of the corresponding group may be noisy, and some sampled signals may be included in the mapping process, so the generated depth map of the virtual viewpoint position may have small noise holes. To solve this problem, median filtering may be used to remove noise.

In implementations, other postprocessing may also be performed on the depth maps of the virtual viewpoint position obtained after the forward projection according to needs, to further improve the quality of the generated reconstructed image. In an example embodiment of the present disclosure, before the backward projection is performed, the front and back view occlusion relationship of the depth maps of the virtual viewpoint position obtained by the forward projection is processed, so that the generated depth maps may more truly reflect the positional relationship of objects in the scenario viewed at the virtual viewpoint position.

For the backward projection, specifically, the position of the corresponding group of texture images in the virtual texture images may be calculated according to the depth maps of the virtual viewpoint position obtained by the forward projection. Next, the texture values corresponding to the pixel positions are copied, where holes in the depth maps may be marked as 0 or as no texture value in the virtual texture images. For the areas marked as the holes, the hole expansion may be performed to avoid synthetic illusion.

Next, the generated corresponding groups of virtual texture images are fused to obtain the reconstructed image of the virtual viewpoint position at the user interaction moment. In implementations, the fusion may also be performed in various manners. The following two example embodiments are used for illustration.

In an example embodiment of the present disclosure, weighting processing is performed first, and then inpainting is performed. Specifically, the weighting processing is performed on pixels in corresponding positions in the virtual texture images corresponding to the respective corresponding groups in the image combination at the user interaction moment, to obtain the pixel values of the corresponding positions in the reconstructed image of the virtual viewpoint position at the user interaction moment. Next, for the position where the pixel value is zero in the reconstructed image of the virtual viewpoint position at the user interaction moment, the pixels around the pixel in the reconstructed image are used to perform the inpainting, to obtain the reconstructed image of the virtual viewpoint position at the user interaction moment.

In another example embodiment of the present disclosure, inpainting is performed first, and then weighting processing is performed. Specifically, for the position where the pixel value is zero in the virtual texture images corresponding to the respective corresponding groups in the image combination at the user interaction moment, the around pixel values are used respectively to perform inpainting. Next, after the inpainting, the weighting processing is performed on the pixel values in corresponding positions in the virtual texture images corresponding to the respective corresponding groups, to obtain the reconstructed image of the virtual viewpoint position at the user interaction moment.

The weighting processing in the above example embodiment may specifically use the weighted average method, or may use different weighting coefficients according to parameter data of the camera or the positional relationship between the shooting camera and the virtual viewpoint. In an example embodiment of the present disclosure, the weighting is performed according to the reciprocal of the distance between the position of the virtual viewpoint and the positions of the respective cameras, i.e., the closer the camera to the virtual viewpoint position is, the greater the weight is.

In implementations, the inpainting may be performed with a preset inpainting algorithm according to needs, and details are not described herein again.

Hereinabove, how to combine and render the corresponding group of texture images and depth maps in the image combination at the moment of user interaction based on the virtual viewpoint position and the parameter data of the corresponding group in the image combination at the moment of user interaction is illustrated with examples. Those skilled in the art may understand that, in implementations, other Depth Image Based Rendering (DIBR) algorithms maybe used according to needs, and will not be described one by one.

Figure 38:
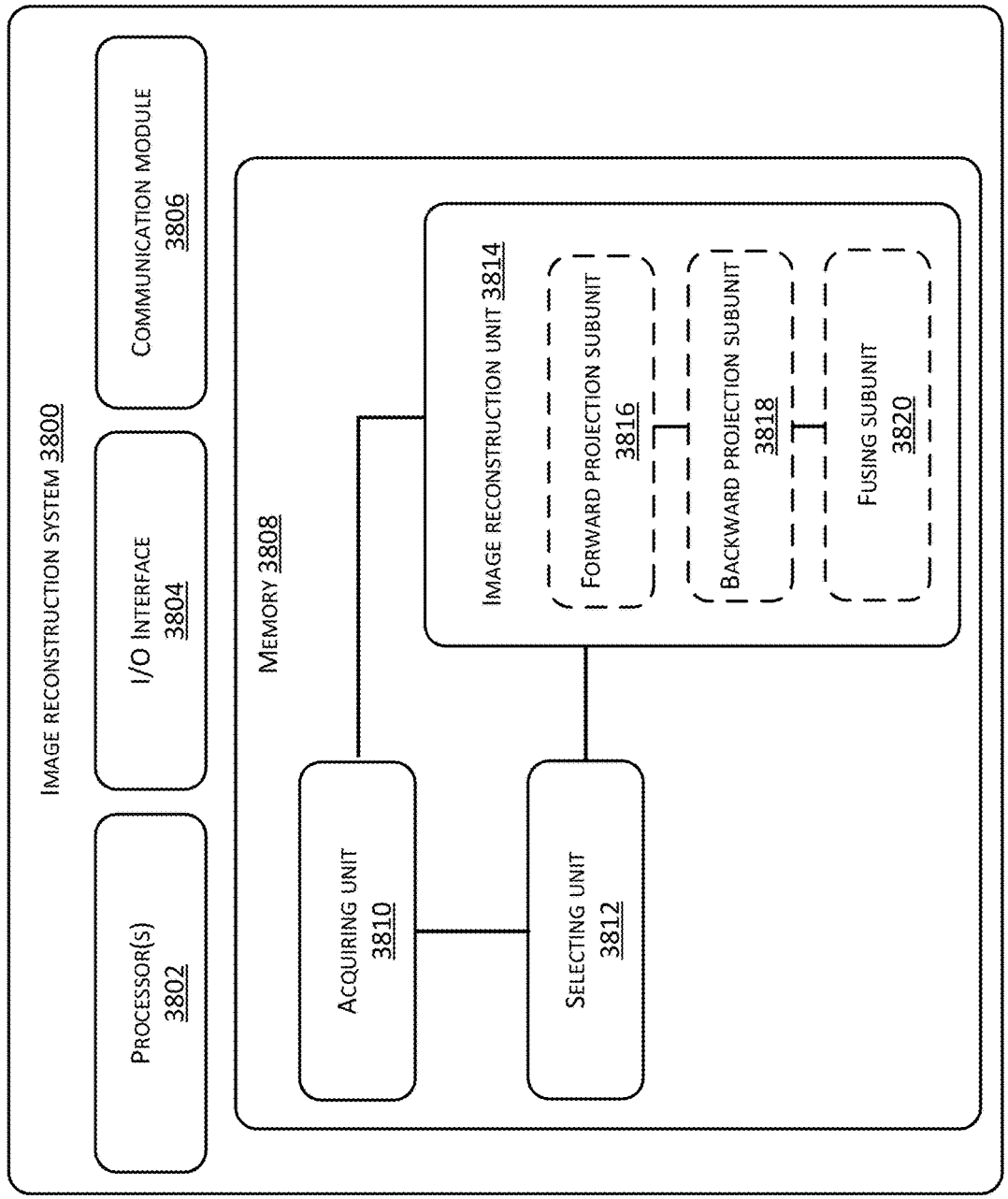
FIG. 38 is a schematic structural diagram of an image reconstruction system in an example embodiment of the present disclosure.

Referring to the schematic structural diagram of an image reconstruction system in the example embodiment of the present disclosure shown in FIG. 38, an example embodiment of the present disclosure also provides an image reconstruction system 3800. As shown in FIG. 38, the image reconstruction system 3800 may include one or more processors 3802, an input/output module 3804, a communication module 3806, and a memory 3808. The input/output module 3804 is configured to receive data/signal to be processed and to output the processed data/signal. The communication module 3806 is configured to allow the apparatus 3800 to communicate with other devices (not shown) over a network (not shown). The memory 3808 stores thereon computer-executable modules executable by the one or more processors 3802. The computer-executable modules may include an acquiring unit 3810, a selecting unit 3812, and an image reconstruction unit 3814, where:

The acquiring unit 3810 is adapted to acquire multiple-angle free-perspective image combination, the parameter data of the image combination, and the virtual viewpoint position information based on the user interaction, where the image combination includes multiple groups of texture images and the depth maps that are synchronized at multiple angles and have corresponding relationships;

The selecting unit 3812 is adapted to select a corresponding group of texture images and the depth maps in the image combination at the user interaction moment based on preset rules according to the virtual viewpoint position information and the parameter data of the image combination;

The image reconstruction unit 3814 is adapted to combine and render the selected corresponding group of texture images and depth maps in the image combination at the user interaction moment based on the virtual viewpoint position information and parameter data corresponding to the corresponding group of texture images and depth maps in the image combination at the user interaction moment, to obtain a reconstructed image corresponding to the virtual viewpoint position at the user interaction moment.

With the above image reconstruction system 3800, by selecting the corresponding group of texture images and depth maps in the image combination at the user interaction moment according to preset rules based on the virtual viewpoint position information and the acquired parameter data of the image combination, it is only necessary to combine and render the selected corresponding group of texture images and depth maps in the image combination at the user interaction moment based on the virtual viewpoint position information and parameter data corresponding to the corresponding group of texture images and depth maps in the image combination at the user interaction moment, to obtain a reconstructed image corresponding to the virtual viewpoint position at the user interaction moment, without performing image reconstruction based on all groups of texture images and depth maps in the image combination. Thus, the amount of data operation during the image reconstruction may be reduced.

In implementations, the selecting unit 3812 may select the corresponding group of texture images and the depth maps in the image combination at the user interaction moment that satisfies preset positional relationships with the virtual viewpoint position according to the virtual viewpoint position information and the parameter data of the image combination, or select the corresponding group of texture images and the depth maps in the image combination at the user interaction moment that satisfies preset quantitative relationships with the virtual viewpoint position, or select the corresponding group of texture images and the depth maps in the image combination at the user interaction moment that satisfies preset positional and quantitative relationships with the virtual viewpoint position.

In an example embodiment of the present disclosure, the selecting unit 3812 may select a preset number of corresponding groups of texture images and the depth maps that are closest to the virtual viewpoint position in the image combination at the user interaction moment according to the virtual viewpoint position information and the parameter data of the image combination.

In implementations, referring to FIG. 38, the image reconstruction unit 3814 may include a forward projection subunit 3816, a backward projection subunit 3818, and a fusing subunit 3820, where:

The forward projection subunit 3816 is adapted to project the corresponding group of depth maps respectively to the virtual viewpoint position at the user interaction moment according to the spatial geometric relationship, to form the depth map of the virtual viewpoint position;

The backward projection subunit 3818 is adapted to copy from the pixel points in the corresponding group of texture images to the generated virtual texture images corresponding to the virtual viewpoint position according to the projected depth map, to form the virtual texture images corresponding to the corresponding group;

The fusing subunit 3820 is adapted to fuse the virtual texture images corresponding to the corresponding group to obtain the reconstructed image of the virtual viewpoint position at the user interaction moment.

In an example embodiment of the present disclosure, the fusing subunit 3820 is adapted to perform weighting processing on pixels in corresponding positions in the virtual texture images corresponding to the corresponding groups in the image combination at the user interaction moment, to obtain the pixel values of corresponding positions in the reconstructed image of the virtual viewpoint position at the user interaction moment; and adapted to use the pixels around the pixel in the reconstructed image to perform inpainting for the position where the pixel value is zero in the reconstructed image of the virtual viewpoint position at the user interaction moment, to obtain the reconstructed image of the virtual viewpoint position at the user interaction moment.

In another example embodiment of the present disclosure, the fusing subunit 3820 is adapted to, for the position where the pixel value is zero in the virtual texture images corresponding to the respective corresponding groups in the image combination at the user interaction moment, perform inpainting using the around pixel values respectively; and adapted to, perform the weighting processing on the pixel values in corresponding positions in the virtual texture images corresponding to the respective corresponding groups after the inpainting, to obtain the reconstructed image of the virtual viewpoint position at the user interaction moment.

In another example embodiment of the present disclosure, in the image reconstruction unit 3814, the forward projection subunit 3816 is adapted to perform forward projection on the selected depth maps of the corresponding group in the image combination at the user interaction moment, respectively, to project to the virtual position at the user interaction moment; the backward projection subunit 3818 is adapted perform backward projection on the selected texture images of the corresponding group in the image combination at the user interaction moment, respectively; and the fusing subunit 3820 is adapted to fuse the respective virtual texture images generated after the backward projection.

In implementations, the above fused texture image may be output as the reconstructed image corresponding to the virtual viewpoint position at the user interaction moment.

In implementations, in addition to the texture images, the reconstructed image may also include corresponding depth maps. There may be various manners to obtain the corresponding depth maps. For example, for the corresponding depth map, one of the depth maps obtained after post-processing may be randomly selected as the depth map of the reconstructed image. For another example, the depth map closest to the virtual viewpoint position at the user interaction moment may be selected from the depth maps obtained after the post-processing as the depth map of the reconstructed image. If there are more than one depth maps closest to the virtual viewpoint position, any one of them may be selected. As another example, the post-processed depth maps may be fused to obtain a reconstructed depth map.

In implementations, the image reconstruction unit 3814 may further include a post-processing subunit (not shown), which is adapted to perform post-processing on the depth maps after the forward projection, respectively. For example, the post-processing subunit may perform at least one of foreground padding processing, pixel-level filtering processing, and the like, on the depth maps after the forward projection, respectively.

In implementations, the acquiring unit 3810 may include a decoding subunit (not shown), which is adapted to decode the acquired compressed multi-angle free-perspective image data, to obtain the multi-angle free-perspective image combination, and the parameter data corresponding to the image combination.

Example embodiments of the present disclosure further provides an image reconstruction device which can achieve the above image reconstruction methods. The image reconstruction device may include a memory and a processor. The memory stores computer instructions that may run on the processor. When the processor runs the computer instructions, the processor may execute the steps of the image reconstruction method according to any one of the above example embodiments.

In implementations, the image reconstruction device may include a terminal device. After the terminal device completes the image reconstruction using the above example embodiments, the terminal device may output the display through a display interface, for the user to view. The terminal device may be a handheld terminal such as a mobile phone and the like, a tablet computer, a set-top box, and the like.

In implementations, the edge node may also be used to perform the above image reconstruction. After the edge node completes the image reconstruction, the edge node may output to the important device in communication therewith, for the user to view. The edge computing node may be a node that performs short-range communication with a display device that displays the reconstructed image and maintains a high-bandwidth, low-latency connection, such as a connection via WiFi, 5G network, and the like. In implementations, the edge node may be any one of a base station, a router, a home gateway, and an in-vehicle device. With reference to FIG. 3, the edge node may be a device located in a CDN.

In implementations, in a network, a specific terminal device or edge node device may be selected according to the processing capability of the terminal device and the edge node, or according to the user's selection, or according to the operator's configuration, to perform the image reconstruction process in the example embodiments of the present disclosure. Reference may be made to the specific methods described in the example embodiments of the present disclosure, and details are not described herein again.

Example embodiments of the present disclosure further provide a computer-readable storage medium having computer instructions stored thereon. When the computer instructions are running, the steps of the image reconstruction method according to any one of the above example embodiments of the present disclosure may be executed. For the image reconstruction method executed by the instructions stored on the computer-readable storage medium, reference may be made to the above example embodiments of the image reconstruction method, and details are not described herein again.

The computer-readable storage medium may be various suitable media, such as an optical disc, a mechanical hard disk, and a solid-state hard disk. The computer-readable storage medium may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable storage medium does not include transitory media, such as modulated data signals and carrier waves.

Although the present disclosure has been described as above, the present disclosure is not limited thereto. Any person skilled in the art may make various changes and modifications without departing from the spirit and scope of the present disclosure. Therefore, the protection scope of the present disclosure shall be subject to the scope defined by the claims.

EXAMPLE CLAUSES

Clause 1. An image reconstruction method, comprising: acquiring a multi-angle free-perspective image combination, parameter data of the image combination, and virtual viewpoint position information based on user interaction, wherein the image combination includes multiple groups of texture images and depth maps that are synchronized at multiple angles and have corresponding relationships; selecting a corresponding group of texture images and depth maps in the image combination at a user interaction moment based on a preset rule according to the virtual viewpoint position information and the parameter data of the image combination; and combining and rendering the selected corresponding group of texture images and depth maps in the image combination at the user interaction moment based on the virtual viewpoint position information and parameter data corresponding to the corresponding group of texture images and depth maps in the image combination at the user interaction moment, to obtain a reconstructed image corresponding to the virtual viewpoint position at the user interaction moment.

Clause 2. The image reconstruction method according to clause 1, wherein selecting the corresponding group of texture images and depth maps data in the image combination at the user interaction moment based on the preset rule according to the virtual viewpoint position information and the parameter data of the image combination comprises: selecting the corresponding group of texture images and the depth maps in the image combination at the user interaction moment that satisfies a preset positional relationship and/or a preset quantitative relationship with the virtual viewpoint position according to the virtual viewpoint position information and the parameter data of the image combination.

Clause 3. The image reconstruction method according to clause 2, wherein selecting the corresponding group of texture images and the depth maps in the image combination at the user interaction moment that satisfies the preset positional relationship and/or the preset quantitative relationship with the virtual viewpoint position according to the virtual viewpoint position information and the parameter data of the image combination comprises: selecting a preset number of corresponding groups of texture images and the depth maps that are closest to the virtual viewpoint position in the image combination at the user interaction moment according to the virtual viewpoint position information and the parameter data of the image combination.

Clause 4. The image reconstruction method according to clause 3, wherein selecting the preset number of corresponding groups of texture images and the depth maps that are closest to the virtual viewpoint position in the image combination at the user interaction moment according to the virtual viewpoint position information and the parameter data of the image combination comprises: selecting texture images and depth maps corresponding to 2 to N capturing devices closest to the virtual viewpoint position according to the virtual viewpoint position information and the parameter data corresponding to the corresponding group of texture images and depth maps in the image combination at the user interaction moment, wherein N is the number of all capturing devices that capture the image combination.

Clause 5. The image reconstruction method according to clause 1, wherein combining and rendering the selected corresponding group of texture images and depth maps in the image combination at the user interaction moment based on the virtual viewpoint position information and parameter data corresponding to the corresponding group of texture images and depth maps in the image combination at the user interaction moment to obtain the reconstructed image corresponding to the virtual viewpoint position at the user interaction moment comprises: performing forward projection on the selected depth maps of the corresponding group in the image combination at the user interaction moment respectively, to project to the virtual position at the user interaction moment; performing post-processing on the depth maps after the forward projection respectively; performing backward projection on the selected texture images of the corresponding group in the image combination at the user interaction moment respectively; and fusing respective virtual texture images generated after the backward projection.

Clause 6. The image reconstruction method according to clause 5, wherein after fusing respective the virtual texture images generated after the backward projection, the method further comprises: performing inpainting on the fused texture image to obtain the reconstructed image corresponding to the virtual viewpoint position at the user interaction moment.

Clause 7. The image reconstruction method according to clause 5, wherein performing post-processing on the depth maps after the forward projection respectively comprises at least one of the following: performing foreground padding processing on the depth maps after the forward projection respectively; and performing pixel-level filtering processing on the depth maps after the forward projection respectively.

Clause 8. The image reconstruction method according to clause 5, wherein fusing respective virtual texture images generated after the backward projection comprises: fusing the respective virtual texture images generated after the backward projection using a global weight determined by a distance between the virtual viewpoint position and a position of a capturing device that captures a corresponding texture image in the image combination, according to the virtual viewpoint position information and the parameter data corresponding to the corresponding group of texture images and depth maps in the image combination at the user interaction moment.

Clause 9. The image reconstruction method according to clause 1, wherein combining and rendering the selected corresponding group of texture images and depth maps in the image combination at the user interaction moment based on the virtual viewpoint position information and parameter data corresponding to the corresponding group of texture images and depth maps in the image combination at the user interaction moment to obtain the reconstructed image corresponding to the virtual viewpoint position at the user interaction moment comprises: respectively projecting the depth maps of the corresponding group in the image combination at the user interaction moment to the virtual viewpoint position at the user interaction moment according to a spatial geometric relationship, to form a depth map of the virtual viewpoint position; and copying from pixel points in the texture images of the corresponding group to the generated virtual texture images corresponding to the virtual viewpoint position according to the projected depth maps, to form the virtual texture images corresponding to the corresponding group in the image combination at the user interaction moment; and fusing the virtual texture images corresponding to the corresponding group in the image combination at the user interaction moment, to obtain the reconstructed image of the virtual viewpoint position at the user interaction moment.

Clause 10. The image reconstruction method according to clause 9, wherein fusing the virtual texture images corresponding to the corresponding group in the image combination at the user interaction moment to obtain the reconstructed image of the virtual viewpoint position at the user interaction moment comprises: performing weighting processing on pixels in corresponding positions in the virtual texture images corresponding to respective corresponding groups in the image combination at the user interaction moment, to obtain pixel values of the corresponding positions in the reconstructed image of the virtual viewpoint position at the user interaction moment; and for a position where a pixel value is zero in the reconstructed image of the virtual viewpoint position at the user interaction moment, performing inpainting using pixels around the pixel in the reconstructed image, to obtain the reconstructed image of the virtual viewpoint position at the user interaction moment.

Clause 11. The image reconstruction method according to clause 9, wherein fusing the virtual texture images corresponding to the corresponding group in the image combination at the user interaction moment to obtain the reconstructed image of the virtual viewpoint position at the user interaction moment comprises: for a position where a pixel value is zero in the virtual texture images corresponding to respective corresponding groups in the image combination at the user interaction moment, performing inpainting using around pixel values respectively; and performing weighting processing on pixel values in corresponding positions in the virtual texture images corresponding to the respective corresponding groups after the inpainting, to obtain the reconstructed image of the virtual viewpoint position at the user interaction moment.

Clause 12. The image reconstruction method according to clause 1, wherein acquiring a multi-angle free-perspective image combination and parameter data of the image combination comprises: decoding acquired compressed multi-angle free-perspective image data, to obtain the multi-angle free-perspective image combination and the parameter data corresponding to the image combination.

Clause 13. An image reconstruction system, comprising: an acquiring unit, adapted to acquire multiple-angle free-perspective image combination, parameter data of the image combination, and the virtual viewpoint position information based on user interaction, wherein the image combination includes multiple groups of texture images and the depth maps that are synchronized at multiple angles and have corresponding relationships; a selecting unit, adapted to select a corresponding group of texture images and the depth maps in the image combination at the user interaction moment based on a preset rule according to the virtual viewpoint position information and the parameter data of the image combination; and an image reconstruction unit, adapted to combine and render the selected corresponding group of texture images and depth maps in the image combination at the user interaction moment based on the virtual viewpoint position information and parameter data corresponding to the corresponding group of texture images and depth maps in the image combination at the user interaction moment, to obtain a reconstructed image corresponding to the virtual viewpoint position at the user interaction moment.

Clause 14. An image reconstruction device, comprising a memory and a processor, the memory storing computer instructions thereon capable of running on the processor, wherein the processor performs steps of the method of any one of clauses 1 to 12 when the processor runs the computer instructions.

Clause 15. The image reconstruction device according to clause 14, wherein the image reconstruction device comprises at least one of a terminal device and an edge node.

Clause 16. A computer-readable storage medium having computer instructions stored thereon, wherein steps of the method of any one of clauses 1 to 12 are performed when the computer instructions are executed.

What is claimed is:

1. A method implemented by a computing device, the method comprising:
    acquiring a multi-angle free-perspective image combination, parameter data of the image combination, and virtual viewpoint position information based on user interaction, wherein the image combination includes multiple groups of texture images and depth maps, and the multiple groups of texture images and depth maps are synchronized at multiple angles and have corresponding relationships, wherein the corresponding relationships are indicated in an association relationship field in a stitched image that stores the multiple groups of texture images and depth maps;
    selecting a corresponding group of texture images and depth maps in the image combination at a user interaction moment based on a preset rule according to the virtual viewpoint position information and the parameter data of the image combination; and
    combining and rendering the selected corresponding group of texture images and depth maps in the image combination at the user interaction moment based on the virtual viewpoint position information and parameter data corresponding to the corresponding group of texture images and depth maps in the image combination at the user interaction moment, to obtain a reconstructed image corresponding to a virtual viewpoint position at the user interaction moment.

2. The method of claim 1, wherein selecting the corresponding group of texture images and depth maps in the image combination at the user interaction moment based on the preset rule according to the virtual viewpoint position information and the parameter data of the image combination comprises:
    selecting the corresponding group of texture images and the depth maps in the image combination at the user interaction moment that satisfies a preset positional relationship and/or a preset quantitative relationship with the virtual viewpoint position according to the virtual viewpoint position information and the parameter data of the image combination.

3. The method of claim 2, wherein selecting the corresponding group of texture images and the depth maps in the image combination at the user interaction moment that satisfies the preset positional relationship and/or the preset quantitative relationship with the virtual viewpoint position according to the virtual viewpoint position information and the parameter data of the image combination comprises:

selecting a preset number of corresponding groups of texture images and the depth maps that are closest to the virtual viewpoint position in the image combination at the user interaction moment according to the virtual viewpoint position information and the parameter data of the image combination.

4. The method of claim 3, wherein selecting the preset number of corresponding groups of texture images and the depth maps that are closest to the virtual viewpoint position in the image combination at the user interaction moment according to the virtual viewpoint position information and the parameter data of the image combination comprises:

selecting texture images and depth maps corresponding to 2 to N capturing devices closest to the virtual viewpoint position according to the virtual viewpoint position information and the parameter data corresponding to the corresponding group of texture images and depth maps in the image combination at the user interaction moment, wherein N is the number of all capturing devices that capture the image combination.

5. The method of claim 1, wherein combining and rendering the selected corresponding group of texture images and depth maps in the image combination at the user interaction moment based on the virtual viewpoint position information and parameter data corresponding to the corresponding group of texture images and depth maps in the image combination at the user interaction moment to obtain the reconstructed image corresponding to the virtual viewpoint position at the user interaction moment comprises:

performing forward projection on the selected depth maps of the corresponding group in the image combination at the user interaction moment respectively, to project to the virtual position at the user interaction moment;

performing post-processing on the depth maps after the forward projection respectively;

performing backward projection on the selected texture images of the corresponding group in the image combination at the user interaction moment respectively; and fusing respective virtual texture images generated after the backward projection.

6. The method of claim 5, wherein after fusing respective the virtual texture images generated after the backward projection, the method further comprises:

performing inpainting on the fused texture image to obtain the reconstructed image corresponding to the virtual viewpoint position at the user interaction moment.

7. The method of claim 5, wherein performing post-processing on the depth maps after the forward projection respectively comprises at least one of the following:

performing foreground padding processing on the depth maps after the forward projection respectively; and performing pixel-level filtering processing on the depth maps after the forward projection respectively.

8. The method of claim 5, wherein fusing respective virtual texture images generated after the backward projection comprises:

fusing the respective virtual texture images generated after the backward projection using a global weight determined by a distance between the virtual viewpoint position and a position of a capturing device that captures a corresponding texture image in the image combination, according to the virtual viewpoint position information and the parameter data corresponding to the corresponding group of texture images and depth maps in the image combination at the user interaction moment.

9. The method of claim 1, wherein combining and rendering the selected corresponding group of texture images and depth maps in the image combination at the user interaction moment based on the virtual viewpoint position information and parameter data corresponding to the corresponding group of texture images and depth maps in the image combination at the user interaction moment to obtain the reconstructed image corresponding to the virtual viewpoint position at the user interaction moment comprises:

respectively projecting the depth maps of the corresponding group in the image combination at the user interaction moment to the virtual viewpoint position at the user interaction moment according to a spatial geometric relationship, to form a depth map of the virtual viewpoint position; and copying from pixel points in the texture images of the corresponding group to the generated virtual texture images corresponding to the virtual viewpoint position according to the projected depth maps, to form the virtual texture images corresponding to the corresponding group in the image combination at the user interaction moment; and fusing the virtual texture images corresponding to the corresponding group in the image combination at the user interaction moment, to obtain the reconstructed image of the virtual viewpoint position at the user interaction moment.

10. The method of claim 9, wherein fusing the virtual texture images corresponding to the corresponding group in the image combination at the user interaction moment to obtain the reconstructed image of the virtual viewpoint position at the user interaction moment comprises:

performing weighting processing on pixels in corresponding positions in the virtual texture images corresponding to respective corresponding groups in the image combination at the user interaction moment, to obtain pixel values of the corresponding positions in the reconstructed image of the virtual viewpoint position at the user interaction moment; and for a first pixel where a pixel value is zero in the reconstructed image of the virtual viewpoint position at the user interaction moment, performing inpainting using pixels around the first pixel in the reconstructed image, to obtain the reconstructed image of the virtual viewpoint position at the user interaction moment.

11. The method of claim 9, wherein fusing the virtual texture images corresponding to the corresponding group in the image combination at the user interaction moment to obtain the reconstructed image of the virtual viewpoint position at the user interaction moment comprises:

for a first pixel where a pixel value is zero in the virtual texture images corresponding to respective corresponding groups in the image combination at the user interaction moment, performing inpainting on the first pixel using around pixel values respectively; and performing weighting processing on pixel values in corresponding positions in the virtual texture images corresponding to the respective corresponding groups after the inpainting, to obtain the reconstructed image of the virtual viewpoint position at the user interaction moment.

12. The method of claim 1, wherein acquiring a multi-angle free-perspective image combination and parameter data of the image combination comprises:

decoding acquired compressed multi-angle free-perspective image data, to obtain the multi-angle free-perspective image combination and the parameter data corresponding to the image combination.

13. A system, comprising:
one or more processors;
memory;
an acquiring unit, stored in the memory and executable by the one or more processors, configured to acquire multiple-angle free-perspective image combination, parameter data of the image combination, and the virtual viewpoint position information based on user interaction, wherein the image combination includes multiple groups of texture images and the depth maps, and the multiple groups of texture images and depth maps are synchronized at multiple angles and have corresponding relationships, wherein the corresponding relationships are indicated in an association relationship field in a stitched image that stores the multiple groups of texture images and depth maps;
a selecting unit, stored in the memory and executable by the one or more processors, configured to select a corresponding group of texture images and the depth maps in the image combination at the user interaction moment based on a preset rule according to the virtual viewpoint position information and the parameter data of the image combination; and
an image reconstruction unit, stored in the memory and executable by the one or more processors, configured to combine and render the selected corresponding group of texture images and depth maps in the image combination at the user interaction moment based on the virtual viewpoint position information and parameter data corresponding to the corresponding group of texture images and depth maps in the image combination at the user interaction moment, to obtain a reconstructed image corresponding to the virtual viewpoint position at the user interaction moment.

14. A computer-readable storage medium having computer instructions stored thereon that, when executed by one or more processors of a computing device, cause the one or more processors to perform acts comprising:
acquiring a multi-angle free-perspective image combination, parameter data of the image combination, and virtual viewpoint position information based on user interaction, wherein the image combination includes multiple groups of texture images and depth maps, and the multiple groups of texture images and depth maps are synchronized at multiple angles and have corresponding relationships, wherein the corresponding relationships are indicated in an association relationship field in a stitched image that stores the multiple groups of texture images and depth maps;
selecting a corresponding group of texture images and depth maps in the image combination at a user interaction moment based on a preset rule according to the virtual viewpoint position information and the parameter data of the image combination; and
combining and rendering the selected corresponding group of texture images and depth maps in the image combination at the user interaction moment based on the virtual viewpoint position information and parameter data corresponding to the corresponding group of texture images and depth maps in the image combination at the user interaction moment, to obtain a reconstructed image corresponding to the virtual viewpoint position at the user interaction moment.

15. The computer-readable storage medium of claim 14, wherein selecting the corresponding group of texture images and depth maps in the image combination at the user interaction moment based on the preset rule according to the virtual viewpoint position information and the parameter data of the image combination comprises:
selecting the corresponding group of texture images and the depth maps in the image combination at the user interaction moment that satisfies a preset positional relationship and/or a preset quantitative relationship with the virtual viewpoint position according to the virtual viewpoint position information and the parameter data of the image combination.

16. The computer-readable storage medium of claim 15, wherein selecting the corresponding group of texture images and the depth maps in the image combination at the user interaction moment that satisfies the preset positional relationship and/or the preset quantitative relationship with the virtual viewpoint position according to the virtual viewpoint position information and the parameter data of the image combination comprises:
selecting a preset number of corresponding groups of texture images and the depth maps that are closest to the virtual viewpoint position in the image combination at the user interaction moment according to the virtual viewpoint position information and the parameter data of the image combination.

17. The computer-readable storage medium of claim 16, wherein selecting the preset number of corresponding groups of texture images and the depth maps that are closest to the virtual viewpoint position in the image combination at the user interaction moment according to the virtual viewpoint position information and the parameter data of the image combination comprises:
selecting texture images and depth maps corresponding to 2 to N capturing devices closest to the virtual viewpoint position according to the virtual viewpoint position information and the parameter data corresponding to the corresponding group of texture images and depth maps in the image combination at the user interaction moment, wherein N is the number of all capturing devices that capture the image combination.

18. The computer-readable storage medium of claim 14, wherein combining and rendering the selected corresponding group of texture images and depth maps in the image combination at the user interaction moment based on the virtual viewpoint position information and parameter data corresponding to the corresponding group of texture images and depth maps in the image combination at the user interaction moment to obtain the reconstructed image corresponding to the virtual viewpoint position at the user interaction moment comprises:
performing forward projection on the selected depth maps of the corresponding group in the image combination at the user interaction moment respectively, to project to the virtual position at the user interaction moment;
performing post-processing on the depth maps after the forward projection respectively;
performing backward projection on the selected texture images of the corresponding group in the image combination at the user interaction moment respectively; and
fusing respective virtual texture images generated after the backward projection.

19. The computer-readable storage medium of claim 14, wherein after fusing respective the virtual texture images generated after the backward projection, the method further comprises:
  performing inpainting on the fused texture image to obtain the reconstructed image corresponding to the virtual viewpoint position at the user interaction moment.

20. The computer-readable storage medium of claim 14, wherein performing post-processing on the depth maps after the forward projection respectively comprises at least one of the following:
  performing foreground padding processing on the depth maps after the forward projection respectively; and
  performing pixel-level filtering processing on the depth maps after the forward projection respectively.

* * * * *